Figure 1:
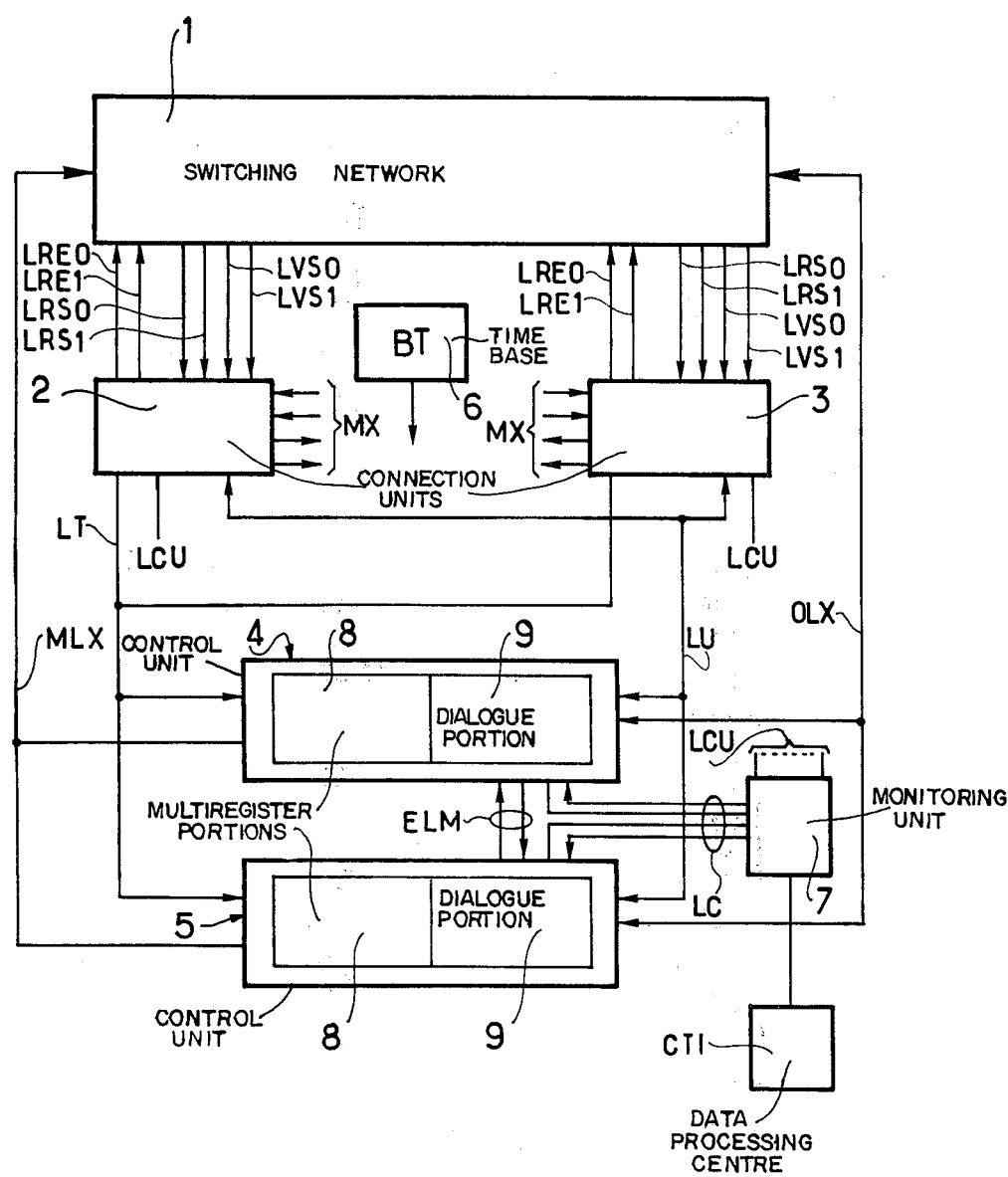

United States Patent [19]

Jacob

[11] 4,119,803
[45] Oct. 10, 1978

[54] CONTROL UNIT FOR A TIME-DIVISION TELECOMMUNICATIONS EXCHANGE

[75] Inventor: Jean-Baptiste Jacob, Perros-Guirec, France

[73] Assignee: Compagnie Industrielle des Telecommunications Cit-Alcatel, Paris, France

[21] Appl. No.: 816,102

[22] Filed: Jul. 15, 1977

[30] Foreign Application Priority Data

Jul. 22, 1976 [FR] France .................................. 76 22419

[51] Int. Cl.² ........................ H04Q 3/54; H04Q 11/04
[52] U.S. Cl. ............................. 179/15 AT; 179/18 ES
[58] Field of Search ........................ 179/15 AT, 18 ES

[56] References Cited

U.S. PATENT DOCUMENTS

| 3,524,946 | 8/1970 | Pinet et al. ................. 179/15 AT X |
| 3,908,092 | 9/1975 | Hight et al. ..................... 179/18 ES |

OTHER PUBLICATIONS

"An Experimental Digital Switching System", Perucca, CSELT/RAPPORTI TECNICI, vol. 2, No. 3, Dec. 1974, pp. 9-19.

*Primary Examiner*—Thomas W. Brown
*Attorney, Agent, or Firm*—Sughrue, Rothwell, Mion, Zinn and Macpeak

[57] ABSTRACT

In an existing time division exchange system the known switching network and connection units are retained, but the control of these units is taken over by a pair of new control units which replace a collection of previous units such as multi-registers, markers, translators, call charging devices etc. The new control units each comprise a multi-register portion and a dialogue portion with the multi-register portion governing the setting up and the clearing down of traffic while the dialogue portion performs most of the communication between the multi-register portion and the rest of the exchange equipment. The control units are microprogrammed machines under the control of a "macroprogram" assembled using the conventional computer techniques. The control units are connected to a data processing center via a monitoring unit.

17 Claims, 31 Drawing Figures

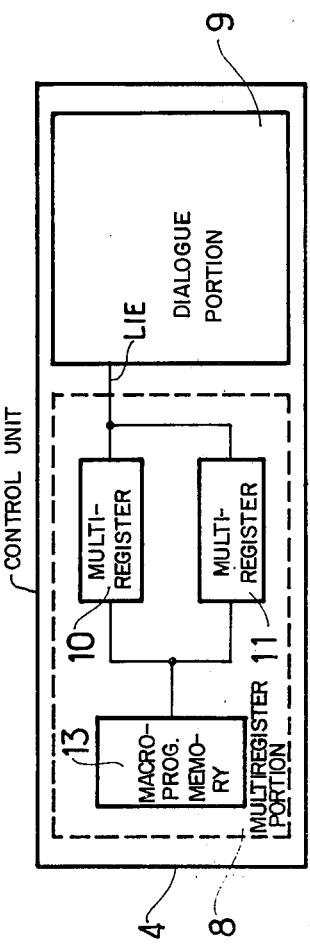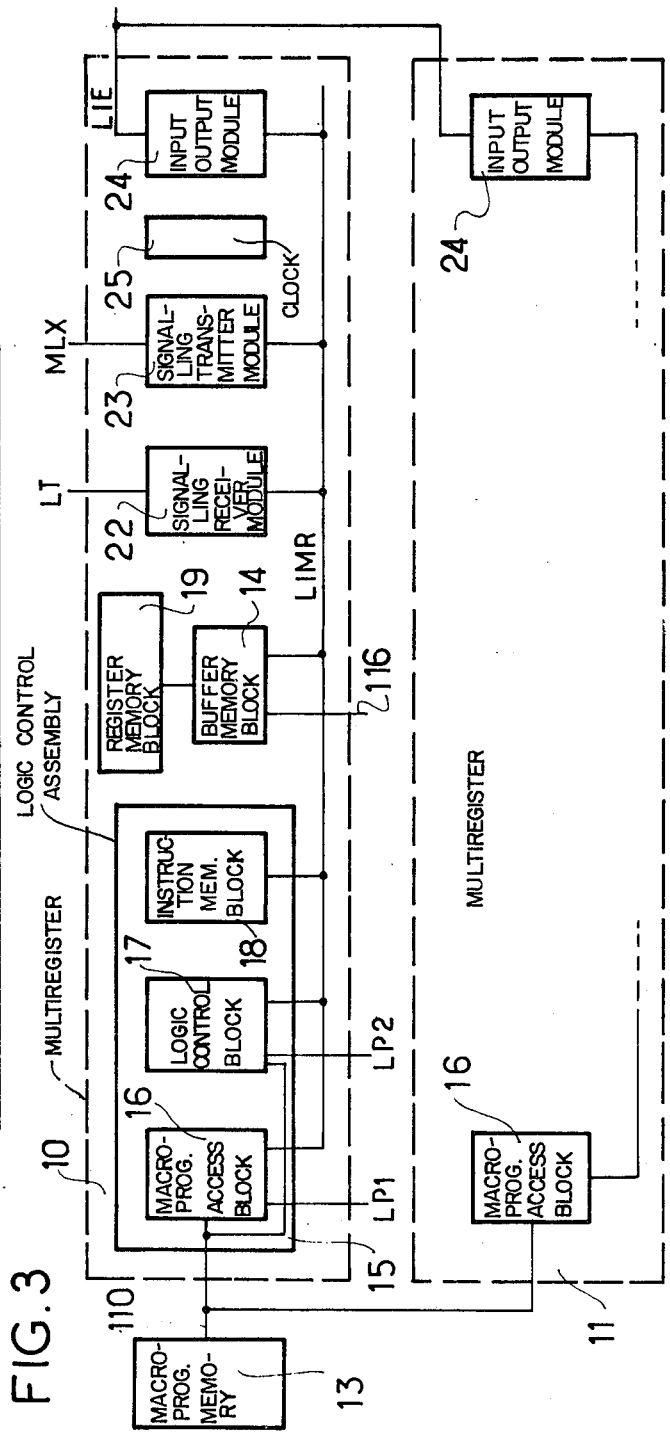
FIG.2
FIG.3

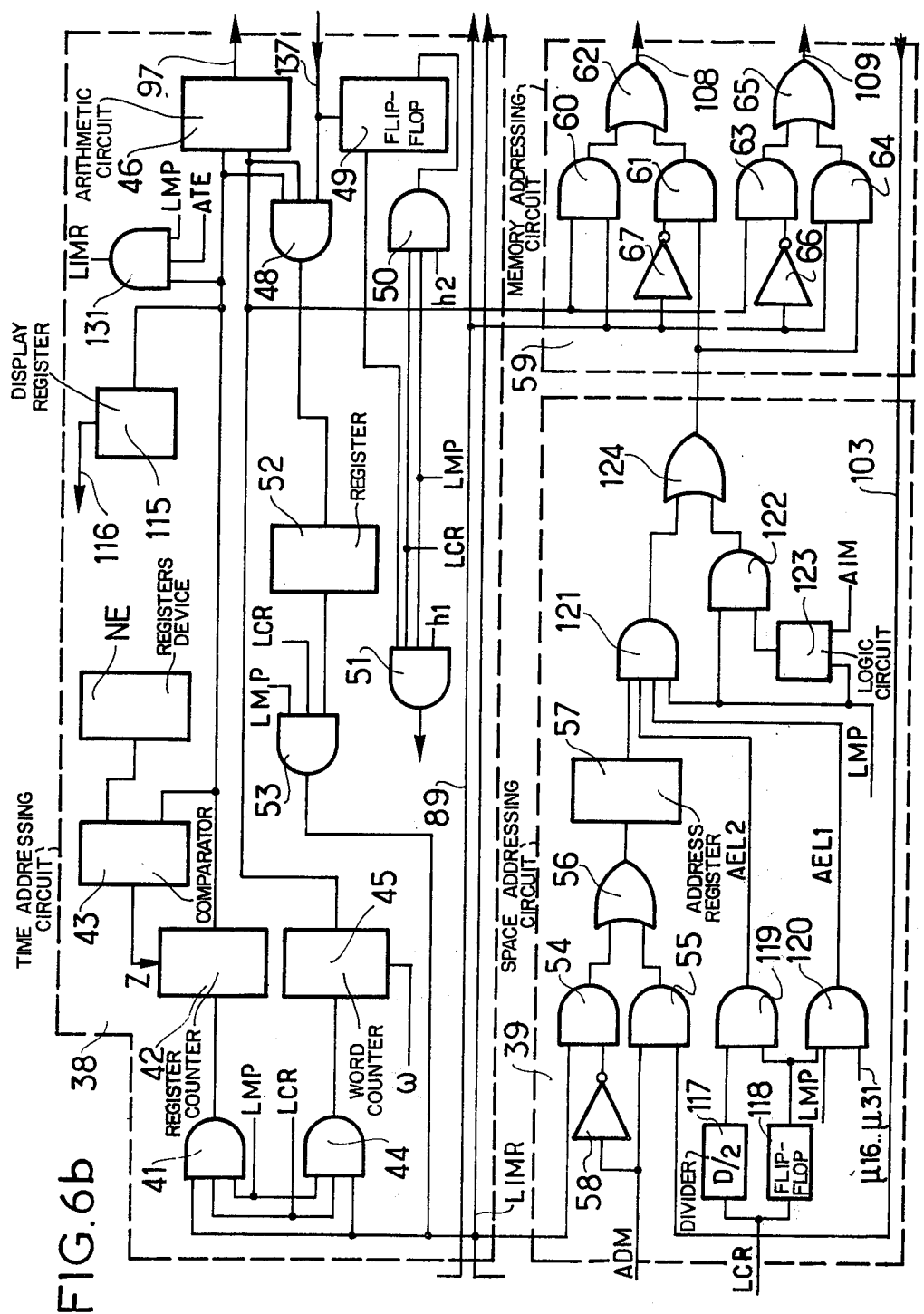

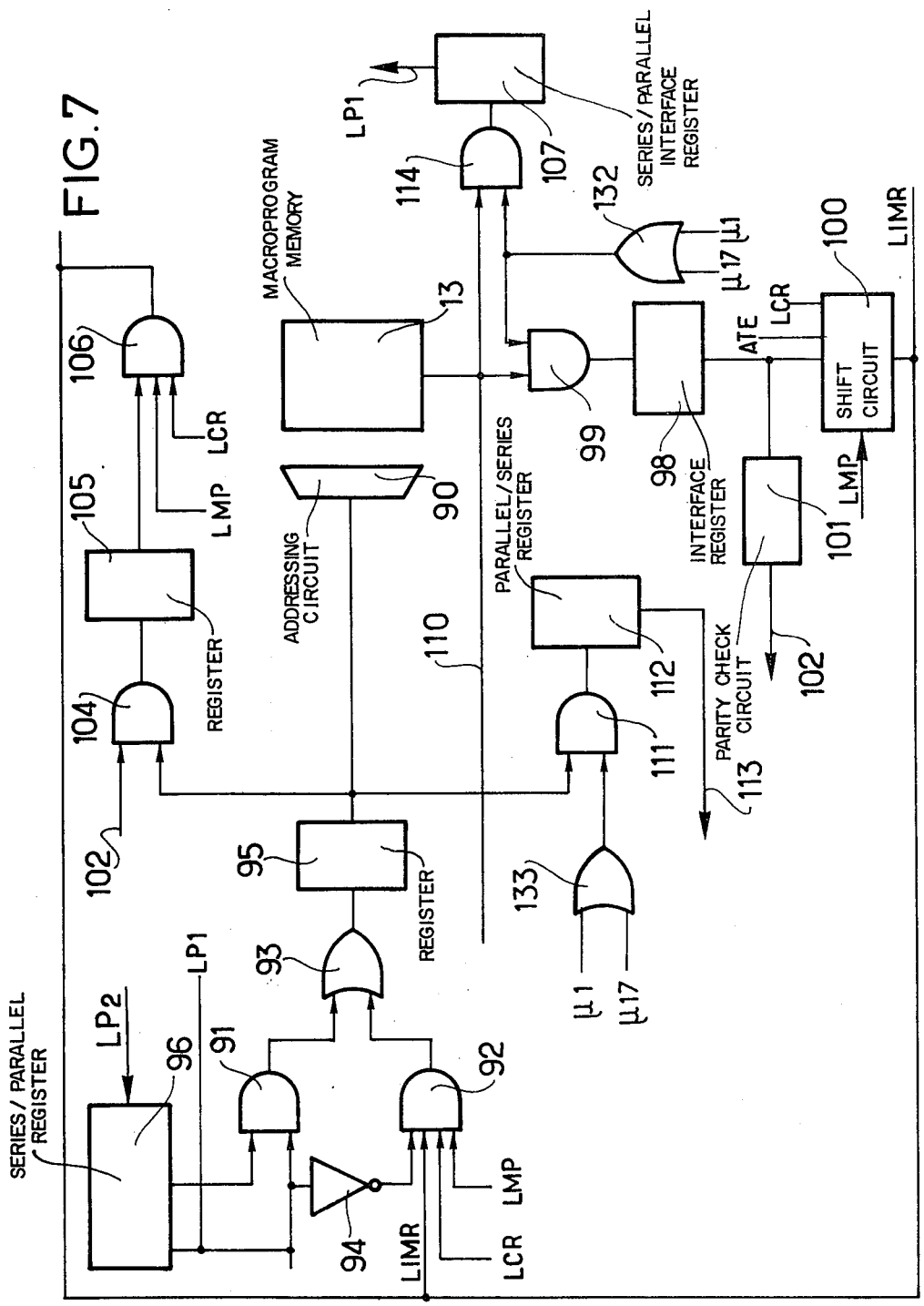

FIG. 8a

| # | Name | | | | | | | |
|---|------|---|---|---|---|---|---|---|
| 1 | EMO | Ad. | P | | | SPH | | |
| 2 | EMAS | Ad. | M | P | | SPH | | |
| 3 | EMASI | Ad. | M | P | | SPH | | |
| 4 | TEDEUM | 1°Ad. So | 1°Ad. D | 2° Ad. So | 2°Ad. D | SPH | | |
| 5 | TFT | Ad. So | Ad. D | C | SPH | | | |
| 6 | BRAN | PH | | | | | | |
| 7 | SAU | | | SPH | | | | |
| 8 | REPO | | | | | | | |
| 9 | EFF | | | | | | | |
| 10 | PRISE | Enr. Rap. MR 1 | Enr. Rap. MR 2 | | | | | |
| 11 | OBTRA | Ad. Ta Obs. | | SPH | | | | |
| 12 | CONSIL 1 | Ad. Sign. | P | Ad. Te | PTe | SPH 2 | SPH 1 | |
| 13 | CONSIL 2 | Ad. Sign. | P | Ad. Te | PTe | SPH 2 | SPH 1 | |
| 14 | CONFES | Ad. Sign. | P | Ad. Te | PTe | SPH 2 | SPH 1 | |
| 15 | ATTES | Ad. Sign. | P | Ad. Te | PTe | SPH 2 | SPH 1 | |
| 16 | RMF | Ad. Sign. | C | Ad. Ins | SPH 2 | SPH 1 | | |
| 17 | RSI | Ad. Sign. | P | SPH 2 | SPH 1 | | | |
| 18 | SIPO | Ad. Po | SPH 5 | SPH 4 | SPH 3 | SPH 2 | SPH 1 | |
| 19 | TONAL | Ad. | F | Ton. | SPH | | | |
| 20 | TOTSI | Ad. | F | Ton. | PT | SPH 2 | SPH 1 | |
| 21 | TETON | Ad. | F | Ton. | P | Ad. M | SPH 2 | |
| 22 | TORAZ | Ad. | F | Ton. | CTe | SPH | | |
| 23 | TOTEM | Ad. | F | Ton. | PTe | Ad. Te | SPH 2 | |
| 24 | TERNUC | Ad. Sec | M | Ad. RNC | SPH 2 | SPH 1 | | |
| 25 | COSPA | Ad. Sec | P2 | P1 | SPH 3 | SPH 2 | SPH 1 | |
| 26 | ANAS | Ad. Sec | P4 | P3 | P2 | P1 | SPH 5 | |
| 27 | ASMA | Ad. Sec | M4 | M3 | M2 | M1 | SPH 5 | |
| 28 | RAZ 1 | 1°Ad. | 2°Ad. | 3°Ad. | 4°Ad. | C | | |
| 28 | RAZ 2 | 1°Ad. | M1 | 2°Ad. | M2 | | C | |
| 29 | TUTUS | Ad. 1 | M | Ad. 1/4 | M1/P4 | C | SPH3 | SPH 2 |
| 30 | TESTUS | Ad. 4 | P | Ad. 1/4 | M1/P4 | C | SPH3 | SPH 2 |

FIG. 8b

| | | | | | |
|---|---|---|---|---|---|
| 31 | CHIPO | Ad. | Ad. CH | SPH 2 | SPH 1 |
| 32 | TES | Ad. Sec | M | SPH 2 | SPH 1 |
| 33 | ANS | Ad. Sec | P | SPH 2 | SPH 1 |
| 34 | COMPS | Ad. Sec | P | SPH 3 / SPH 2 | SPH 1 |
| 35 | OMP | Ad. M | COP | P | SPH |
| 36 | OMM | Ad. M1 | COP | Ad. M2 | SPH / SPH 3 \| SPH 2 \| SPH 1 |
| 37 | OMO | Ad. M | COP | Ad. O | SPH / SPH 3 \| SPH 2 \| SPH 1 |
| 38 | OMS | Ad. M | COP | Ad. Sec | SPH / SPH 3 \| SPH 2 \| SPH 1 |
| 39 | OMSI | Ad. M | COP | Ad. Sec I | SPH / SPH 3 \| SPH 2 \| SPH 1 |
| 40 | OPAO | Ad. O | COP | P | SPH / SPH 3 \| SPH 2 \| SPH 1 |
| 41 | OPOCO | Ad. O1 | COP | Ad. O2 | SPH / SPH 3 \| SPH 2 \| SPH 1 |
| 42 | OSO | Ad. O | COP | Ad. Sec | SPH / SPH 3 \| SPH 2 \| SPH 1 |
| 43 | OSPA | Ad. Sec | COP | P | SPH / SPH 5 \| SPH 4 / SPH 3 \| SPH 2 \| SPH 1 |
| 44 | OSS | Ad. Sec 1 | COP | Ad. Sec 2 | SPH / SPH 5 \| SPH 4 / SPH 3 \| SPH 2 \| SPH 1 |
| 45 | OSSI | Ad. Sec | COP | Ad. Sec I | SPH / SPH 5 \| SPH 4 / SPH 3 \| SPH 2 \| SPH 1 |
| 46 | OSIP | Ad. Sec I | COP | P | SPH / SPH 5 \| SPH 4 / SPH 3 \| SPH 2 \| SPH 1 |
| 47 | OSIS | Ad. Sec I | COP | Ad. Sec | SPH / SPH 5 \| SPH 4 / SPH 3 \| SPH 2 \| SPH 1 |

FIG. 8c

| | | 4 | 8 | 12 | 16 | 20 | 24 | 28 | 32 | 36 | 40 | 44 | 48 |
|---|---|---|---|---|---|---|---|---|---|---|---|---|---|
| 48 | ASPRO | | PH DEP SP | | | | | C | | Ad. Te | | | |
| 49 | RETAN | | P Ins. | | | | | Ad. Ins. | | | | C | |
| 50 | ASPEC | Ad. TE | | | F | | | | | PH DEB SPE | | | |
| 51 | MEC | Ad. | | Ad. 1 | | Ad. 2 | | | | | P. Te | | |
| 52 | MLD | Ad. 1 | | Ad. 2 | | Ad. 3 | | | | | P. Te | | |
| 53 | MLF | Ad. 4 | | Ad. 5 | | Ad. 6 | | Ad. | | | | | |
| 54 | TRENO | Ad. TE1 | | Ad. TE2 | | Ad. TE3 | | | | | SPH | | |
| 55 | TRETI | Ad. | | Ad. TE1 | | Ad. TE3 | | | | | SPH | | |
| 56 | TRADIM | Ad. 1 | | Ad. 2 | | | | P | | | SPH | | |
| 57 | RARE | Ad. 1 | | Ad. 2 | | Ad. 3 | | | | Ad. 4 | | | |
| 58 | RADER | Ad. 1 | | Ad. 2 | | Ad. 3 | | | | | | | |
| 59 | RAFIR | Ad. 4 | | Ad. 5 | | Ad. 6 | | | | | | | |
| 60 | TINTER | M1 | M2 | M3 | | SPH 2 | | | | SPH 1 | | | |
| 61 | AFICH | Ad. T.S. | | MT | F | T | | Ad. PO | | Ad. Info | | | |
| 62 | AFORS | Ad. T.S. | | MT | F | T | | Ad. PO | | Ad. Info | | | |
| 63 | AFINU | Ad. T.S | | MT | F | T | | Ad. PO | | Ad. Info | | | |
| 64 | INDER | Ad. Ind. | | | PH DEB Ta | | | | Ad. G | | | | |
| 65 | INDEX | Ad. Ind. | | | PH DEB Ta | | | | Ad. G | | | | |
| 66 | ETROS | Ad. 1 | | P1 | | Ad. 2 | | P2 | | Ad. 3 | | P3 | |
| 67 | PIRSI | Ad. | | | Ad. P | | SPH 2 | | | | SPH 1 | | |
| 68 | SIRAZ | Ad. Cor | | CS | | Ad. Te | | | SPH 2 | | SPH 1 | | |
| 69 | CHIMF | Ad. Cor | | F | | Ad. CH | | | | SPH | | | |
| 70 | TRESI | Ad. Cor | | PS | | Ad. E | | | Ad. TE | | SPH 3 | SPH 2 | |
| 71 | RETNOR | | | | | | | | | | | C | |

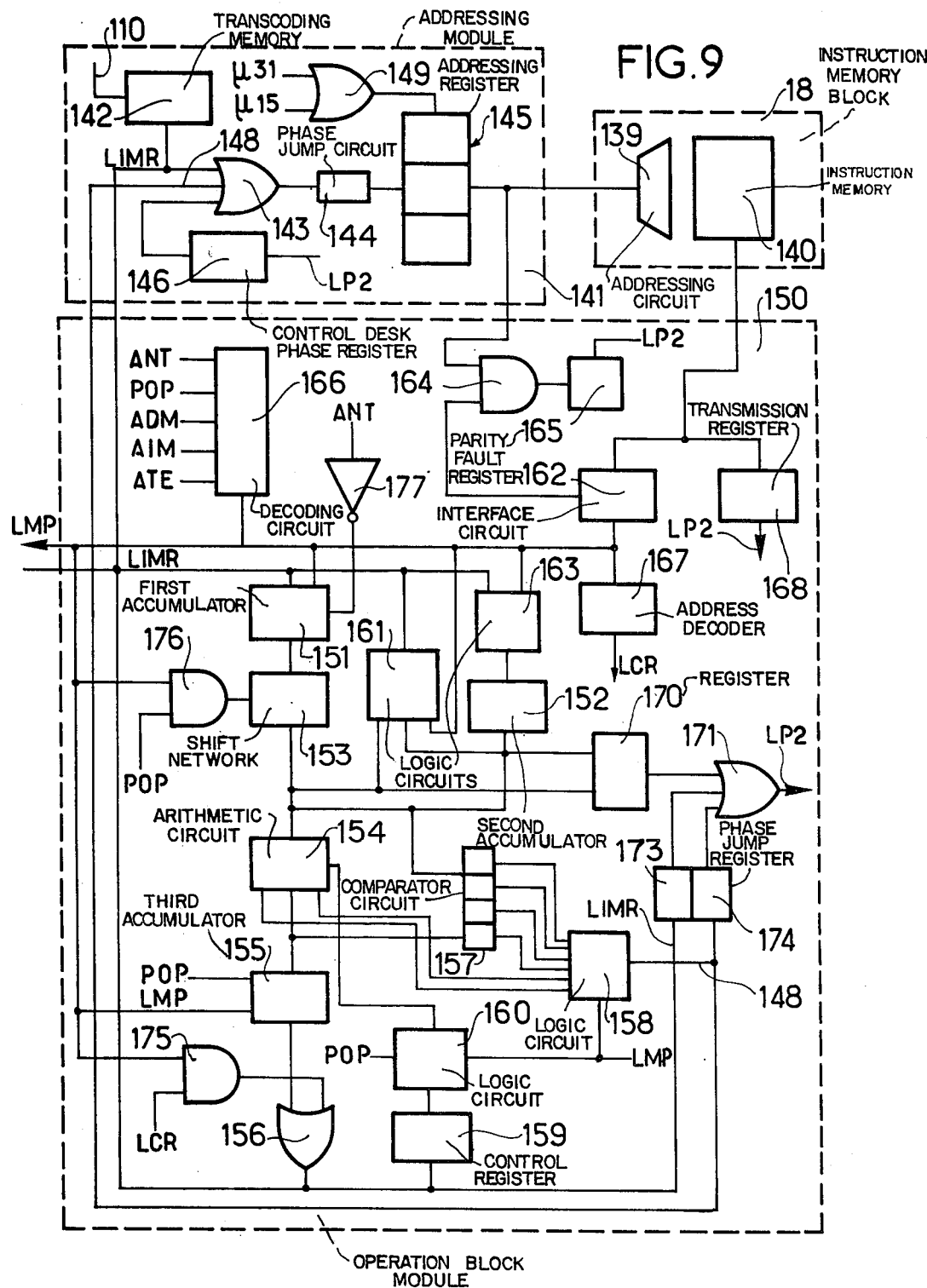

FIG.10

| | 4 | 8 | 12 | 16 | 20 | 24 | 28 | 32 | 36 | 40 | 44 | 48 |
|---|---|---|---|---|---|---|---|---|---|---|---|---|
| 1 | ANT M | P4 | P3 | P2 | P1 | SPH4 | SPH3 | SPH2 | SPH1 | SPH0 | R M S I I | I M P |
| 2 | POP M0 C AD1 AT | | | A↕B C DEC | BUS CAL | C C E S | S P H1 SPH2 | SPH1 | | SPH0 | R M S I I | I M P |
| 3 | ADM E/L C AD1 AT | ADME | | SEC | A C | | P | | | SPH1 | R P S H I I | I M P |
| 4 | AIM E/L C AD1 AT | | B U S | B A C T S B O | | A C | | P | | SPH1 | R S I | I M P |
| 5 | ATE E/L T C E E S M S A T 0 1 | ADME | | SEC | A C | Ad TES | | SEC V E H d 1 | C A C H T 2 | SPH1 | R L S I | I M P |

FIG. 26

| | | | 4 | | 8 | | 12 | | 16 | 20 | 24 | 28 | 32 | 36 | 40 | 44 | | 48 |
|---|---|---|---|---|---|---|---|---|---|---|---|---|---|---|---|---|---|---|
| 1 | TAH | M | P4 | | P3 | | P2 | | P1 | SPH4 | SPH3 | SPH2 | SPH1 | | SPH0 | | | IMP |
| 2 | OPE | MO | AD1 | A | AD2 | B | C | DEC | | CAL | CE CS CH SPI | P/SPH2 | SPH1 | | SPH0 | | CB | IMP |
| 3 | AMT | EL | AD1 | A | PAG | ADMT | | SCT | | | P | | | | SPH | BUS | CB | IMP |
| 4 | AES | | AD1 | A | | AD2 | B | AD3 | | | P | | | | SPH | BUS | CB | IMP |

CONTROL UNIT FOR A TIME-DIVISION TELECOMMUNICATIONS EXCHANGE

This invention relates a time-division telecommunications exchange.

A known time-division exchange switches pulse code modulated calls and includes specialised control units such as: a plurality of small capacity "multi-registers", markers, translators and call-charging circuits. Each such unit has a definite structure which does not always enable the unit to be easily adapted to extentions of the exchange equipment as the exchange capacity is increased to meet changing requirements. Such an exchange is described in the following articles:

1. Système de communication électronique temporelle (project PLATON) by PINET (A), MARTIN (J), REVEL (M) in COMMUTATION et ELECTRONIQUE N°12 - March 1966 pages 22 to 46.

2. Centre de commutation électronique temporelle (project PLATON) by PINET (A), POULIQUEN (J), REVEL (M) in COMMUTATION et ELECTRONIQUE N°23 - October 1968 page 22 to 42.

3. La commutation électrique temporelle by TALLEGAS (F) JACOB (JB) ARPIN in TOUTE L'ELECTRONIQUE - JUNE 1972 pages 51 to 55, July 1972 pages 17 to 22, October 1972 pages 25 to 30.

4. Introduction of Integrated POM Switching in the French Telecommunication Network in INTERNATIONAL SYMPOSIUM at Cambridge (Mass.) 1972 pages 470 to 475 published in New York by IEEE 1972.

5. Le système de commutation électronique temporelle E10 - AFCET Congress at Rennes 1973 in INFORMATIQUE et TELECOMMUNICATIONS pages 151 to 161 published in Paris by AFCET 1973.

The aim of the invention is to provide a time-division telecommunications exchange with control units which adapt better to the extension of the exchange.

The present invention provides a time-division telecommunications exchange comprising a switching network, connection units, a time base, and a monitoring unit connected to a data processing centre, characterised by the fact that it comprises at least one control unit constituted by a multi-register portion and a dialogue portion connected via a dialogue bus to the said multi-register portion which sets up and clears down traffic, the said dialogue portion providing connections between the multi-register portion and the switching network and the connecting units, the said control unit being connected to the switching network by network lines and by function lines, to the connection units by test lines and by marking lines and to the monitoring unit by monitoring lines, the said control unit replacing the specialised units usually used in a time-division exchange.

According to another characteristic the time-division telecommunications exchange comprises two control units, one being a master and the other a slave, the said control units being connected to each other by dialogue lines.

According to another characteristic the multi-register portion comprises a macroprogram memory and two multi-register assemblies, the said macroprogram memory being connected to both the multi-register assemblies which are themselves connected by a dialogue bus to the dialogue portion, the said macroprogram memory containing macroinstructions of 48 bits each and of which the first 8 bits constitute a function field defining the macroinstruction.

Figure 4:
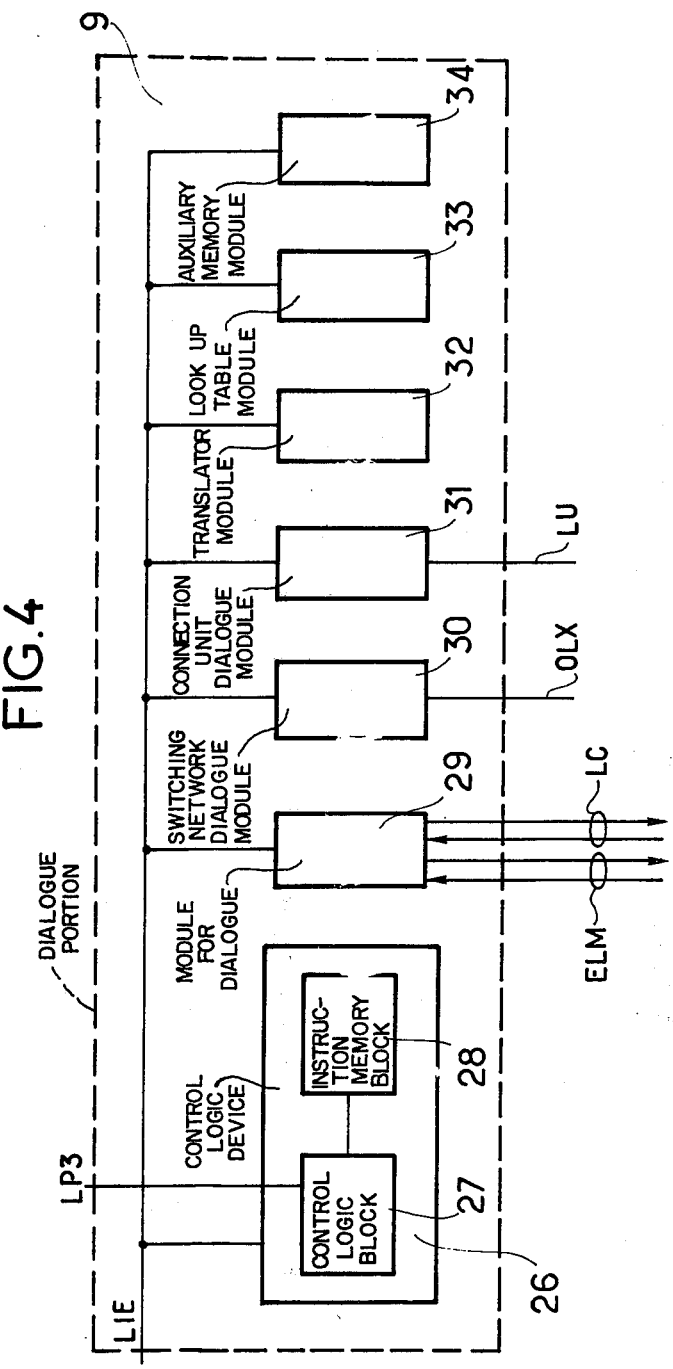
Figure 5A:
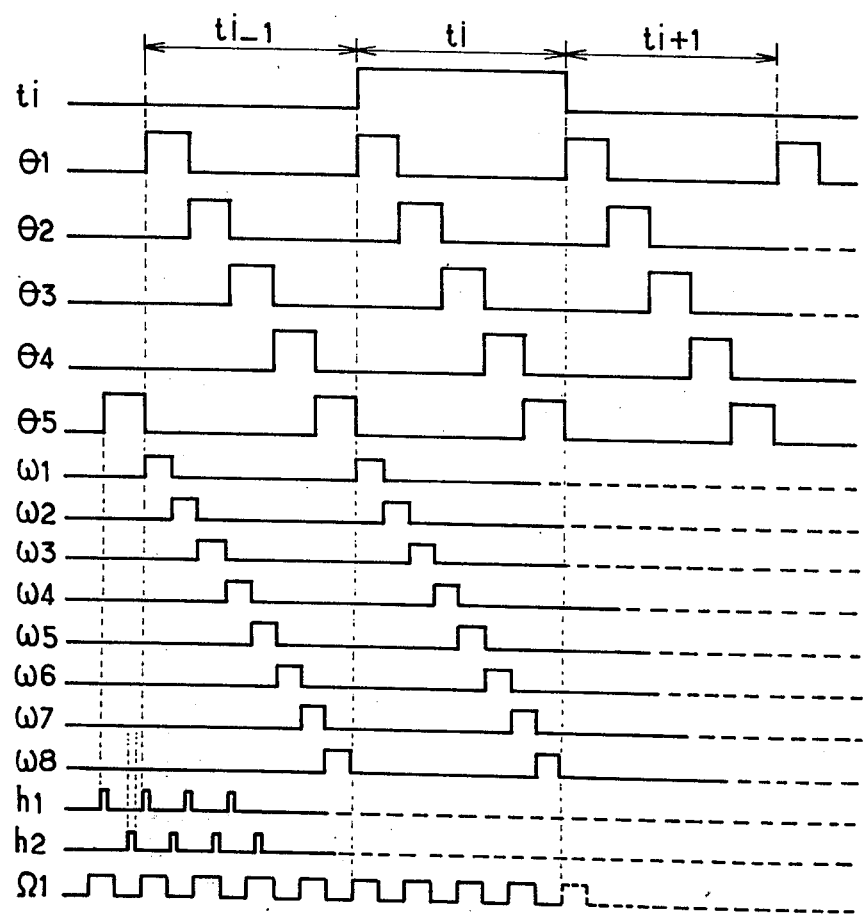
Figure 5B:
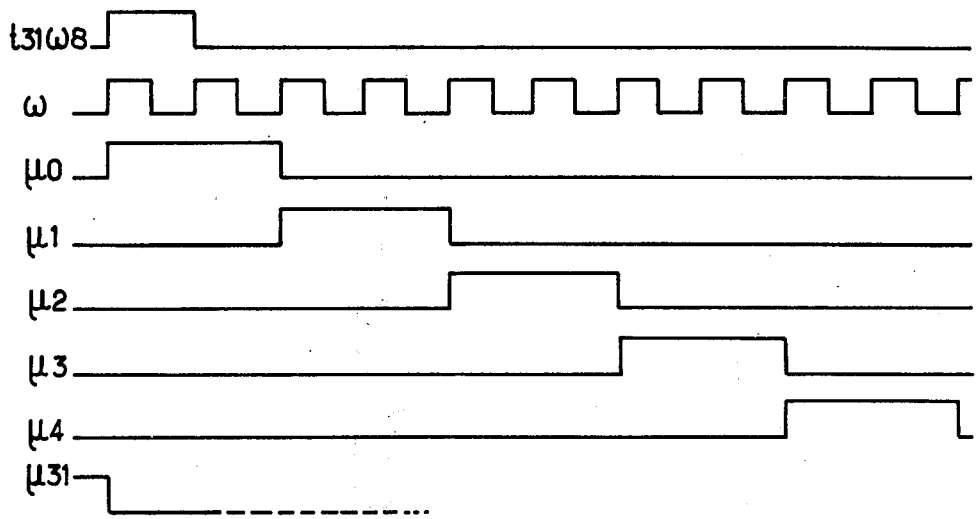
Figure 5C:
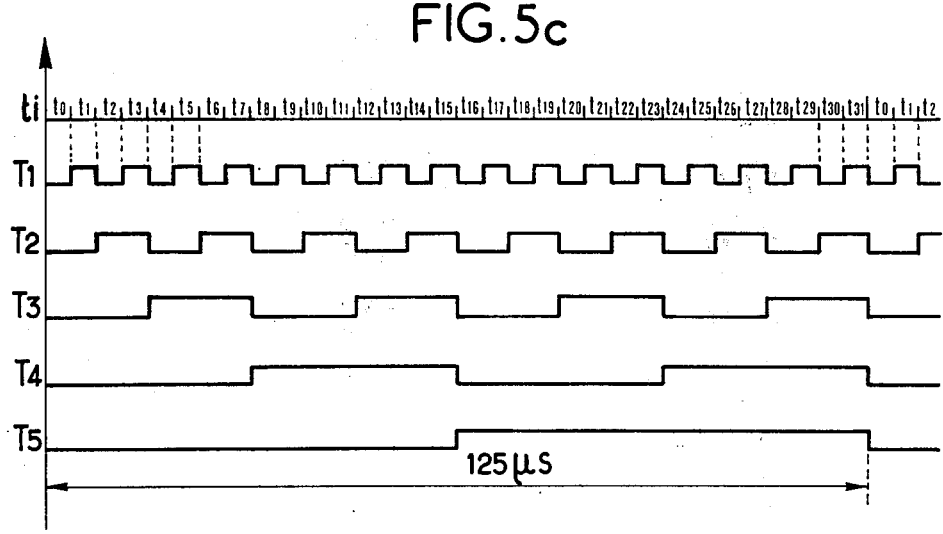
Figure 6A:
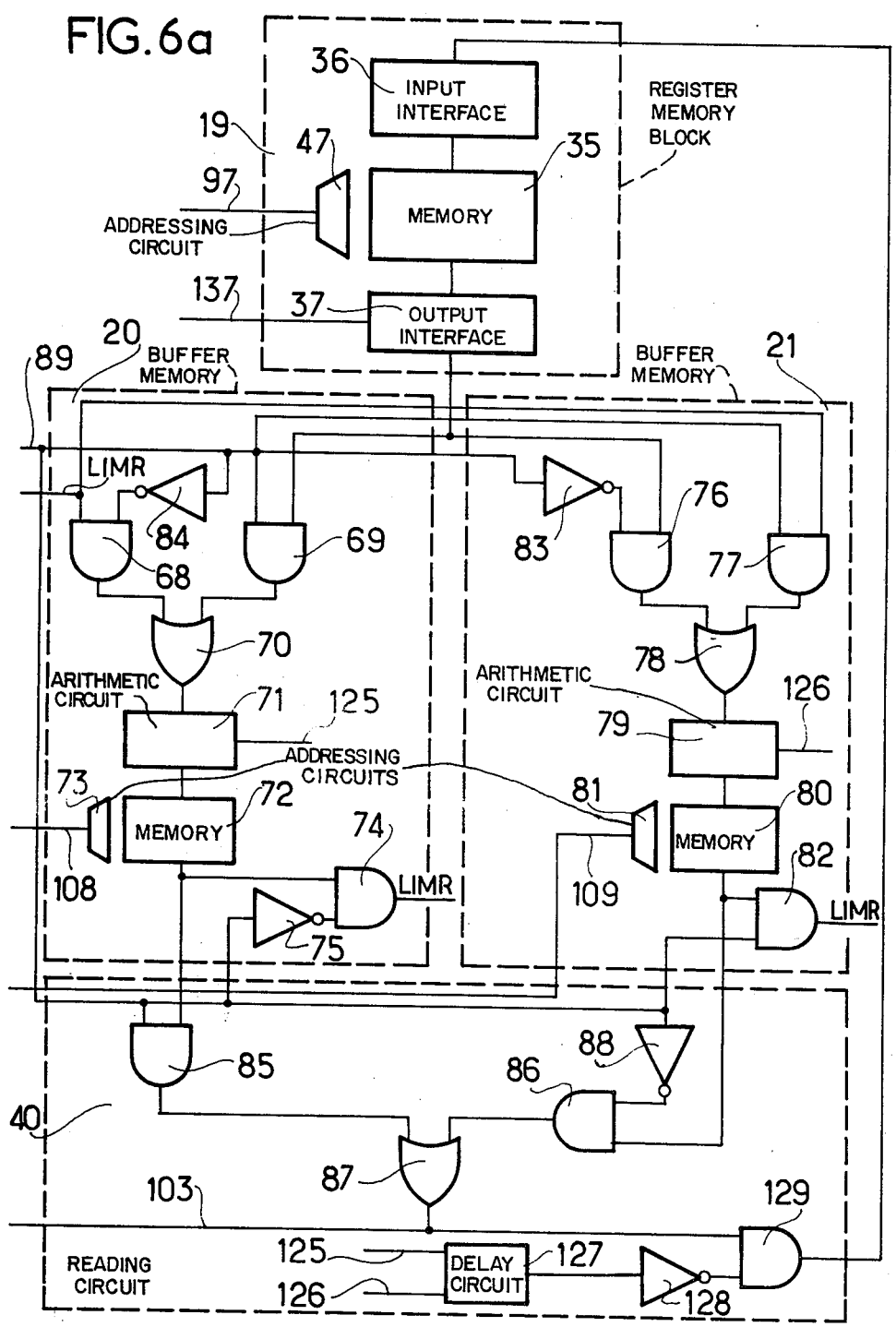
Figure 11:
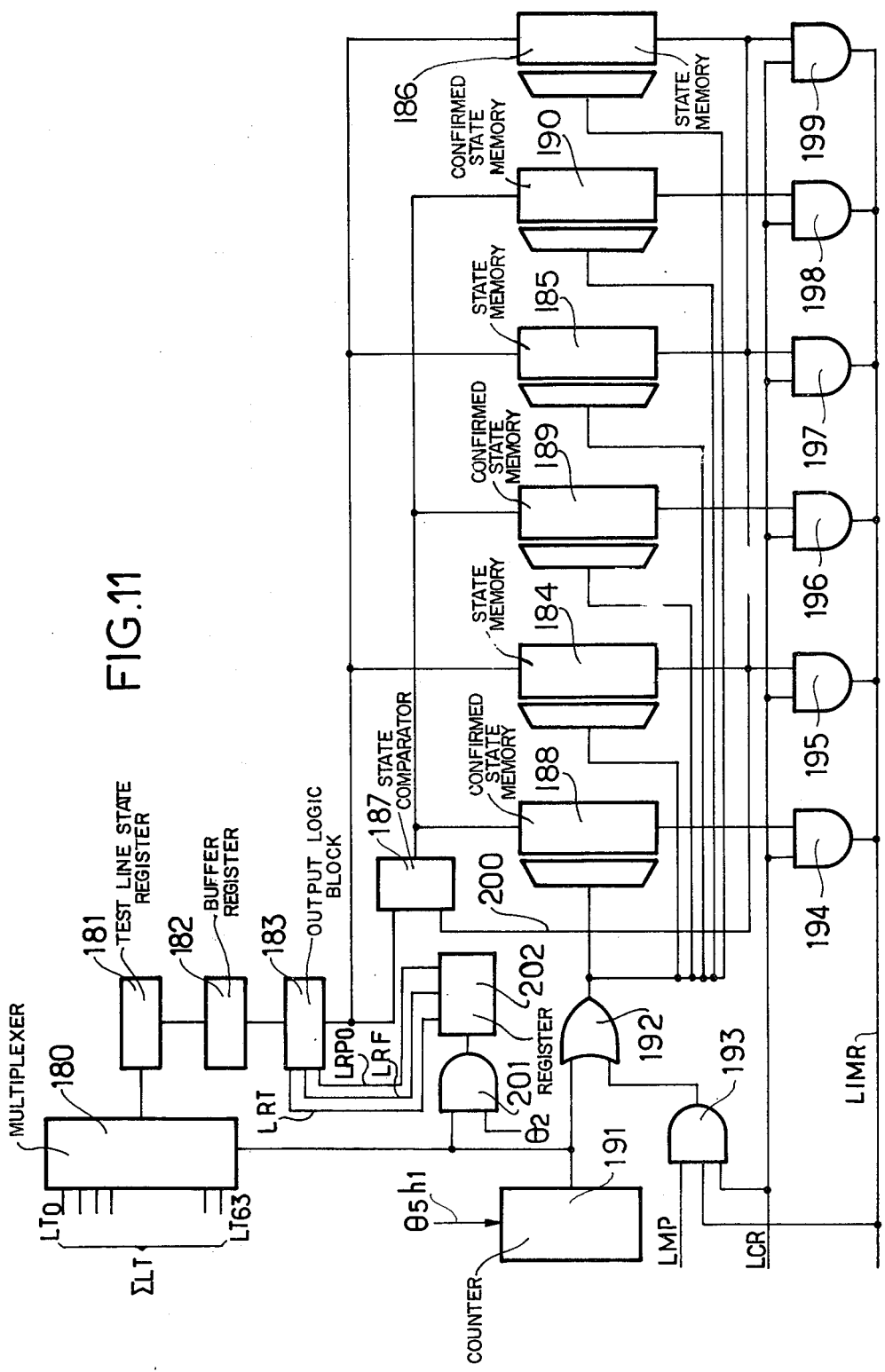
Figure 12:
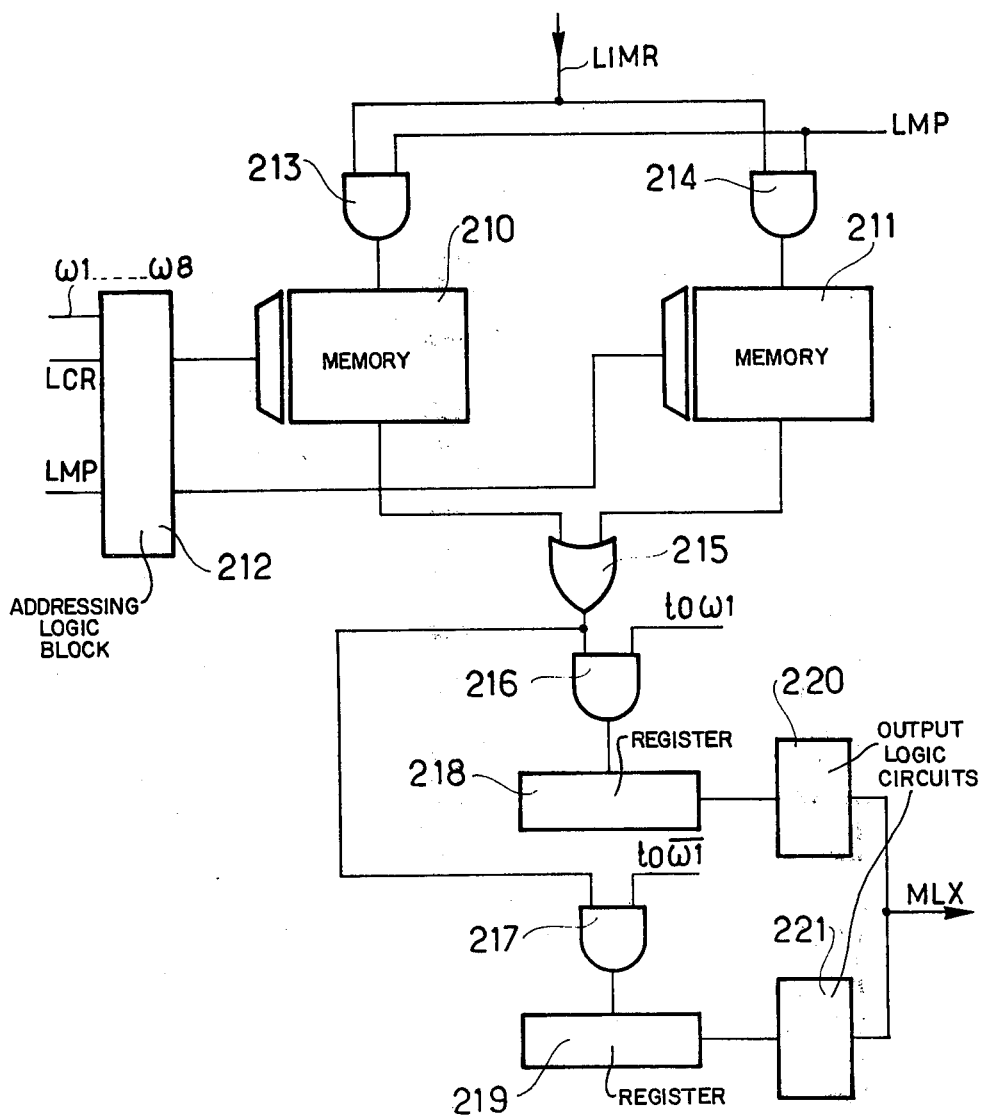
Figure 13:
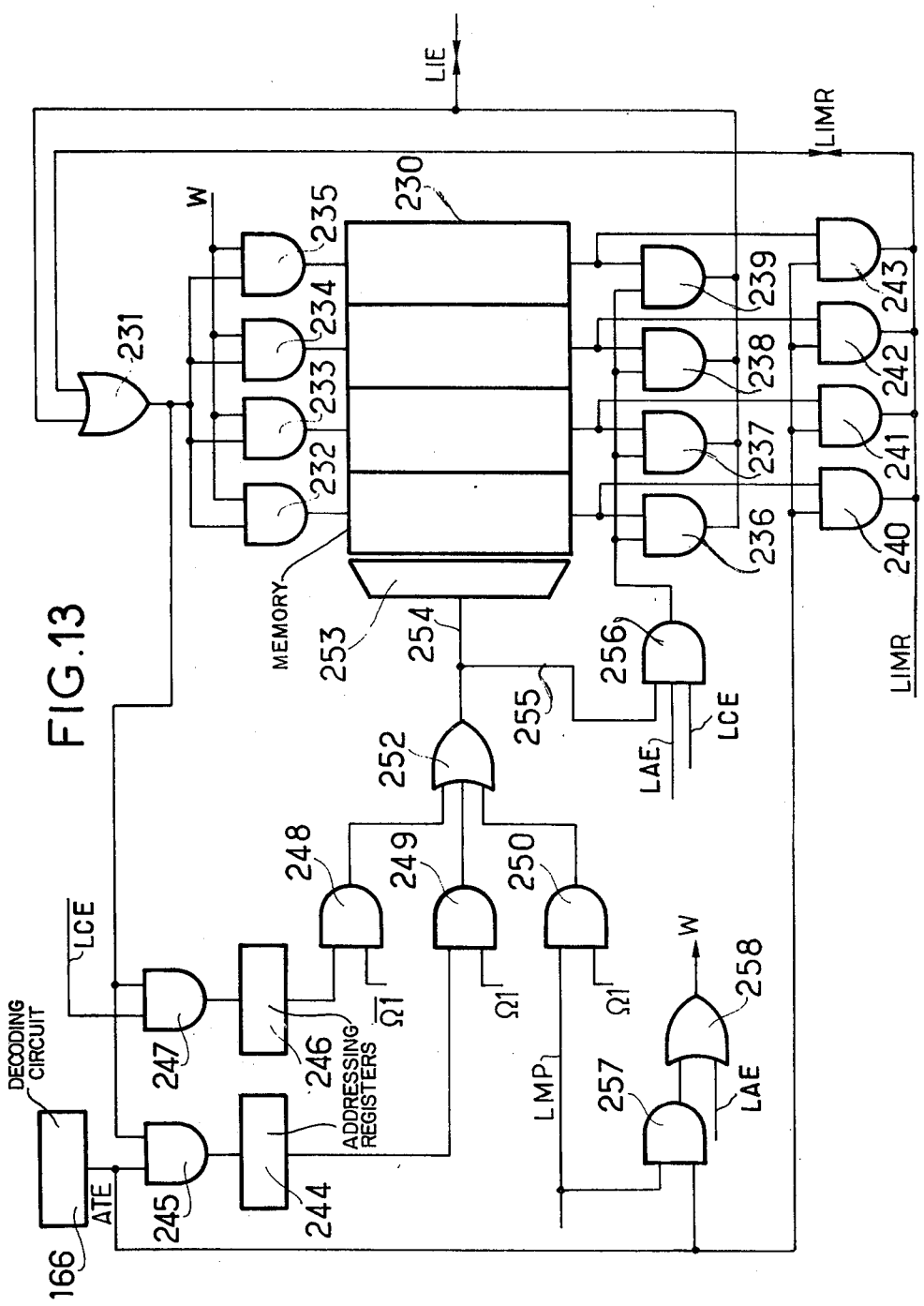
Figure 14:
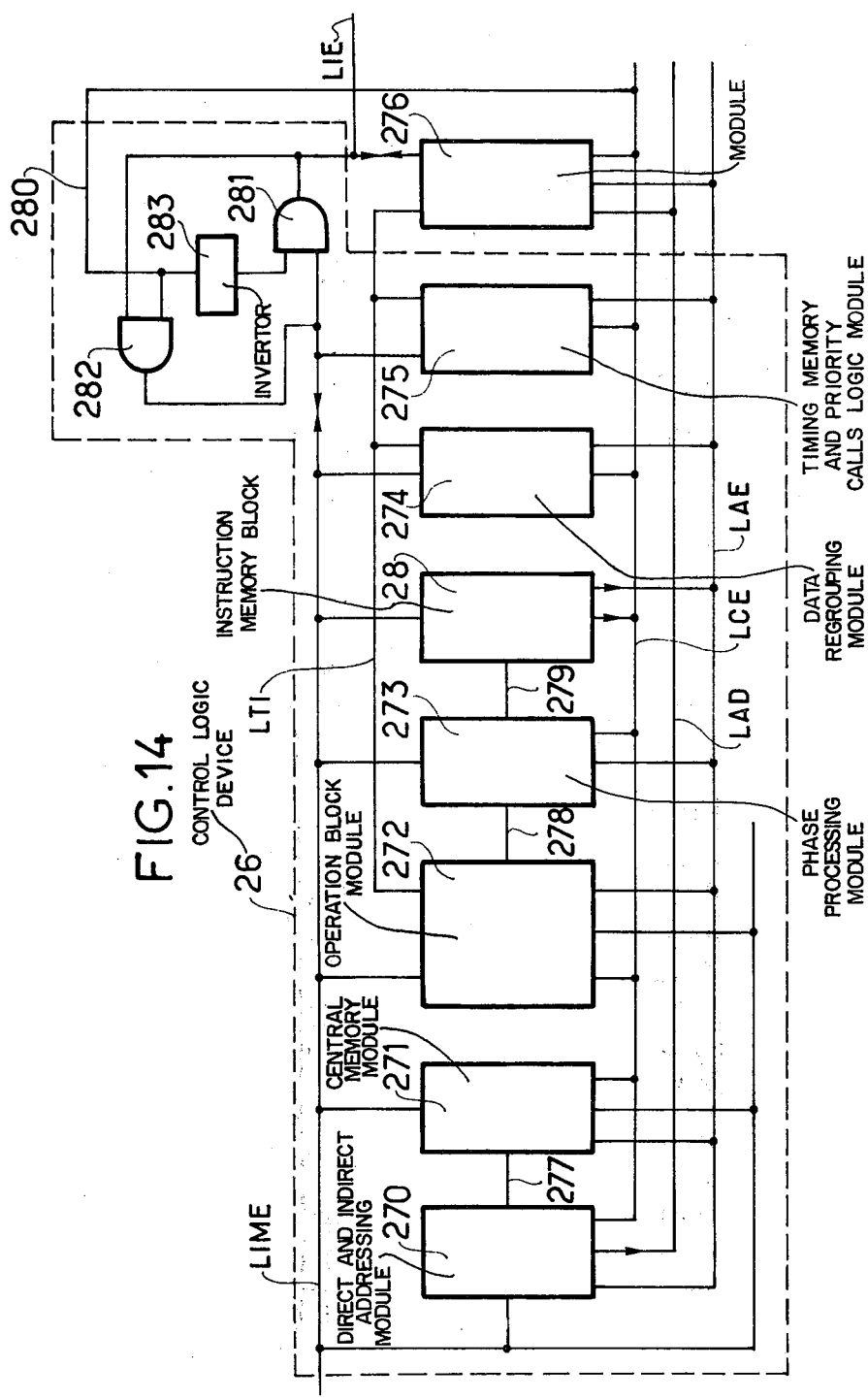
Figure 15:
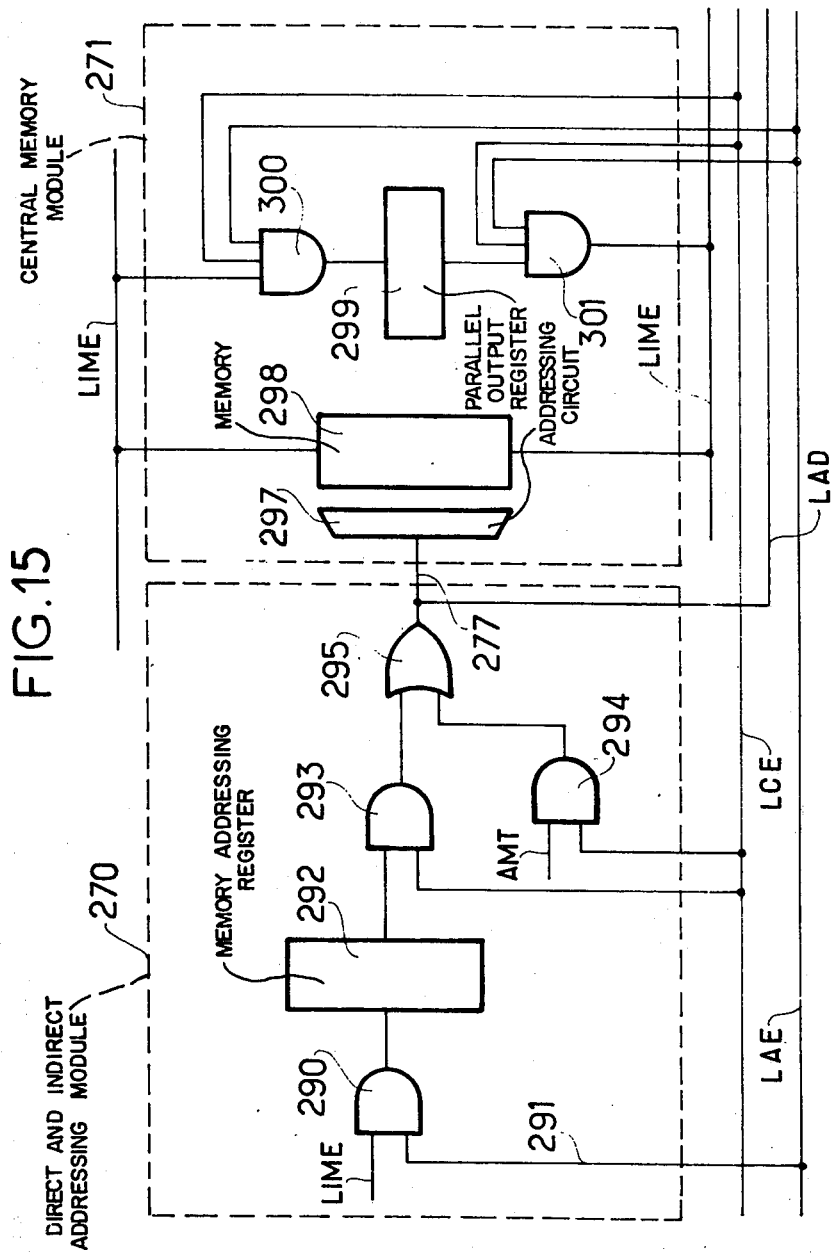
Figure 16:
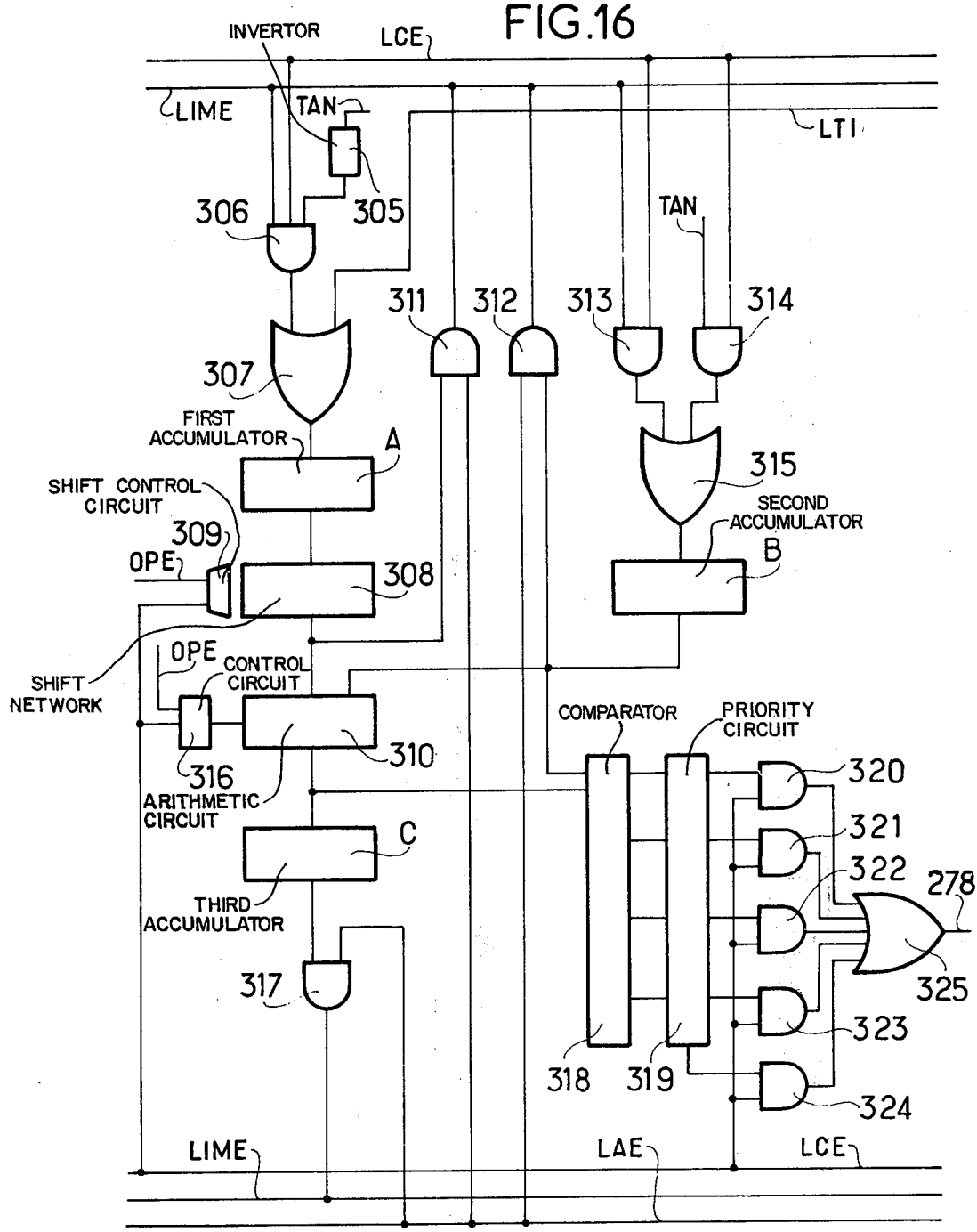
Figure 17:
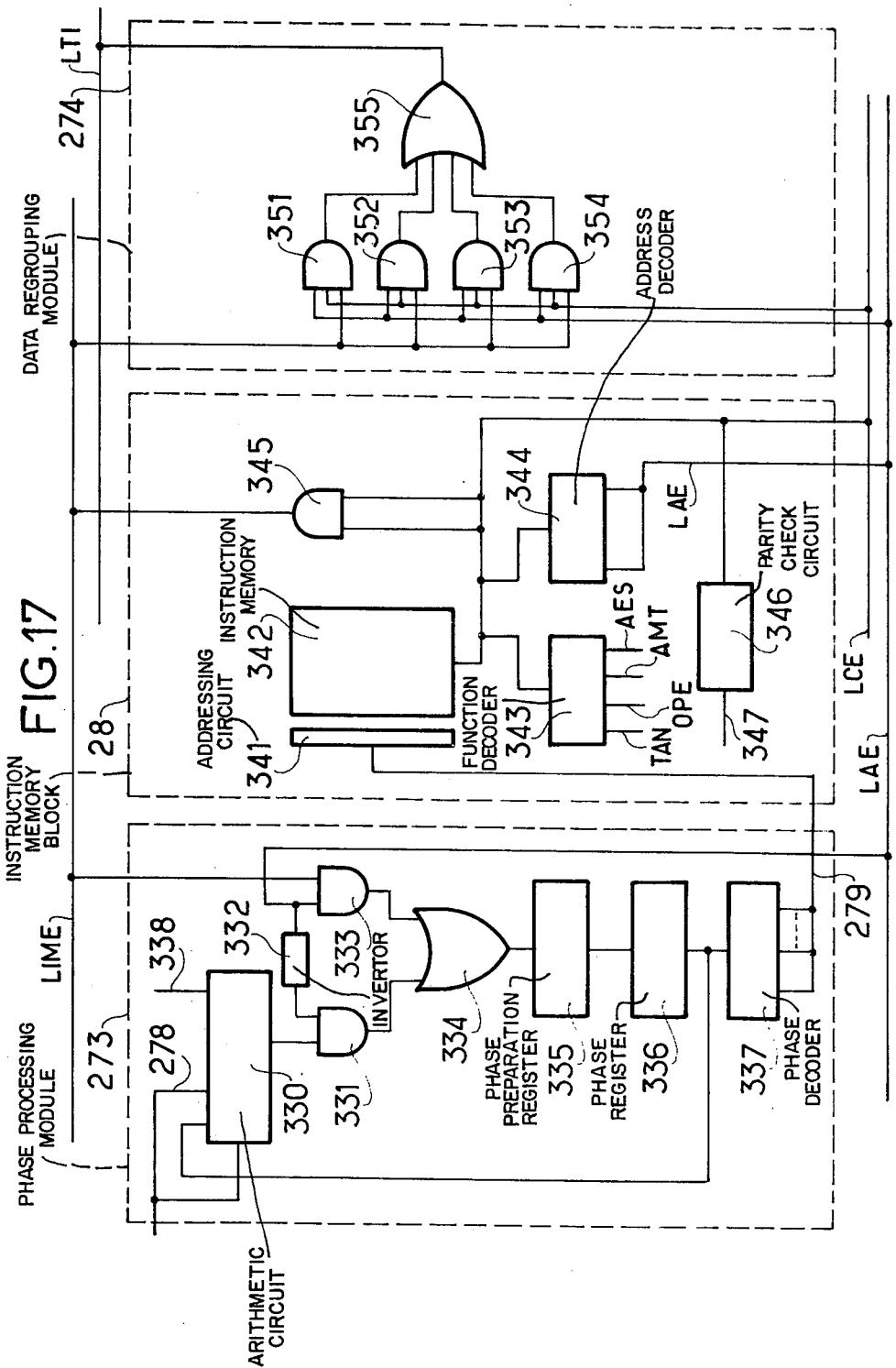
Figure 18:
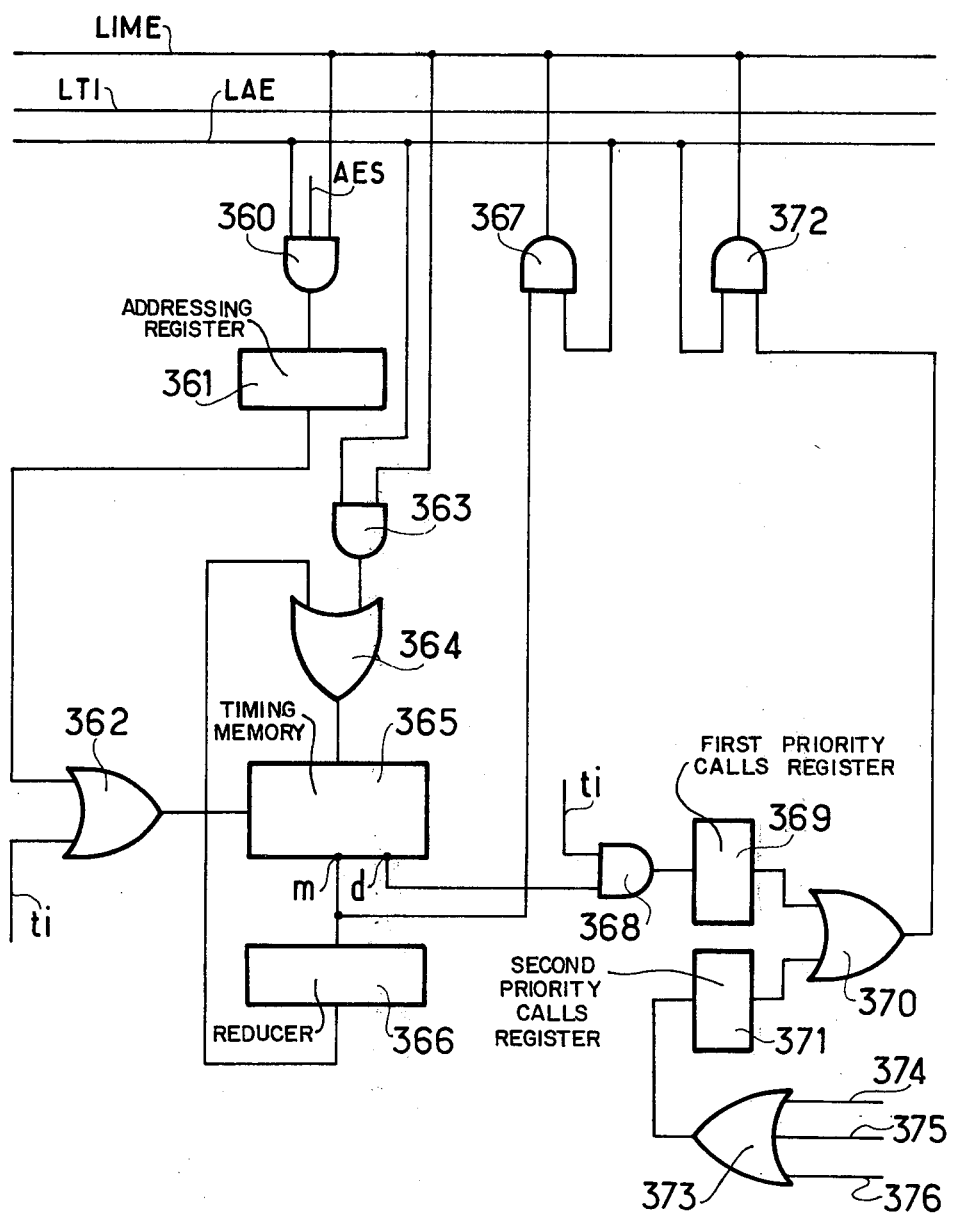
Figure 19:
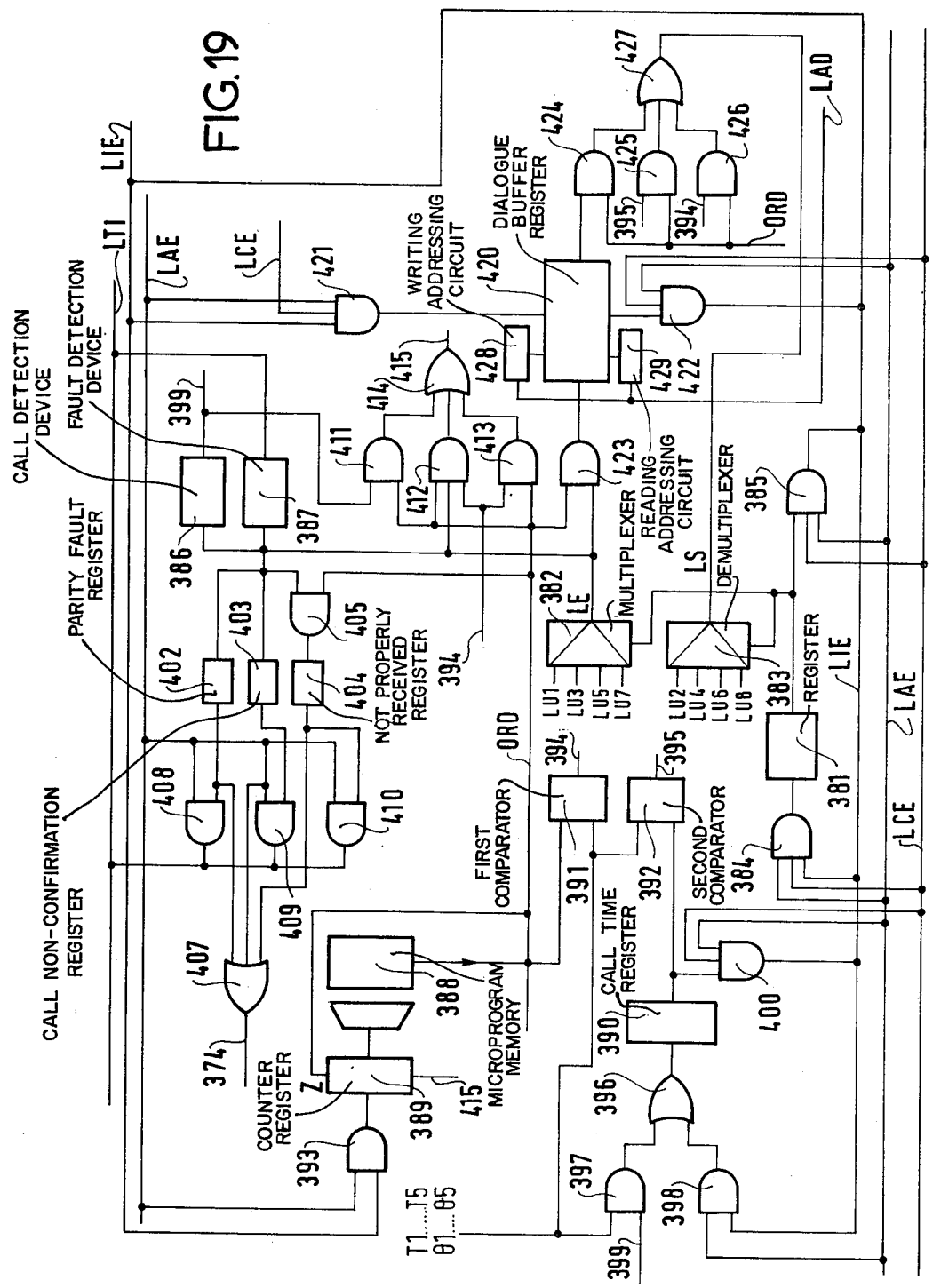
Figure 20:
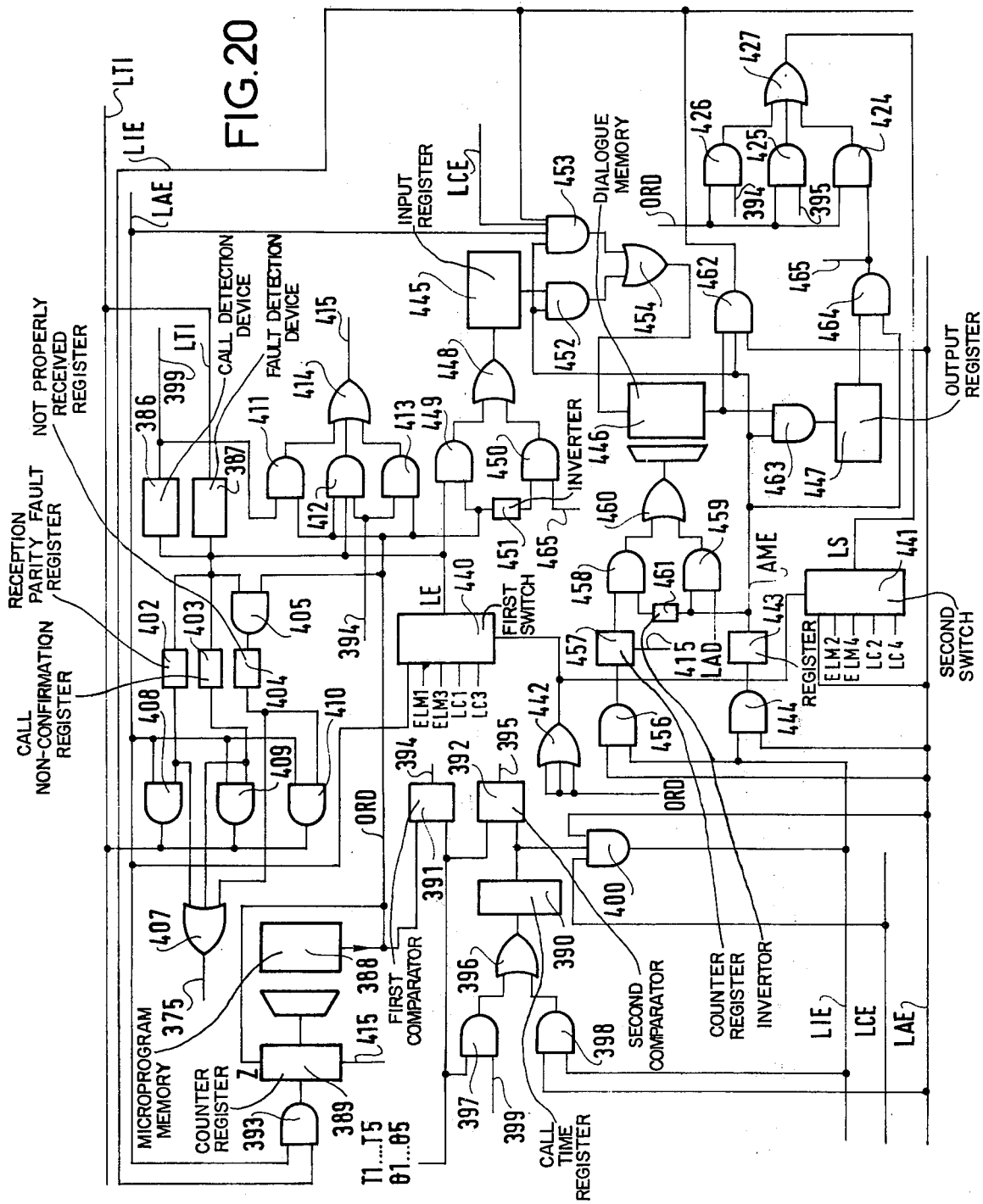
Figure 21:
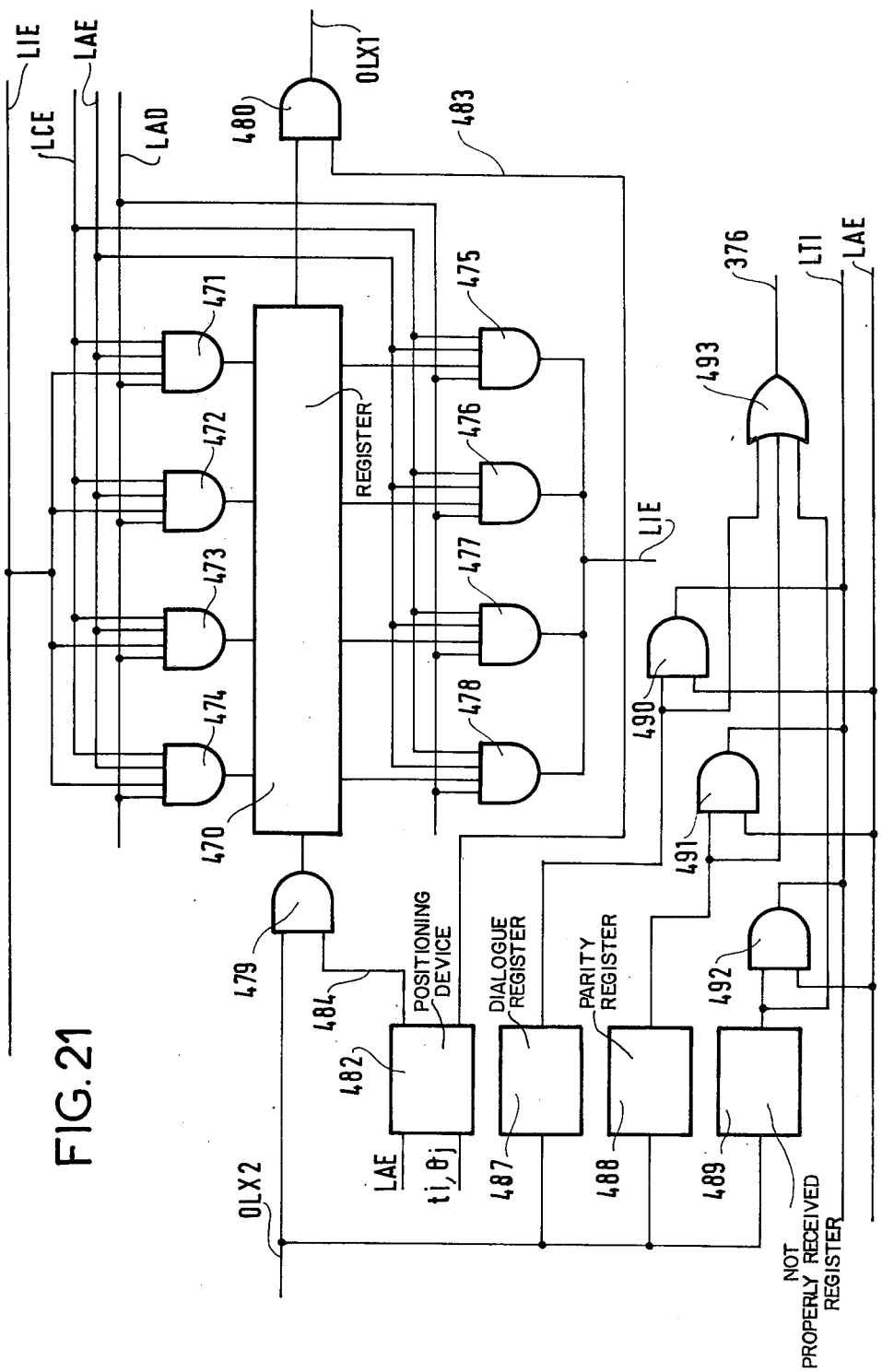
Figure 22:
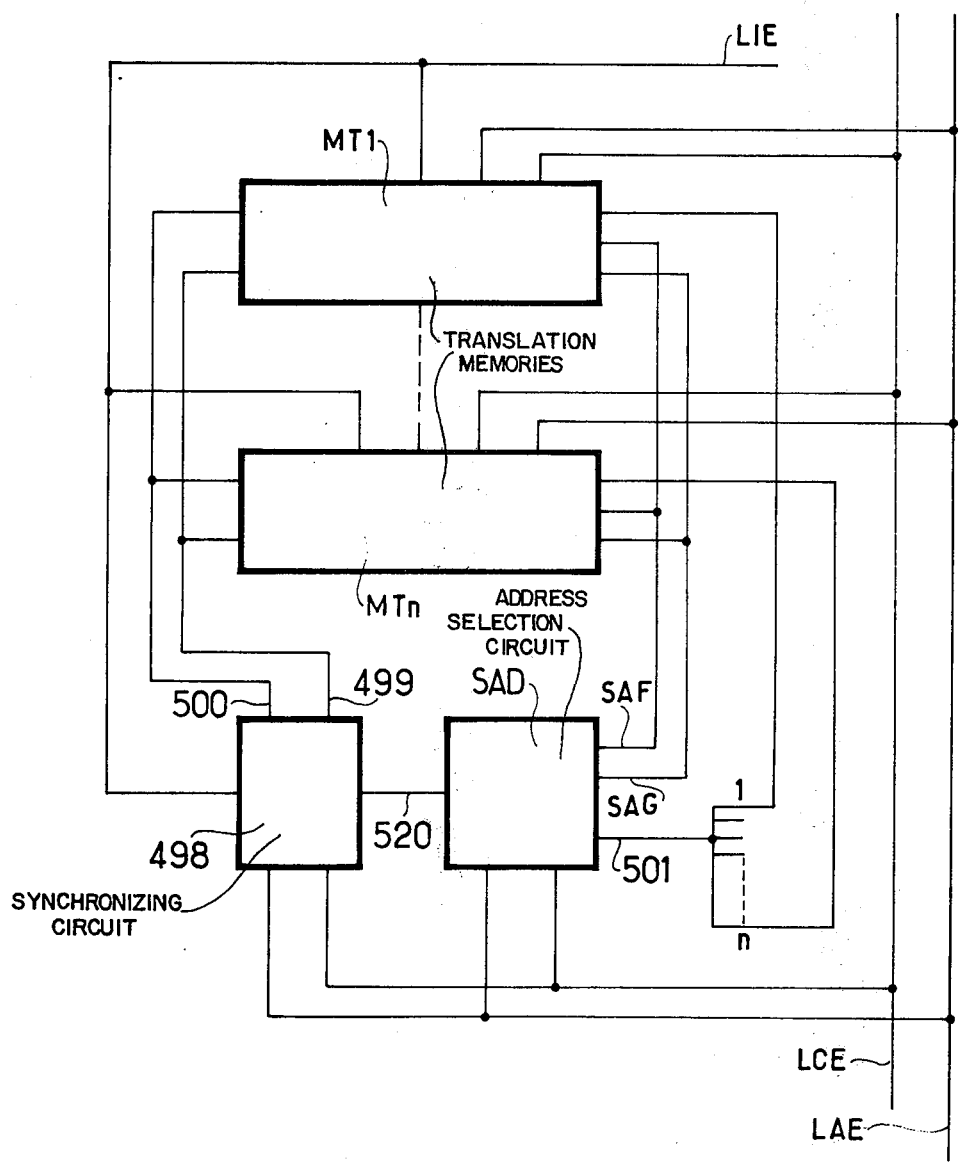
Figure 23:
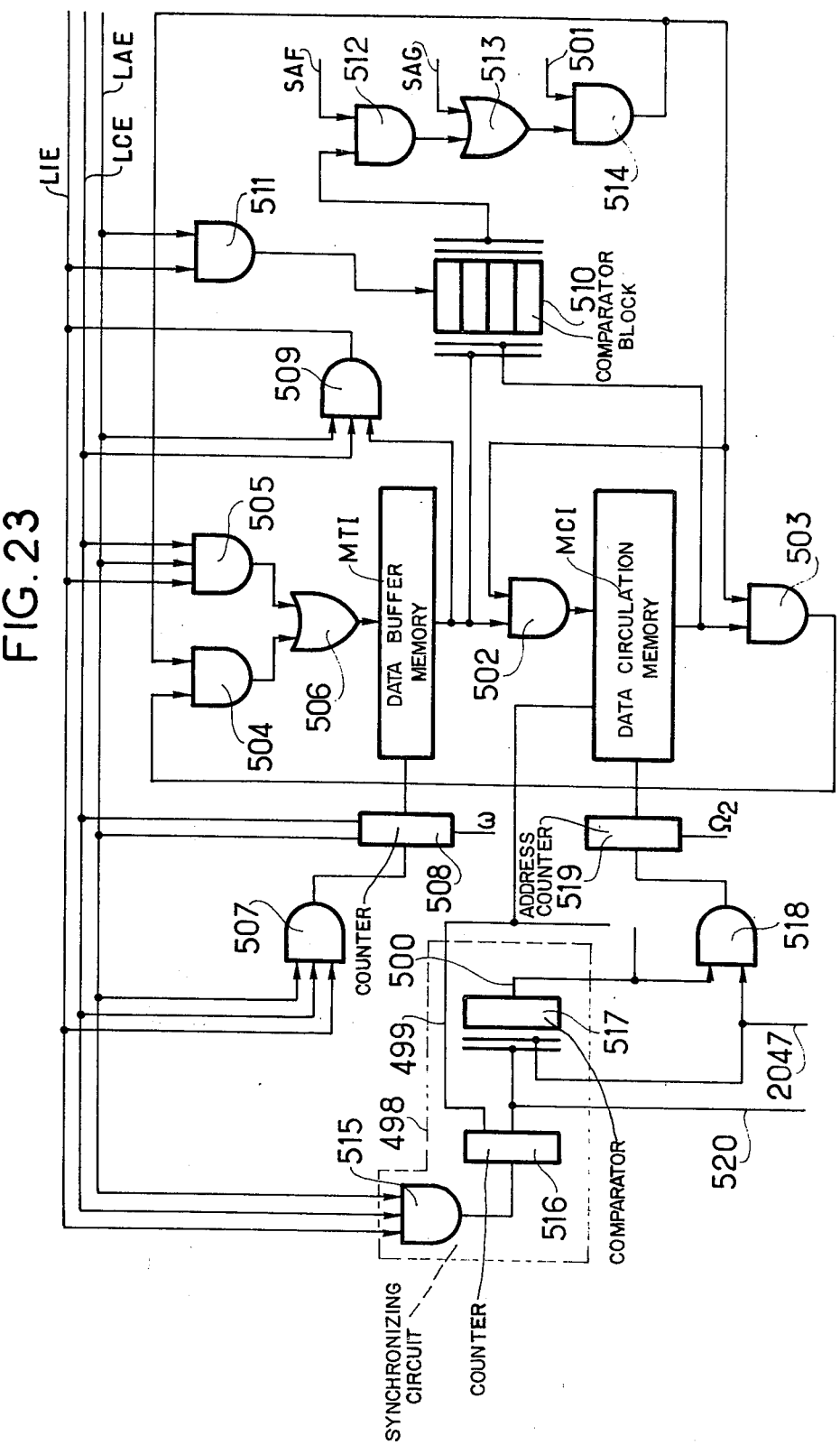
Figure 24:
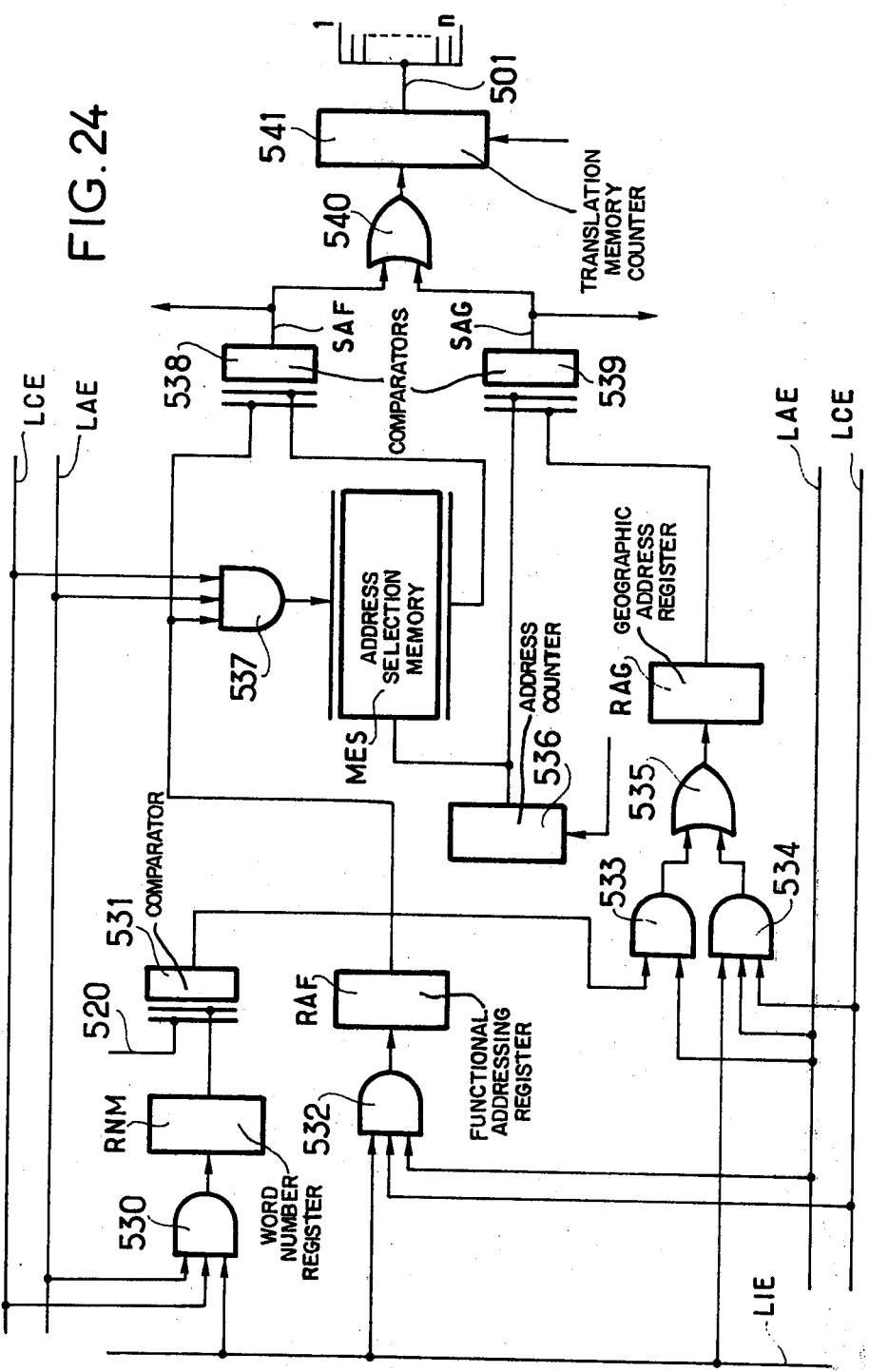
Figure 25:
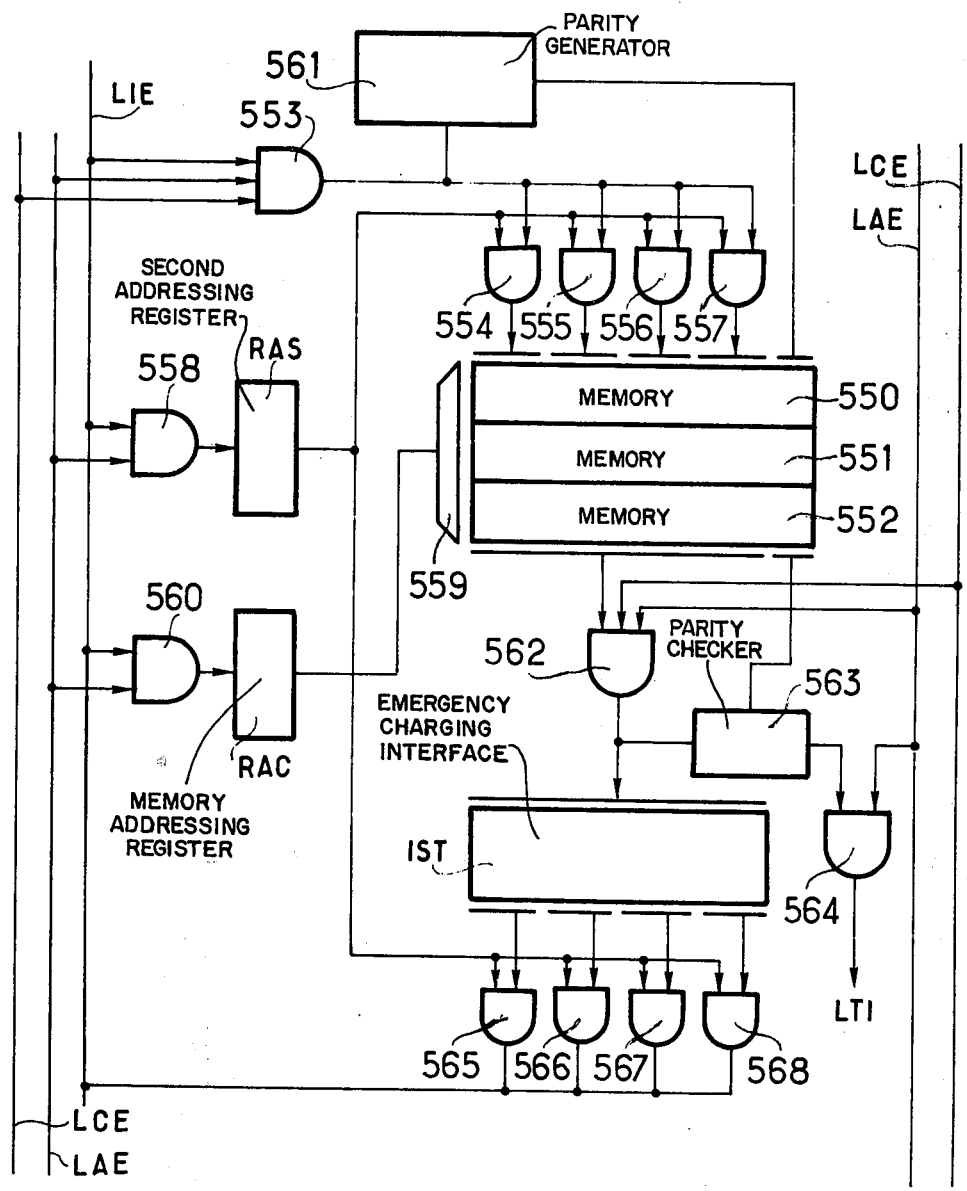

Other characteristics of the invention will appear from the following description of an embodiment of the invention described by way of example with reference to the accompanying drawings, in which:

FIG. 1 shows a telecommunications exchange embodying the invention;
FIG. 2 is a block diagram of a control unit;
FIG. 3 shows a multi-register portion;
FIG. 4 shows a dialogue portion;
FIGS. 5a and 5c show the signals of the exchange time base;
FIG. 5b shows the signals of a clock module of a multi-register;
FIG. 6a shows a register memory block and the buffer memories with their output circuit;
FIG. 6b shows the circuit for addressing the register memory block and the buffer memories;
FIG. 7 shows the macroprogram memory and the access block to a multi-register;
FIGS. 8a, 8b and 8c show the format of the macroinstructions;
FIG. 9 shows an instruction memory block and the control logic;
FIG. 10 shows the format of the multi-register instructions;
FIG. 11 shows the signalling receiver module;
FIG. 12 shows the signalling transmitter module;
FIG. 13 shows an input/output module;
FIG. 14 shows the control logic device;
FIG. 15 shows the direct and indirect addressing module and the central memory module;
FIG. 16 shows the operation block module;
FIG. 17 shows the phase processing module, the instruction memory module and the data regrouping module;
FIG. 18 shows the timing memory module and the call priority module;
FIG. 19 shows the connection unit dialogue module;
FIG. 20 shows the module for dialogue between the two control units;
FIG. 21 shows the switching network dialogue module;
FIG. 22 shows the translator module;
FIG. 23 shows a translation memory and the synchronising circuit;
FIG. 24 shows the circuit for selecting the address of the translation memory;
FIG. 25 shows auxiliary memory module; and
FIG. 26 shows the format of the dialogue portion instructions.

FIG. 1 shows a telecommunication exchange embodying the invention. The exchange comprises a switching network 1, connection units such as 2 and 3 whose number is a function of the size of said exchange, two control units 4 and 5, a time base 6, and a monitoring unit 7. The monitoring unit 7 is connected to a data processing centre CTI.

The connection units connect the exchange to the outside world; these connections are provided by multiplexes MX; thus, there are connection units for connecting local subscribers directly to the exchange, connection units for connecting distant concentrators, connection units for connecting PCM exchanges, connection units for connecting electromechanical exchanges, and connection units for connecting operator positions and tone dialling telephones. These connection units, as well as the switching network are known and are not part of the subject matter of this invention. The connections of the connection units with the switching network are standardized; these connections are, for each connection unit: two input multiplexes LRE0 and LRE1, two output multiplexes LRS0 and LRE1 and two signalling multiplexes LVS0 and LVS1.

For security reasons, there are two identical control units 4 and 5; each control unit comprises a multi-register portion and a dialogue portion. Each connection unit is connected to the multi-register portion 8 by a test line LT and to the dialogue portion 9 by a marking line LU; each multi-register portion 8 is connected to the switching network 1 by a network line MLX; each dialogue portion 9 is connected to the switching network by a function line OLX; the dialogue portions of the two control units 4 and 5 are connected together by dialogue lines ELM and to the monitoring unit 7 by monitoring lines LC; the monitoring unit 7 is connected to each connection unit by a connection unit monitoring line LCU; the time base distributes the clock pulse necessary for their operation to all the units of the PCM exchange. The connections which connect the control units 4, 5 to the switching network 1 and to the connection units 2, 3 replace those of the prior art which connected multi-registers and the markers to the switching network and to the connection units and which therefore do not need to be modified.

The two control units 4 and 5 operate on a traffic sharing basis, but in the event of failure of one control unit, the other control unit controls all of the traffic.

FIG. 2 is a block diagram of a control unit, such as 4 for example; the multi-register portion 8 comprises a macroprogram memory 13, and two identical multi-register assemblies 10 and 11; the macroprogram memory 13 is connected to the two multi-register assemblies 10 and 11. For convenience's sake, a multi-register assembly will be referred to as a multi-register in the following part of the description, but this does not imply any similarity with known elements. In control units, the dialogue portion 9 is connected by a dialogue bus LIE to the two multi-registers 10 and 11.

FIG. 3 represents a multi-register portion by means of a block diagram of the multi-register 10 which comlprises: a logic control assembly 15 constituted by a macroprogram memory access block 16, a logic control block 17 and an instruction memory block 18; the multi-register further comprises a register memory block 19 associated with a buffer memory block 14, a signalling receiver module 22, a signalling transmitter module 23, an input/output module 24 and a clock module 25. The access block 16, the control logic block 17, the buffer memory block 14, the signalling receiver modules 22, the signalling transmitter modules 23, and the input/output modules 24 are interconnected by a multi-register data bus LIMR. The multi-register 11 is identical to the multi-register 10; the input/output modules 24 of the multi-registers 10 and 11 are connected to the dialogue bus LIE which connects the two multi-registers 10 and 11 to the dialogue portion 9. The access block 16 and the control logic block 17 are connected to the macroprogram memory 13 by a wire 110 and by respective control desk lines LP1 and LP2 to an exchange control desk; the buffer memory block 14 being connected to the desk by a wire 116; the signalling receiver module 22 is connected to the connection units by test lines LT (one per connection unit) and the signalling transmitter module is connected to the switching network by the network line MLX.

FIG. 4 is a block diagram of the dialogue portion 9 which comprises a control logic device 26 comprising a control logic block 27 and an instruction memory block 28, a module for dialogue between the two control units 29, a switching network dialogue module 30, a connection unit dialogue module 31, a translator module 32, a lock-up table module 33, and an auxiliary memory module 34. The control logic block 27 and the modules 29 to 34 are connected to the dialogue bus LIE which connects the dialogue portion to the multi-register portion shown in FIG. 3.

The control logic block 27 is connected by a control desk line LP3 to the control desk of the exchange.

The dialogue module 29 is connected to the monitoring unit 7 by monitoring lines LC and to the dialogue module of the dialogue portion of the other control unit by dialogue lines ELM.

The switching network dialogue module 30 is connected to the switching network 1 by function lines OLX.

The connection unit dialogue module is connected to the connection units by marking lines LU.

In broad terms the multi-register portion 8 of each control unit performs the functions that have previously been performed by a plurality of multi-registers. That is to say it governs the setting up and clearing down of calls. In general, it communicates with the exchange proper via the dialogue portion 9 which performs many of the functions previously performed by markers. But even though the embodiment described is directly compatible with existing equipment and can take the place of existing multi-registers and markers, it is important, in both cases; not to take the anology too far. For example, the dialoque portion 9 acts as the translator and also deals with call charging. Also by way of exception of the general rule that the multi-register portion 8 communicates via the dialogue portion 9, there are direct links (the test line LT and the network lines MLX) between the multi-register portion 8 and the rest of the exchange. These direct links are for signalling operations that require more precise timing than it is easy to achieve via the intermediary of the dialogue portion 9.

The exchange is program controlled. At a first level of program control there is a "macroprogram" which is stored in the macroprogram memory 13. This "macroprogram" is intended to be written in an assembler language using a mnemonic notation for subsequent conversion into binary machine code by a suitably programmed general purpose computer. At a second level of program control both the multi-register portion and the dialogue portion are microprogrammed machines. However, to avoid confusion with a third layer of program control, this second layer is referred to without either of the prefixes "macro" or "micro". The prefix "micro" is hereinafter reserved for modules of the dialogue portion which are also microprogrammed but which are under control of the "program" (itself a microprogram) of the dialogue portion and thus constitute the third layer of program control.

One of the purposes of the present separation between the first (macro) and second (no prefix) levels of programming is to provide equipment which is compatible with present PCM exchange hardware but which offers the possibility of being rendered compatible with future or different PCM exchange hardware without needing modifications to the first (macro) level of programming. All the necessary modifications would be at the second level only, or possibly at the third level as well. This is especially true of modifications to cope with alterations in such features as message formats or interface procedures.

Before describing a multi-register and a dialogue portion in detail, the various clock pulses which are used in the PCM exchange will first be presented, these pulses being known already, as is the production thereof.

FIG. 5a is a set of waveforms of the clock signals provided by the exchange time base 6;

$ti$ is a signal of 3.9 microseconds duration with a frequency of 8 kHz and a period of 125 microseconds; this signal is related to one time slot; if for example a multiplex frame comprises 32 time slots there are 32 signals $ti$ which are naturally shifted with respect to each other by 3.9 microseconds.

$\theta 1, \theta 2, \theta 3, \theta 4$ and $\theta 5$ are signals of 780 nanoseconds duration with a period of 3.9 microseconds; these signals are shifted with respect to each other by 780 nanoseconds.

$\omega 1$ to $\omega 8$ are signals of 490 nanoseconds duration with a period of 3.9 microseconds; these signals are shifted with respect to each other by 490 nanoseconds.

$h1$ and $h2$ are signals of 120 nanoseconds duration with a period of 780 nanoseconds; they are shifted with respect to each other by 300 nanoseconds.

1 is a signal of 490 nanoseconds duration with a period of 980 nanoseconds.

FIG. 5b shows the clock pulses $\omega$ and $\mu 0$ to $\mu 31$ supplied by the clock module 25 of a multi-register such as 10, FIG. 3, on a different time scale from that of FIG. 5a.

The synchronization of the clock module is provided by a signal $t31$ 8 coming from the exchange time base 6.

$\omega$ is a signal of 245 nanoseconds duration with a period of 490 nanoseconds.

$\mu 0$ to $\mu 31$ are signals of 980 seconds duration with a period of 31.35 microseconds, shifted with respect to each other by 980 nanoseconds.

FIG. 5c shows signals T1, T2, T3, T4 and T5 coming from the time base 6; complementary signals $\overline{T1}, \overline{T2}, \overline{T3}, \overline{T4}$ and $\overline{T5}$ are obtained by logic inversion of these signals. Each combination of the signals T1 to T5 or their complementary signals $\overline{T1}$ to $\overline{T5}$ defines a time slot $ti$, the time slots being referenced $t0, t1, \ldots t31$ in FIG. 5c.

Thus, by way of example:

A time slot $t1$ is defined by T1-$\overline{T2}$-$\overline{T3}$-$\overline{T4}$-$\overline{T5}$.
A time slot $t20$ is defined by $\overline{T1}$-$\overline{T2}$-T3-$\overline{T4}$-T5.

The reception of signals T1 to T5 and $\overline{T1}$ to $\overline{T5}$ therefore makes it possible to obtain the time slot $ti$ in progress by decoding.

The duration of the signal T1 is 3.9 microseconds with a period of 7.8 microseconds.

The duration of the signal T2 is 7.8 microseconds with a period of 15.6 microseconds; it is shifted with respect to the signal T1 by 3.9 microseconds.

The duration of the signal T3 is 15.6 microseconds with a period of 31.25 microseconds; it is shifted with respect to the signal T2 by 7.8 microseconds.

The duration of the signal T4 is 31.25 microseconds with a period of 62.4 microseconds; it is shifted with respect to the signal T3 by 15.6 microseconds.

The duration of the signal T5 is 62.5 microseconds with a period of 125 microseconds; it is shifted with respect to the signal T4 by 31.2 microseconds.

The time slots $t0$ to $t31$ define a frame 125 microseconds duration.

In the following description, the expressions time addressing and space (i.e. position) addressing will be used. Time addressing is a mode of access to a memory in which the address of the desired memory word is supplied by a counter under the control of the exchange time base 6; this mode of addressing thus provides cyclic access to the memory words. Space addressing is a mode of access to a memory in which the address of the desired memory word is provided by a register or a bus under the control of the instruction memory block; this mode of addressing, thus provides access to the word in dependence on operations carried out by the program of the instruction memory block.

The register memory block 19 and the buffer memory block 14 are shown in FIGS. 6a and 6b; the buffer memory block 14 comprises two buffer memories 20 and 21, a time addressing circuit 38, a space addressing circuit 39, a memory addressing circuit 59 and a reading circuit 40. More exactly, FIG. 6a shows the register memory block 19, the two buffer memories 20 and 21 and the reading circuit 40 and FIG. 6b shows the time addressing circuit 38, the space addressing circuit 39 and the memory addressing circuit 59.

The register memory block 19, FIG. 6a, comprises an input interface 36, a memory 35 with its addressing circuit 47 and an output interface 37; the addressing circuit 47 is connected by a wire 97 to the time addressing circuit 38 of FIG. 6b; a parity fault output of the output interface 37 is connected to the time addressing circuit 38 by a wire 137.

The buffer memory 20 is constituted by two AND gates 68, 69, an OR gate 70, a an arithmetic circuit 71, a memory 72 with its addressing circuit 73, an AND gate 74 one of whose inputs is connected to the output of the memory 72 and another of whose inputs is connected by (via an inverter 75) to a wire 89 coming from the clock module 25; the clock module delivers to said wire 89 an address instruction signal with a period of 62.50 microseconds having the value "1" for time addressing during a half cycle of 31.25 microseconds and having the value "0" for space addressing during a half cycle of 31.25 microseconds. The output of the AND gate 74 is connected to the multi-register data bus LIMR; the addressing circuit 73 is connected by a wire 108 to the memory addressing circuit 59, FIG. 6b.

The buffer memory 21 is constituted by two AND gates 76 and 77, an OR gate 78, an arithmetic circuit 79, a memory 80 with its addressing circuit 81, an AND gate 82 one of whose inputs is connected to the output of the memory 80 and another of whose inputs is connected to the wire 89, the output of the AND gate 82 being connected to the multi-register data bus LIMR; the addressing circuit 81 is connected by a wire 109 to the addressing memory circuit 59, FIG. 6b.

The AND gates 69 and 76 each have one input connected to the output of the output interface 37 of the register memory block; another input of the AND gate 69 is connected to the wire 89 and another input of the AND gate 76 is connected to the wire 89 via an inverter 83. The AND gates 68 and 77 each have one input connected to the multi-register data bus LIMR; another input of the AND gate 68 is connected to the wire 89 by an inverter 84 and another input of the AND gate 77 is connected to the wire 89.

The reading circuit 40 reads the words in the buffer memories 20 and 21 so as to write these words in the register memory block 19; the reading circuit comprises two AND gates 85 and 86 and an OR gate 87 whose output is connected by a wire 103 to the space addressing circuit 39, FIG. 6b. The AND gate 85 has one input connected to the output of the memory 72 and another input connected to the wire 89; the AND gate 86 has one input connected to the output of the memory 80 and another input connected to the wire 89 via an inverter 88.

The output of the OR gate 87 is connected to one input of an AND gate 129 whose output is connected to the input interface 36 of the register memory block 19; another input of the AND gate 129 is connected to the output of an inverter 128 whose input is connected to the output of a delay circuit 127 having one input connected by a wire 125 to an overflow output of the arithmetic circuit 71 and another input connected by a wire 126 to an overflow output of the arithmetic circuit 79; when a register is busied during a given time, a signal appears at the overflow output of the arithmetic circuit of the buffer memory which deals with said register in the register memory block 19.

The time addressing circuit 38, FIG. 6b comprises two AND gates 41 and 44 connected to the multi-register data bus LIMR, to a control line LCR and to a memory points bus LMP coming from the control logic block 17, the output of said AND gate 41 being connected to a register counter 42 which is reset to zero by a reset to zero signal Z and which has an output that delivers a register number to an arithmetic circuit 46, to an AND gate 48 and to an AND gate 131. The output of the said AND gate 44 is connected to a word counter 45 which receives the clock pulse $\omega$. The output of the word counter 45 is connected to another input of the AND gate 48 and to one input of the arithmetic circuit 46 whose output is connected by the wire 97 to the addressing circuit 47 of the memory 35 of the register memory block 19 shown in FIG. 6a. The output of the register counter 42 is also connected to the a diaplay register 115 connected to the desk by a wire 116; the AND gate 131 has an input connected to the memory bus LMP which delivers to it the 36th bit of the instructions of the control logic block 17 and receives on another input a function ATE coming from the instruction memory block 18. A flip-flop 49 is reset to zero by an AND gate 50 receiving the clock pulse $h2$ at its input. Another input of the AND gate 48 and the input of the flip-flop 49 are connected by the wire 137 to the parity fault output of the output interface 37 of the register memory block 19. The output of the flip-flop 49 is connected to an input of an AND gate 51 controlled by the clock pulse $h1$. Inputs controlling the opening of the AND gates 50 and 51 are connected to the control line LCR and to the memory points bus LMP; the AND gate 51 delivers at its output a parity fault signal if the flip-flop 49 has been positioned at 1.

The output of the AND gate 48 is connected to a register 52 which has its output connected to one input of an AND gate 53 whose other inputs are connected to the control line LCR and to the memory points bus LMP; the output of the AND gate 53 is connected to the multi-register data bus LIMR to which it delivers the parity fault word in the memory 35.

The reset to zero signal Z which is applied to the register counter 42 is delivered by a comparator 43 which is connected to the output of said register counter 42 and to a number of registers device NE which is a prewired device indicating the number of registers with which the memory 35 of the register memory block is equipped.

The space addressing circuit 39 has two AND gates 54 and 55 whose outputs are connected to an OR gate 56 which has its output connected to an address register 57. One input of the AND gate 54 is connected to the multi-register data bus LIMR and another input receives a function ADM from the instruction memory block 18 via an inverter 58; one input of the AND gate 55 receives the function ADM and another input is connected to the reading circuit 40 via the wire 103. The space addressing circuit 39 also includes a devide-by-two circuit 117 and a flip-flop 118 which are connected to the control line LCR; the output of the divide-by-two circuit 117 is connected to one input of an AND gate 119 and the output of the flip-flop 118 is connected to another input of the AND gate 119 and to one input of a multi-input AND gate 120. The AND gate 120 also receives the signals $\mu$ 16 to $\mu$ 31; and has one input connected to the memory points bus LMP. An AND gate 121 has one input connected to the output of the address register 57, one input connected to the output of the AND gate 119, one input connected to the output of the AND gate 120 and one input conncted to the memory points bus LMP which delivers to it a signal corresponding to the 20th bit of the instructions of the instruction memory block 18. An AND gate 122 has one input connected to the memory points bus LMP which delivers to it signals corresponding to the 11th to 18th bits of the instructions of the instruction memory block 18 and another input connected to a logic circuit 123. The logic circuit 123 has one input connected to the memory points bus LMP which delivers to it a signal corresponding to the 20th bit of the instructions and has another input which receives a function AIM. The logic circuit 123 delivers a signal $\overline{\text{AIM. 20th bit}}$ to the AND gate 122. The outputs of the AND gates 121 and 122 are connected to an OR gate 124.

The memory addressing circuit 59 comprises a first circuit constituted by two AND gates 60 and 61 and an OR gate 62 and a second circuit constituted by two AND gates 63 and 64 and an OR gate 65. The AND gates 60 and 63 have an input connected to the output of the word counter 45 of the time addressing circuit 38 and another input connected (via an inverter 66 for the AND gate 63) to the wire 89 which conveys the addressing control signal which has the value "1" for time addressing and the value "0" for space addressing. The AND gates 61 and 64 have one input connected to the output of the OR gate 124 of the space addressing circuit 39 and another input connected (via an inverter 67 for the AND gate 63) to the wire 89.

The memory 35 of the register memory block 19, FIG. 6a has a maximum capacity of 32768 words of 17 bits each, one of which is a parity check bit; a set of 64 words corresponds to a register, this giving said memory a maximum capacity of 512 registers. The memory 35 memorizes the data necessary for making or clearing calls in the exchange; the data necessary for making or clearing a call is contained in a word of the memory. For technological reasons the memory has a modular capacity in modules of 16 registers, so that the memory will comprise a maximum of 32 modules. When a telephone exchange does not need 512 registers because of the smaller number of subscribers which it serves, the memory is equipped with the number of modules that is actually necessary.

The base cycle time, i.e. the time necessary for processing 512 registers is 16 milliseconds, this giving a processing time of 31.25 microseconds per register, this processing time being divided into 32 elementary periods of 980 nanoseconds each and defined by the clock signals $\mu$ 0 to $\mu$ 31. Since the number of registers is modular, the basic cycle time is variable in steps of 16 × 31.25 = 0.5 milliseconds. For this reason, the number of registers with which the memory 35 is equipped is given by the number of registers device NE of the time addressing circuit 38, said device allowing the register counter 42 to be reset to zero when the last register of the memory 35 is processed.

In a telephone exchange the registers are divided for operational reasons into fast registers having a 64-word capacity and slow registers having a 16-word capacity; there are therefore N fast registers and n slow registers for a given number of modules; this does not change the necessary cycle period for processing the modules with which the memory is equipped. The processing of the slow registers will be explained hereinafter.

The processing of the registers therefore uses the buffer memories 20 and 21 each of which has a 64-word capacity corresponding to the contents of a fast register and each buffer memory operates alternately on a space addressing basis or on a time addressing basis, every 31.25 microseconds, the change of addressing being controlled by the addressing control signal applied to the wire 89; one of the buffer memories operates on a space addressing basis while the other operates on a time addressing basis and vice versa.

Let E$i$ be a fast register; during 31.25 microseconds, the buffer memory 20, for example, operates on a time addressing basis and the content of the register E$i$ of the register memory block 19 is written in the buffer memory 20; during the following 31.25 microseconds the buffer 20 operates on a space addressing basis and its content is processed by the logic control assembly 15, FIG. 3; during the following 31.25 microseconds the buffer memory 20 again operates on a time addressing basis and its content is read (is content representing the register word after processing); the reading being performed by the reading circuit 40 which transfers said content in the fast register E$i$ of the memory 35 while simultaneously writing the content of the fast register E($i$+2) into the buffer memory 20; the register memory block 19 for writing the contents of the register after processing in the buffer memory is addressed by the time addressing circuit 38. The buffer memory 21 operates in the same way as the buffer memory 20, but its operation is in opposite phases to that of the buffer memory 20.

A comparison of the operation of the buffer memories 20 and 21 follows:

nals $\mu$0 to $\mu$31 which define the processing time of a register are themselves divided into two parts; for the signal $\mu$0 the first part corresponds to the reading in the buffer memory of the word 0 of the register E$i$ and the writing in the buffer memory of the word 0 of the register E($i$+2) and the second art corresponds to the reading of the word 1 of the register E$i$ in the buffer memory and the writing of the word 1 of the register E ($i$+2) in the buffer memory; and so on for the clock signals $\mu$2, $\mu$3, ... $\mu$31; of course, when a word is read in the buffer memory on a time addressing basis, it is immediately written in the register memory block 19.

Parity is checked on each 16-bit word each time a word coming from the buffer memory is written in the register memory block 19; parity (odd parity) is calculated in the input interface 36 and written simultaneously with the 16 bits containing the data of the word; thus a word in the memory 35 of the register memory block 19 is constituted by 16 data bits and one parity bit. When reading, the parity of the word read in the memory 35 is calculated in the output interface 37 and compared with that contained in the parity bit of the word, but only the 16 data bits are sent to a buffer memory. For each detected parity fault, the content of the register counter 42 and that of the word counter 45, i.e. the register number of the number of the faulty word is transferred to the register 52; in the same period, the detected parity fault sets the flip-flop 49, it being possible to test the state thereof by program; this flip-flop 49 is reset to zero by the address which allows it to be read; the content of the register is sent to the multi-register data bus LIMR to give the number of the faulty word.

FIG. 7 shows a macroprogram memory access block 16 of a multi-register and the macroprogram memory 13 with its addressing circuit 90; the addressing capacity of the macroprogram memory is 32000 words of 48 bits each; the macroprogram memory is addressed by a circuit constituted by two AND gates 91 and 92 and by an OR gate 93 whose output is connected to a register 95; a control signal coming from the control desk via the control desk line LP1 is applied to one input of the AND gate 91 and to one input of the AND gate 92 via an inverter 94; another input of the AND gate 92 is connected to the multi-register data bus LIMR; another input of the AND gate 92 is connected to the control line LCR and another input is connected to the memory points bus IMP; another input of the AND gate 91 is connected to the output of a series/parallel register 96 which is, iself connected to the control desk via the control desk lines LP1 and LP2. The output of the register 95 is connected to the addressing circuit 90 of the macroprogram memory 13. The output of the macroprogram memory is connected to one input of an AND gate 99 and to an AND gate 114; another input of

| Buffer memory 20 | | Buffer memory 21 | | |
|---|---|---|---|---|
| Addressing: | Operation | Addressing: | Operation | DURATION |
| Time | Reading E($i$−2) Writing E$i$ | Space | Processing E($i$−1) | 31.25 s |
| Space | Processing E$i$ | Time | Reading E($i$−1) | 31.25 s |
| Time | Reading E$i$ Writing E($i$+2) | Space | Writing E($i$+1) Processing E($i$/1) | 31.25 s |
| Space | Processing E($i$+2) | Time | Reading E($i$+1) writing E($i$+3) | 31.25 s |

Thus, during time addressing the 64 words of a fast register E$i$ are read and the 64 words of the fast register E($i$+2) are written in a buffer memory; the clock sigeach of the AND gates 99 and 114 is connected to the output of an OR gate 132 which receives at its inputs the clock signals μ 1 and μ 17. The output of the macroprogram memory is also connected to the control logic lock 17 (FIG. 3) via the connection wire 110 which conveys the 1st to 8th bits of the macroinstructions to a transcoding memory 142 as shown in FIG. 9. The output of the AND gate 114 is connected to the input of a series/parallel interface register 107 having a capacity of one macroprogram word; the output of the interface register is connected to the control desk by the control desk connection LP1 which allows an instruction to be received from said desk and to be transmitted to said desk. The output of the AND gate 99 is connected to the input of an interface register 98 having a capacity of one 48-bit macroprogram word; the output of the interface register 98 is connected to a shift circuit 100 and to a parity check circuit 101 which delivers a signal on a wire 102; the output of the shift circuit 100 is connected to the multi-register data bus LIMR. One control input of the shift circuit is connected to the memory points bus LMP, one control input is connected to the control line LCR and one control input receives the function ATE: the memory points bus LMP delivers signals corresponding to the 8th and 21st to 27th bits of the instructions of the instruction memory block 18 and the control line LCR delivers a signal AD101 to control shifts on the macroprogram word in the interface register 98 and to transfer the contents of said shift circuit to said control logic block via the multi-register data bus LIMR. The wire 102 of the parity check circuit 101 is connected to one input of an AND gate 104 another of whose inputs is connected to the output of the register 95; the output of the AND gate 104 is connected to a register 105 whose output is connected to one input of an AND gate 106 which has another input connected to the control line LCR and another input connected to the memory points bus LMP; the output of the AND gate 106 is connected to the multi-register data bus LIMR; the register 105 serves to memorize the address of the macroprogram word on which a parity fault was found.

The output of the register 95 is connected to: one input of an AND gate 111 connected to a parallel/series register 112, having a capacity of 15 bits which delivers one phase (ie program step) number to the control desk via a wire 113, another input of the AND gate 111 being connected to the output of an OR gate 133 which receives the clock signals μ 1 and μ 17 at its inputs.

A macroprogram word which will be referred to as the macroinstruction is defined by 48 bits; the 1st to 8th bits are the function field of the macroinstruction, the 9to 44th bits contain data and the 45th to 48th bits serve to indicate the program mode. The execution of a macroprogram word or words processes the register word stored in a buffer memory 20 or 21 while this buffer memory operates on a space addressing basis; a processing sequence comprises 32 elementary periods defined by the signals μ 0 to μ 31. The macroinstruction is addressed by the register 95, the normal addressing coming from the word 0 of the register word of the buffer memory; it is also possible to address a macroinstruction via the control desk through the series/parallel register 96. A register word is processed as follows in the case of a fast register:

Signal μ 0

The word 0 of the register stored in the buffer memory is read; this word 0 contains the number of the macroinstruction to be performed and this number is stored in the register 95; this number is imposed by the instruction program contained in the instruction memory block 18, FIG. 3.

Signal μ 1

The content of the addressed macroinstruction is transferred in the interface registers 98 and 107 and a parity check is effected via the parity check circuit 101, which, in the case of a parity fault, delivers a signal to the register 105.

The 1st to 8th bits of the macroinstruction which constitute the function field are switched by the connection 110 towards the control logic block 17, FIG. 3, in which they are used to address a transcoding memory, as will be specified hereinafter, which by decoding these eight bits provides the start phase of the instruction program contained in the instruction memory block 18 of FIG. 3.

Signals μ 2 to μ 13

Execution of the macroinstruction by the instruction program. The 1st to 48th bits of the macroinstruction are accessible to the program instructions via the multi-register data bus LIMR through the shift circuit 100.

The execution of the macroinstruction during the remaining elementary periods varies according to the length of the macroinstruction to be executed, i.e. is dependent on the function of the addressed macroinstruction; the following part of the execution is determined by the last two instructions of the instruction program or at least by the instructions addressed by the signals μ 14 and μ 15; therefore we have:

Last but one instruction or instruction addressed by the signal μ 14: reading of the word 0 of the buffer memory (which contains the number of the macroinstruction) and storing of this number in the address register 57 of the space addressing circuit 39;

Last instruction or instruction addressed by the signal μ 15: calculation of the following macroinstruction number in the calculation circuit 71 or 79 of the buffer memory and storing of this number in the word 0 of the buffer memory.

There are three possible operation modes of the macroprogram, namely: A slow program PROLENT, a single program SIMPRO and a double program BIPRO.

The various operation modes are imposed by the binary combination of the 45th and 46th bits of each macroinstruction and are defined by the following combinations:

| Operation mode | 45th bit | 46th bit |
|---|---|---|
| PROLENT | 1 | 0 or 1 |
| SIMPRO | 0 | 1 |
| BIPRO | 0 | 0 |

PROLENT — Only the signals μ 0 to μ 15 are used for execution of the macroinstruction, the signals μ 16 to μ 31 being inactive.

SIMPRO — For the signals μ 0 to μ 15 the program is identical to that of PROLENT; but the signals μ 16 to μ 31 are used for the execution of a second macroinstruction which is in fact the follow on of the preceding macroinstruction; this second macroinstruction is obtained by reading the word 0 of the buffer memory under the action of the signal μ 16; operation with the last but one instruction or with the signal μ 30, with the last instruction or the signal μ 31 is identical to what has been set forth previously concerning operation with the signals μ 0 to μ 15.

BIPRO — In this mode of operation, there are two parallel programs which are asynchronous. The first program is controlled by the clock signals μ 0 to μ 15 and starts with reading the number of the macroinstruction to be executed in the word 0 of the buffer memory; it ends with writing the number of the macroinstruction to be executed in the following cycle, in the same word 0 of the buffer memory. The second program is controlled by the clock signals μ 16 to μ 31 and starts with reading in the 32nd word of the buffer memory of the macroinstruction to be executed; it ends with the writing the number of the macroinstruction to be executed in the following cycle in the same 32nd word.

The case of slow registers is treated differently, since it has been stated that they have a capacity of only 16 words instead of 64 words like fast registers. When a buffer memory operates on a time addressing basis 64 words of the memory 35 are written in said buffer memory; this corresponds to the contents of four slow registers. When the buffer memory then passes to operation on a space addressing — asis the flip-flop 118 of the space addressing circuit 39 enables the operation of the AND gates 119 and 120 of said space addressing circuit and their respective output signals AEL2 and AEL1 enable the slow registers of the buffer memory to be addressed, the signals μ 0 to μ 15 allowing the first slow register contained in the buffer memory to be processed, the signals μ 16 to μ 31 allowing the third slow register contained in the buffer memory to be processed. Each slow register therefore occupies a sector in the buffer memory and the address of this sector is given by an function ADM at the AND gate 55 of the space addressing circuit 39.

After a reading cycle of the memory 35, the same slow registers are found again in a buffer memory, but then the second slow register is processed by the signals μ 0 to μ 15 and the fourth slow register is treated by the signals μ 16 to μ 31. Thus each slow register is only processed during every other cycle; of course, the contents of the four slow register are re-written in the memory 35, whether they have been processed or not. The cycle time of a slow register is therefore twice the cycle time of a fast register. All the fast and slow registers have words reserved for time delays.

In the fast registers, the 15th, 31st, 47th and 63rd (16 + 1) bit words are time delay words used by the logic control block 17; these are in fact operation timing words which can be re-initialized during processing of a register; these words are mainly used for dialogue and are incremented at each pass of the register in the buffer memory, i.e. at each cycle of the memory 35, where a cycle lasts 16 milliseconds for a full complement of 512 registers). The 62nd word is the register overflow time delay word; the overflow of this word after a given time e.g. 4 hours 30 minutes, resets the register in question to zero, i.e. all 64 words which constitute one register, this resetting to zero consisting, as has been said, in inhibiting the writing in the memory 35 of the register word contained in a buffer memory; the 62nd word is incremented at every 16th pass of the register word in the buffer memory, (where 16 milliseconds × $2^{14}$ is approximately 4½ hrs).

For the slow registers whose capacity is 16 words, (word 0, 1st word, ... 15th word) the 15th word is an operation timing word and the 14th word is an overflow word.

The assembly formed by the instruction memory block 18 and the logic control block 17 associated to it will now be described, this assembly being shown in FIG. 9.

The instruction memory block 18 comprises an instruction memory paper 140 and its addressing circuit 139. The instruction memory has a capacity of 4096 words of 48 bits each.

The logic control unit block 17 is constituted by an addressing module 141 and an operation block module 150. The addressing module 141 comprises the transcoding memory 142, an OR gate 143, a phase jump logic circuit 144, an addressing register 145, and a control desk phase register 146. The first 8 bits of the macroinstructions which define the macroinstruction to be performed and which address the transcoding memory whose capacity is 256 words of 12 bits are received by the transcoding memory 140 from the macroprogram memory 13 via the connection 110. The transcoding memory transforms the function encoded in the function field of a macroinstruction into the number of the initial phase (i.e. program address) contained in the addressing register 145; the initial phase causes the beginning of an instruction program contained in the instruction memory 140 to be supplied.

The output of the transcoding memory is connected to the multi-register data bus LIMR to which one input of an OR gate 143 is connected; another input of the OR gate 143 is connected to the output of the control desk phase register 146 which is connected to the control desk by the control desk line LP2; another input of the OR gate 143 is connected via a connection 148 to an output of the operation block module 150; the output of the OR gate 143 is connected to the phase jump logic circuit 144 whose output is connected to the addressing register 145; and OR gate 149 receives at its input the clock signals μ 15 and μ 31 and its output is connected to the addressing register 145 so as to reset it to zero at the end of the performance of a previous phase, i.e. at the end of the performance of a macroinstruction. The output of the addressing register 145 is connected to the addressing circuit 139 of the instruction memory 140.

The operation block module 150 comprises an interface circuit 162 whose input is connected to the output of the instruction memory 140; the output of the interface circuit constitutes a memory points bus LMP which conveys the 48 bits of each instruction word; the interface circuit 162 monitors the parity of the instruction word which it receives in a parity register and a parity fault of said interface circuit is connected to an AND gate 64 another of whose inputs is connected to the output of the addressing register 145; the output of said AND gate 164 is connected to a parity fault register 165 whose output is connected to the control desk by the control desk line LP2. A decoding circuit 166 has its input connected to the memory points bus LMP and receives the 1st, 2nd and 3rd bits of the instruction words constitute the function of the instructions. There are five types of instructions which will be described hereinafter, each being characterized by functions ANT, POP, ADM, AIM, ATE some of which have been mentioned previously. The decoding circuit 166 comprises five outputs, each delivering one of the functions. An address decoder 167 is connected to the output of the interface circuit 162 from which it receives the 6th, 7th and 8th bits of the instruction words and its output constitutes the control line LCR which deliver seven signals AD101 to AD107 defined by these 6th, 7th and 8th bits. A transmission register 168 is connected to the output of the instruction memory 140 and its output is connected to the control desk by the control desk line LP2 and allows the instruction word (48 bits) to be displayed.

The operation block module also comprises a first accumulator 151, a second accumulator 152, a shift network 153 connected to the output of the first accumulator, an arithmetic circuit 154 connected to the output of the shift network and to the output of the second accumulator 152, a third accumulator 155 having its input connected to the output of the arithmetic circuit 154 and its output connected to one input of an OR gate 156 whose output is connected to the multi-register data bus LIMR; another input of the OR gate 156 is connected to the output of an AND gate 175 one of whose inputs is connected to the memory points bus LMP from which it receives the 21st to 36th bits of the instruction words and another of whose inputs is connected to the control line LCR from which it receives a control instruction AD 103. The three accumulators 151, 152, 155 each has a capacity of 16 bits and the multi-register data bus LIMR which is constituted by 16 wires (it being possible for a data item to contain a maximum of 16 bits) conveys data constituted by 16 bits. One input of the first accumulator 151 is connected to the data bus LIMR, another of its inputs being connected to the memory points bus LMP from which it receives the 9th bit; lastly another input is connected to the output of an inverter 177 whose input is connected to the ANT function output of the decoding circuit 166. The input of the second accumulator 152 is connected to the output of a logic circuit 163 one of whose inputs is connected to the memory points bus LMP and receives therefrom the 5th to 20th bits of the instruction words and another of whose inputs is connected to the multi-register data bus LIMR. One control input of the shifting network 153 is connected to the output of an AND gate 176 one of whose inputs is connected to the memory points bus LMP from which it receives the 17th, 18th and 19th bits of an instruction word and another of whose inputs is connected to the POP function output of the decoding circuit 166.

The third accumulator 155 has one control input connected to the POP output of the decoding circuit 166 and another control input connected to the memory points bus LMP from which it receives the 16th and 20th bits of the instruction words.

A comparator circuit 157 has one input connected to the output of the second accumulator 152 and another connected to the output of the arithmetic circuit 154; the comparator circuit is constituted by four comparators whose outputs are connected respectively to four inputs of a logic circuit 158 also connected to the memory points bus LMP from which it receives the 33rd to 36th bits, whose output is connected by the connection 148 to one input of the OR gate 143 of the addressing module 141. Besides its output connected to the input of the third accumulator 155, the arithmetic circuit 154 has an "equality" output and a "carry" output each connected to distinct inputs of the logic circuits 158. The "equality" output delivers a signal when the arithmetic circuit compares and detects an equality; the "carry" output delivers a signal when the result of another operation other than comparison is positive.

A control input of the arithmetic circuit 154 is connected to the output of a logic circuit 160, one of whose inputs is connected to the POP function output of the decoding circuit 166, another of its inputs being connected to the memory points bus LMP from which it receives the 21st to 26th bits and another of whose inputs is connected to the output of a control register 159 whose input is connected to the multi-register data bus LIMR from which it receives the 9th to 16th bits.

A logic circuit 161 has one input connected to the output of the shift network 153, another input connected to the output of the second accumulator 152, another input connected to the memory points bus LMP from which it receives the 15th bit; its output is connected to the data bus LIMR.

A register 170 has one input connected to the output of the second accumulator 152 and one input connected to the output of the shift network 153; its output is connected to one input of an OR gate 171 whose output is connected to the control desk by the control desk line LP2. A data register 173 has its input connected to the multiregister data bus LIMR and its output connected to one input of the OR gate 171. A phase jump register 174 has its output connected via the connection 148 to the logic circuit 158 and to the OR gate 143 and its output connected to one input of the OR gate 171.

The assembly shown in FIG. 9 allows instructions to be performed based on the decoding of a macroinstruction. For this purpose the addressing register is reset to zero at the end of a previous phase by one of the signals $\mu$ 15 or $\mu$ 31; this allows two first instructions to be imposed permitting the macroinstruction to be read and the function code of the macroinstruction to be transcoded from the 1st to 8th bits of the macroinstruction, this allowing the addressing register 145 to be initialized at the beginning of the instruction program. The addressing register 145 is loaded from the phase jump logic circuit 144 which can receive data either through the memory points bus LMP or from the multi-register data bus LIMR or from the output of the transcoding memory 142, or from the output of the operation block module 150 or lastly from the control desk to allow visual display of an instruction addressing from the control desk. The execution of an instruction takes 980 nanoseconds; the clock signals $\mu$ 15 and $\mu$ 31 serve for resetting to zero the adressing register 145 of the instruction program at the beginning of each phase of the macroprogram, to allow either the word 0 or the 32nd word which contains the start phase of the instruction program to be read in a buffer memory 20 or 21. The contents of said addressing register 145 is then a function of the progress of the instruction program.

The instruction word is transferred in the interface circuit 162 which makes a parity check; in the case of a parity fault, the address of the faulty word is transferred to the parity fault register 165 which transmits it to the control desk. The first accumulator 151 is loaded from the multi-register data bus LIMR when it receives the 9th bit of an instruction word, except for an instruction word whose function is ANT. The second accumulator 152 is loaded either by the multi-register data bus LIMR or by the 5th to 20th bits of an instruction word conveyed by the memory points bus LMP. The shift network 153 allows the data received from the first accumulator to be shifted to the right or to the left and to be sent either on the multi-register data bus LIMR via the logic circuit 161 or on the arithmetic circuit 154. The arithmetic circuit 154 performs logic or arithmetic operations on 4-bit sectors of data; the result of these operations is stored in the third accumulator 155; the control register 159 and the logic circuit 160 the control the arithmetic circuit 154. The comparator circuit 157 determines the phase jumps SPH1 to SPH8 which allow the addressing of a new phase of the instruction program as a function of the data received from the second accumulator 152 and from the arithmetic circuit 154. The detail of the instructions corresponding to the functions ANT, POP, ADM, AIM, ATE will be set forth hereinafter; the significance of the various bits which constitute each instruction will be then be found.

The signalling receiver module 22 of FIG. 3, shown in FIG. 11 will now be described; its function is to receive and store the signals relating to the subscriber lines or to other circuits (these signals being transmitted by the connection units on the test lines LT) and to confirm or not to confirm the change in state of the subscriber lines or of the circuits. A multiplexer 180 receives the test lines LTO to LT63, each test line coming from a connection unit, assuming that there are 64 connection units at the most. The output of the multiplexer is connected to a test line state register 181 whose output is connected to a buffer register 182; an output logic block 183 is connected to the output of the buffer register 182 and at its output to three previous state memories 184, 185 and 186 and to one input of a state comparator 187 whose output is connected to three confirmed state memories 188, 189 and 190; another input of the state comparator 187 is connected to each of the outputs of the preceding previous state memories 184, 185 and 186 by a connection 200; a counter 191 controlled by the clock signal Oh1 has its output connected to a control input of the multiplexer 180, to one input of an OR gate 192 and to one input of an AND gate 201 having another input connected to the clock module and receiving the clock signal $\theta 2$; the output of the AND gate 201 is connected to a register 202 connected to the output logic block 183 by wires LRT, LRF and LRPO, said register 202 selecting the test lines in the output logic block 183, where the wire LRT selects test lines relating to subscribers and circuits, the wire LRF selects test lines corresponding to multi-frequency signals and the wire LRPO selects test lines corresponding to operator position; and AND gate 193 has one input connected to the multi-register data bus LIMR one input connected to the control line LCR which delivers to it the address signal AD105 and one input connected to the memory points bus LMP which delivers to it the value of the 21st bit of the instructions.

The output of each previous state memory and of each confirmed state memory is connected to one input of an AND gate 194, 195, 196, 198 or 199, associated with each memory; another input of each AND gate is connected to the control line LCR and the output of each AND gate is connected to the multi-register data bus LIMR.

Signalling relating to a subscriber or to a circuit connected to the time slot $ti$ of an input multiplex LREO or LRE1 of a connection unit $x$ is received on the test line LT$x$ associated with the connection unit, in the time slot $t(i+1)$. Thus, for a subscriber, the subscriber loop signal is received at $t(i+1).\theta 2$ for the input multiplex LREO and at $t(i+1).\theta 5$ for the input multiplex LRE1 while for a circuit the loop signal is received at $t(i+1).\theta 2$ and at $t(i+1).\theta 3$ for the input multiplex LREO and at $t(i+2).\theta 5$ and $t(i+2).\theta 1$ for the input multiplex LRE1, i.e. there are two signal bits for one circuit per input multiplex. The signalling receiver module allows 64 connection units numbered 0 to 63 to be connected thereto, the connection units are divided into four groups of sixteen connection units each, i.e. a group GRO for the connection units numbered 0 to 15, a group GR1 for the connection units numbered 16 to 31, a group GR2 for the connection units numbered 32 to 47 and a group GR3 for the connection units numbered 48 to 63.

Each test line LT supplying a connection unit can also be used to transmit the signalling of four operator positions; the signalling relative to the operator positions comprises 5 bits. Lastly the first and last connection units of each group, i.e. the connection units numbered 0, 15, 16, 31, 32, 47, 48 and 63 are reserved for reception of multi-frequency signals; these signals also comprise 5 bits. The counter 191 scans the test lines LT0 to LT63 and time addresses the previous state and the confirmed state memories; the output of the AND gate 193 space addresses the previous state and the confirmed state memories.

The previous state and confirmed state memories are grouped in pairs and their function is as follows:

Previous state memory 186 and confirmed state memory 190 group; each memory has a capacity of 512 5-bit words and in each memory 256 words are reserved for multi-frequency signals and 256 words are reserved for signals coming from operator positions.

Previous state memory 185 and confirmed state memory 189 group; each memory has a capacity of 1024 4-bit words; this group is reserved for subscriber and circuit signals from the connection units numbered 0 to 31.

Previous state memory 184 and confirmed state memory 188 group; each memory has a capacity of 1024 4-bit words, this group is reserved for subscriber and circuit signals from the connection units numbered 32 to 63.

The operations of the signalling receiver modules is as follows: each connection unit test line LT has 32 time slots, of 3.9 microseconds duration each and there are 64 test lines, giving $32 \times 64 = 2048$ slots to be read. This requires practically $64 \times 32 \times 3.9$ microseconds, i.e. 8 milliseconds. The present state of each time slot is read under the control of the counter 191 and the result of the reading i.e. the present state is stored in a previous state memory. The present state of the signalling is compared in the state comparator 187 with the previous state which reaches it via the connection line 200; if this previous state is identical to the present state, it is then transferred in a confirmed memory state; 8 milliseconds later, the operation begins again. Access to this data i.e. reading of previous state data and of confirmed state data by the register memory block 19 is obtained on a space addressing basis; this addressing is effected by an instruction of the instruction program. The writing of the memories is effected on a time addressing basis by the counter 191. Since the states of the time slots are stored in a memory, the program can ascertain the state of a time slot at any time.

FIG. 12 shows the signal transmitter module 23 of FIG. 3. The function of this module is to prepare and transmit tone control messages and signal control messages to the switching network. This module comprises two identical memories 210 and 211 addressed by an addressing logic block 212 controlled by the clock signals $\omega 1$ to $\omega 8$; said addressing logic block is also connected to the memory points bus LMP via which it receives bits of the instructions for allowing the memories 210 and 211 to be addressed from the memory points bus LMP. The input of each memory is connected to the multi-register data bus LIMR via respective AND gates 213 and 214, each AND gate has an input connected to the memory points bus LMP. The output of each memory is connected to a different input of an OR gate 215 whose output is connected to one input of an AND gate 216 and to one input of an AND gate 217; another input of the AND gate 216 receives the clock signals *towl* and another input of the AND gate 217 receives the clock signals *towl*. The output of the AND gate 216 is connected to a register 218 which is a parallel/series register and whose output is connected to the input of an output logic circuit 220; the output of the AND gate 217 is connected to a register 219, which is a parallel/series register and whose output is connected to the input of an output logic circuit 221; the output logic circuits 220 and 221 have their outputs connected to the network line MLX which is connected to the switching network 1 of FIG. 1. Since the network line MLX is a multi-wire line, each output logic circuit is connected to the switching network by two wires of the network line.

The memories 210 and 211 are alternately in the reading and writing positions. While data is being written in one memory, the other memory is being read for transmission towards the switching network, the duration of the square wave pulse which controls writing in a memory being 1 millisecond. Each output logic circuit transmits one message, i.e. one 28-bit word every 125 microseconds, that is, 8 messages in one millisecond and consequently 16 messages for the two output logic blocks; the use of two registers 218 and 219 allows 16 messages to be conveyed during the writing in a memory, since the data of the other memory, which is reading, is alternately switched to the registers 218 and 219. Data is written in the registers during the time slot *to* of each 125-microsecond frame, but at a different inytant in each register. An addressing counter of the addressing logic block 212 is incremented after each reading of the memory; each word is erased in the memory after reading. The words stored in the registers are transmitted in the same frame as that in which they are written; they are transmitted from time slot $t15$, instant $\theta5$ to time slot $t21$, instant $\theta3$.

A message is transmitted if the register in which it is stored contains at least 1 bit indicating the function; in the contrary case, the output of the message is inhibited by the corresponding output logic circuit. A parity check is made on the contents of the message in the output logic circuit; in the case of a parity fault, proper parity is re-established by adding 1 bit to the message at $t21.\theta3$; when the reading memory has been read, the function of the memories 210 and 211 is reversed. It is possible to check operation by a test program which alows a tone to be sent by the signalling transmitter module from a register word of a buffer memory 20 or 21 and requests reading by the dialogue portion of a control word in the switching network; the correct reading of the word thus allows a check of the proper operation of the logic control assembly 15, of the register memory block 19, of the buffer memory block 14 and of the signalling transmitter module 23 and also the proper transmission of the message on the network line MLX.

FIG. 13 shows an input/output block; the input/output module 24 of FIG. 3 comprises at least one input/output block such as shown in FIG. 13. The input/output module provides the interface between the multi-register and the dialogue portion; each input/output block therefore has read/write access via the dialogue portion and read/write access via the multi-register; each input/output block is therefore connected to the dialogue bus LIE and to the multi-register data bus LIMR.

An input/output block consists essentially of a memory 230 having a capacity of 256 words each word having 16 bits arranged in 4 sectors of 4 bits each; the memory is subdivided e.g. into 32 memory zones of 8 words each, memory zone being specialized, but the subdivision being purely on the software level. There are thus memory zones for input, i.e. which receive data via the dialogue bus LIE to be sent to the multi-register; there are memory zones for output, i.e. which receive data via the multi-register data bus LIMR to be sent to the dialogue portion; there are memory zones reserved for observation duties and memory zones reserved for counting; lastly, there are memory zones reserved for messages of given types, such as: messages between the dialogue portions fo the control units 4 and 5 via the dialogue lines ELM, messages between the monitoring unit 7 and a dialogue portion via the monitoring lines LC, messages between a connection unit and a dialogue portion via the marking lines LU.

An OR gate 231 is connected at the input to the multi-register data bus LIMR and to the dialogue bus LIE. The output of the OR gate 231 is connected to one input of each of AND gates 232, 233, 234, and 235; the output of each AND gate is connected to a different input of the memory 230 each AND gate allowing one sector of each of the 256 words of the memory to be written in a 4-bit sector. The memory 230 has four outputs (one per sector) which are connected respectively to one input of the AND gates 236, 237, 238 and 239, (which have their outputs connected to the dialogue bus LIE) and to one input of the AND gates 240, 241, 242, and 243 (which have their outputs are connected to the multi-register data bus LIMR). Another input of each of the AND gates 240, 241, 242 and 243 is connected to the output of the decoding circuit 166 which delivers the function ATE, FIG. 9.

The memory 230 can be addressed either by the multi-register or by the dialogue portion. For the multi-register the addressing is supplied either by the multi-register data bus LIMR via an addressing register 244 or directly via the memory points bus LMP. For the dialogue portion, the addressing is supplied exclusively by the dialogue bus LIE.

The input of an addressing register 244 is connected to the output of an AND gate 245, one of whose inputs is connected to the output of the decoding circuit 166 which delives the function ATE and another of whose inputs is connected to the output of the OR gate 231. The output of the addressing register 244 is connected to one input of an AND gate 249. An addressing register 246 which serves for addressing via the dialogue portion has its input connected to the output of an AND gate 247 one of whose inputs is connected to the output of the OR gate 231 and another of whose inputs is connected to the control lines LCE of the dialogue portion (see FIGS. 14 and 17). The output of the addressing register 246 is connected to one input of an OR gate 248. Another AND gate 250 has one input connected to the memory points bus LMP which conveys the 21st to 28th bits of the instruction words. Another input of the AND gate 248 receives the clock signal Ω1 and another input of the AND gates 249 and 250 receives the clock signal Ω1; the signal $\overline{\Omega 1}$ is the complement of the clock signal Ω1. The output of each of the AND gates 248, 249 and 250 is connected to a respective one of the inputs of an OR gate 252 whose output is connected to the addressing circuit 253 of the memory 230 via a connection 254 which conveys the 9th to 16th bits of the multi-register data bus LIMR and of the dialogue bus LIE, or the 21st to 28th bits of the memory points bus LMP; the output of the OR gate 252 is also connected to one input of an AND gate 256 via a connection 255 which conveys the 1st to 8th bits of the multi-register data bus LIMR and of the dialogue bus LIE. The AND gate 256 has two other inputs connected respectively to the address bus LAE and to the control line LCE of the dialogue portion which define addresses of sectors to be read in the memory 230, the output of said AND gate 256 being connected to one input of the AND gates 236, 237, 238 and 239 and delivering a signal to one or several of the AND gates 236, 237, 238 and 239 according to the data received by the connection 255.

Lastly one input of an OR gate 258 is connected to the output of an AND gate 257 having one input connected to the output of the decoding circuit 166 which delivers the function ATE and another input connected to the memory points bus LMP and receiving the 32nd bit of the function ATE; another input of the AND gate 258 is connected to the address bus LAE of the dialogue portion; the output W of the OR gate 258 being connected to one input of the AND gates 232, 233, 234 and 235, these gates allow the date coming from either the multi-register data bus LIMR or the dialogue bus LIE to be written in the memory 230.

The macroinstructions used will now be described; the format of these macroinstructions will be found in FIGS. 8a, 8b, and 8c.

Each macroinstruction comprises 48 bits, of which the 1st to 8th bits constitute its function field. The function performed by the instruction is written below as a mnemonic.

(1) EMO — This function allows an 8-bit or 16-bit parameter P to be written in a buffer memory. The address Ad of the word in the buffer memory and the value of the parameter are given by the macroinstruction. Since the parameter has a value of 8 or 16 bits, it can be written in a complete word (16 bits) of the buffer memory or in one octet of a word (8 bits). A 12 bit phase jump field SPH allows a phase jump of from 0 to ± 2047 to be written. Which is added to the present program phase, to give the following pragram phase.

(2) EMAS — This function allows a parameter P of 1, 2, 3 or 4 bits to be written in a buffer memory, in a 4-bits sector of a word. The address Ad of the word in the buffer memory and of the sector of the word is coded in the macroinstruction. The value of the parameter P is given on 4 bits and a 4-bit mask M indicates for each bit having the value "1" that the corresponding value of the parameter must be written; and for each bit having the value "0" that the corresponding value of the parameter must not be written. The 16-bit phase jump field SPH allows a phase jump lying between 0 and ±32000 to be written which added to the present phase will give the following phase of the program.

(3) EMASI — This function is identical to be function EMAS, except for addressing. This is effectively indirect addvessing, the address in the buffer memory being given by a word of the buffer memory whose address Ad is given in the macroinstruction.

(4) TEDEUM — This function allows two successive read/write operations on a buffer memory. Firstly in a buffer memory a first word is read whose address is given by a first source address, 1st Ad.So of the macroinstruction and the data read in a word of said buffer memory whose address is given by the first destination address 1st Ad.D is written therein. A second similar operation is carried out with the second source address 2nd Ad.So and the second destination address 2nd Ad.D. The phase jump SPH lies between 0 and ±7.

(5) TFT — This function allows a word whose address is given by the source address Ad.So to be read in a buffer memory. The data read is rewritten in the buffer memory in a word whose address is given by the destination address Ad.D. The value of a code C indicates a complete word or an octet or a sector of a word. The phase jump SPH lies between 0 and ± 32000.

(6) BRAN — This function allows an unconditional connection PH in any point in the program; the allowed connection lies between 0 and 32000. PH is an octal connection phase number.

(7) SAU — This function is an unconditional phase jump SPH; it allows a phase jump lying between 0 and ±32000 to be added to the present phase to connect the program in a determined phase.

(8) REPO — This function is a program standby macroinstruction. The phase jump is zero and the program is in the standby state.

(9) EFF — This function is the last after use of a register word. It allows the register word which has effected the program to be erased.

(10) PRISE — This function initializes a register word. This initialization zation can be carried out on a fast register for effecting a call processing program or on a slow register for call-charging functions. However, this initialization takes place only under certain conditions. For the engaging a slow register, it is sufficient for the flip-flop 118, FIG. 6b to be in the state "1" for the first free slow register to be engaged in a buffer memory which will be used for call-charging. To engage a fast register firstly the flip-flop 118 must be in the state "0"; then the register is engaged in the following conditions:

(a) The number being processed (number given by the register counter 42, FIG. 6b) must not be either the first or the last of the maximum number of registers. Indeed, each of these registers has a well-defined function; the first register is used for traffic observation, e.g. the number of new calls reaching the multi-register during a given period and the last register allows the faults to be processed and transferred towards the input-/output module 24, FIG. 3.

(b) The number of free fast registers must be greater than the number indicated in the macroinstruction either by Enr.Rap.MR1 for the multi-register 10 or by Enr.Rap.MR2 for the multi-register 11, FIG. 2. If a fast register is engaged the following part of the program allows an analysis of the function which caused the register to be engaged (new call, ringing off, new call followed by a message); the connection of the program is then a function of this analysis.

(11) OBTRA — This function allows an incrementation on a value stored in a word of the input/output module address Ad.Ta.Obs is given by the macroinstruction. For example it allows a memory to be incremented in which all the new calls will be stored; after a determined time, this memory will contain all the new calls reaching the multi-register. The phase jump SPH is given by the macroinstruction and lies between 0 and ±127; it contains the value to be added to the present phase of the program to obtain the following phase.

(12) CONSIL 1 — This function allows a double test. First a signalling value is read at the address Ad.Sign, given by the macroinstruction and comparison with a parameter P whose value is also given by the macroinstruction. If the comparison is bad, the phase jump is given by SPH1, if the comparison is good there is a second test on a timing whose address Ad.Te is given by the macroinstruction with a timing parameter P.Te also given by the macroinstruction. If the comparison is good the phase jump is +1; if the comparison is bad, the phase jump is given by SPH2.

The values of the phase jumps are:
SPH2: from 0 to ±127
SPH1: from 0 to ±7

(13) CONSIL 2 — This function is identical to CONSIL 1; only the timing address is different.

(14) CONFES — This function is identical to the previous ones; but the timing parameter PTe is given on 4 bits.

(15) ATTES — This function allows the conformity of the standby time of a signal with a parameter to be confirmed. The signalling is read in the signalling receivers module 22, FIG. 3 at the address AD.Sign given by the macroinstruction; the standby time is compared with a parameter P in the macroinstruction. If the standby time is good there is a phase jump SPH2; if the standby time is bad a timing address Ad.Te given by the macroinstruction is compared with a timing parameter P.Te. If the comparison is good there is a phase jump +1; in the contrary case the phase jump is SPH1.

The respective values of the phase jumps are:
SPH2: from 0 to ±127
SPH1: from 0 to ±7

(16) RMF — This is a test function on the multifrequency signalling received by the signalling receiver module 22. The value of the signalling is read at the address Ad.Sign given by the macroinstruction; this value is compared with a coded parameter C in the macroinstruction. There are three possible codings: 0001 dialling, 0010 signalling, 0100 monitoring frequency: in the first two cases the signalling value is written in the memory at the write-in address Ad.Ins given by the macroinstruction; in the third case, there is only recognition of the monitoring frequency. In these three cases, the phase jump is SPH1; in the case of non-recognition of the code, the phase jump is SPH2.

The respective values of the phase jumps are:
SPH2: from 0 to ±127
SPH1: from 0 to ±7

(17) RSI — This function allows the subcriber signalling or circuit signalling received by pulses to be tested. The address of the signalling received Ad.Sign is given in the macroinstruction; the value of this signalling is compared with an expected parameter P given by the macroinstruction. If the comparison is positive, the phase jump is SPH2; in the contrary case it is SPH1.

The respective values of the phase jumps are:
SPH2: from 0 to ±127
SPH1 from 0 to ±127

(18) SIPO — This function allows the received operator position signalling to be read at the operator position address Ad.Po given by the macroinstruction. This signalling is analysed and orientates the program towards various phase jumps SPH1, SPH3, SPH4, SPH5 according to the value of the signalling. In the case of non reception of the signalling, the phase jump is SPH2 whose value lies between 0 and ±127.

(19) TONAL — This function allows a tone to be sent to a subscriber or a circuit. The macroinstruction gives the address Ad, the function F, the tone Ton and the phase jump SPH. The tone sending instruction keys fill a memory with three words in the signalling transmitter module 23, FIG. 3, which contain 16 memories; if all the memories are full, the function is represented at the following cycle for the processing of the corresponding register.

The phase jump SPH lies between 0 and ±32000.

(20) TOTSI — This function is identical to the function TONAL but is preceded by a test on the signalling receiver module 22, with the indication of the test parameter PT.

If the test is negative, there is a phase jump SPH2 lying between 0 and ±127 and no tone is sent; if the test is positive, the tone Ton is sent and the phase jump SPH1 imposed is ±1.

(21) TETON — This function is identical to the previous one but the sending of the tone Ton is conditioned by a test on the contents of a word in the buffer memory, whose address is Ad.M; this contents is compared with a parameter P. If the test is negative there is a phase jump SPH2 lying between 0 and ±7 and no tone is sent; in the contrary case the tone is sent and a phase jump whose value is +1 is imposed.

(22) TORAZ — This function allows a tone to be sent as set forth in the case of the function n°19, TONAL and one or several timings to be reset to zero. The timing(s) to be reset to zero are given by the timing code C.Te of the macroinstruction.

At the end of timing, there is a phase jump SPH lying between 0 and ±2047.

(23) TOTEM — This function allows a tone such as has been defined in the case of the function TONAL to be sent, but this sending is conditioned by a test on a timing word contained in the buffer memory. The timing address Ad.Te of the macroinstruction gives the address of the timing word to be read in the buffer memory; the contents of this timing word is compared with a timing parameter P.Te. If the contents of the timing word is greater than the timing parameter, the timing is exceeded and there is a phase jump SPH2; in the contrary case, a tone is sent and there is a phase jump +1. The phase jump SPH2 lies between 0 and ±7. The function F for these "TONE" 19–23 functions includes data, amongst other things, to define whether the tone is to be connected or disconnected from the subscriber or the line in question.

(24) TERNUC 6 This function carries out two successive tests; a sector of the buffer memory is read whose address Ad. Sec is given in the macroinstruction; the value of the mask M gives 1 bit in 4 to be tested. If the test is negative, there is a phase jump SPH2; if the test is positive there is a second test on the contents of a key sender dialling register whose address Ad.RNC is given by the macroinstruction in order to check if its contents is zero. If this second test is positive i.e. if the key sender dialling register is at zero, there is a phase jump SPH1; in the contrary case, the phase jump is zero.

The values of the phase jumps SPH1 and SPH2 are from 0 to ±127.

(25) COSPA — This function enables the content of a sector of the buffer memory whose address Ad Sec is given by the macroinstruction to be compared with two parameters P1 and P2, whose values are also given by the macroinstruction. If the content of the sector is equal to P1 there follows the phase jump SPH1. If not there follows a comparison with the second parameter P2; if there is equality there follows the phase jump SPH2, and if not the phase jump SPH3.

The phase jumps SPH2 and SPH3 lie between 0 ±127; the phase jump SPH1 lies between 0 and ±7.

(26) ANAS — This function enables the successive comparison of a parameter with the content of a sector of the buffer memory whose address Ad Sec is given by the macroinstruction. The parameters P1, P2, P3, P4 are also given by the macroinstruction. The content of the sector is first compared with P1; if equal the phase jump is +1; otherwise it it compared with P2, and if equal the phase jump is +2; otherwise it is compared with P3, and if equal the phase jump is +3; otherwise it is compared with P4, and if equal the phase jump is +4; otherwise the phase jump SPH5 is indicated by the macroinstruction and its value lies between 0 and ±2047.

(27) ASMA — This function is identical to the preceding function ANAS, but instead of comparing a sector with 4 parameters a sector is compared with 4 successive masks M1, M2, M3 and M4. The comparison is thus with a presence of a "1" bit in the sector, this presence being given by the value of the masks contained in the macroinstruction. The phase jumps are identical with those of ANAS.

(28) RAZ — This function consists in resetting to zero one or several words in the buffer memory or 2, 4, or 6 bits of a word in the buffer memory. This function starts with a test on the basis of the content of the macroinstruction to define the addresses or the bits to reset zero; all the necessary data is contained in the macroinstruction. The code C indicates according to its value whether it is a word, an octet, a sector or a bit that is to be reset to zero. RAZ 1 concerns the resetting to zero 4 words or 4 octets or 4 sectors, whose respective addresses are 1°Ad, 2°Ad, 3°Ad or 4°ad. RAZ2 concerns the resetting to zero of twice 1, 2, or 3 bits and M1, and M2, are masks; the reset to zero addresses are given by 1°Ad and 2°Ad.

(29) TUTUS — This function enables a first test on one bit in the buffer memory, possibly followed by a second test either on one bit or on one sector according to the indication contained in the code C of the macroinstruction. The first test, which concerns one bit whose address Ad 1 is given by the macroinstruction, is performed by comparison with the value given by the mask M; if the second test concerns one bit the address of this bit is given by the macroinstruction in Ad ¼ and this test is performed by comparison with the value given by the mask M1. If both tests are positive the phase jump is +1; if the first is negative the phase jump is SPH3; if the second test is negative the phase jump is SPH2.

If the second test concerns a 4 bit sector the address of the sector is given by the macroinstruction in Ad ¼, and this test is performed by comparison with the parameter P4. The phase jumps are the same as before.

The values of the phase jumps are:
SPH2 from 0 to ±7
SPH3 from 0 to ±7

(30) TESTUS — This function enables a first test to be performed on a sector of the buffer memory, possibly followed by a second test either on another sector or on one bit according to the indication contained in the code C of the macroinstruction. The first test concerns a sector whose address Ad 4 is given by the macroinstruction and is performed by comparison with the value of the parameter P; if the second test concerns another sector the address of this sector is given by the macroinstruction in Ad ¼ and this test is performed by comparison with the value given by the parameter P4. If both tests are positive the phase jump is +1; if the first test is negative the phase jump is SPH3; if the second test is negative the phase jump is SPH2. If the second test concerns one bit the address of this bit is given by the macroinstruction in AD ¼ and this test is performed by comparison with the value given by the mask M1. The phase jumps are the same as before.

The values of the phase jumps are:
SPH2 from 0 to ±7
SPH3 from 0 to ±7

(31) CHIPO — This instruction allows a digit to be received from an operator position. The address of the received digit is given by the macroinstruction at Ad, this digit is stored in one word of the buffer memory at the address Ad CH given by the macroinstruction, and the phase jump SPH1 lies between 0 and ±7. In the case of non-reception of the digit, the phase jump SPH2 lies between 0 and ±2047.

(32) TES — This function enables a test to be carried out between the contents of a sector of the buffer memory whose address Ad Sec is given by the macroinstruction and the value given by the mask M. If the test is positive the phase jump is SPH1; otherwise it is SPH2.

The values of the phase jumps are:
SPH1 from 0 to ±2047
SPH2 from 0 to ±2047

(33) ANS — This function enables an analysis of the content of a sector of the buffer memory whose address Ad Sec is given by the macroinstruction with respect to a parameter P. If the analysis is good the phase jump is SPH1 otherwise the phase jump is SPH2.

The values of the phase jumps are:
SPH1 from 0 to ±2047
SPH2 from 0 to ±2047

(34) COMPS — This function enables a comparison to be made between a parameter P and the content of a sector of the buffer memory whose address Ad Sec is given by the macroinstruction. If the content is greater than the parameter the phase jump is SPH3; if the content is equal to the parameter the phase jump is SPH2. If the content is less than the parameter the phase jump is SPH1. The values of the phase jumps SPH1, SPH2 and SPH3 lie between 0 and ±127. (35) OMP — This function enables a logic operation or an arithmetic operation to be carried out on a parameter P with a word of the buffer memory whose address Ad M is given by the macroinstruction. The type of operation is encoded in COP of the macroinstruction; this code is sent to the logic circuit 160 controlling the arithmetic circuit 154 in FIG. 9.

The phase jump SPH lies between 0 and ±7.

(36) OMM — This function enables logic or arithmetic operations to be carried out on two words of the buffer memory. The addresses of the words are given by Ad M1 and Ad M2 the type of the operation being given by COP. The phase jumps may be different according to the results of the operation. The phase jumps SPH1, SPH2 and SPH3 lie between 0 and ±7. The phase jump SPH lies between 0 and ±2047.

(37) OMO — This function enables logic and arithmetic operations to be carried out between the content of a word and the content of an octet in the buffer memory; the address of the word is given by Ad M and that of the octet by Ad 0. The phase jumps SPH1, SPH2 and SPH3 are different according to the results of the operation and lie between 0 and ±7. The phase jump SPH lies between 0 and ±2047.

(38) — This function enables logic or arithmetic operations to be carried out between the content of a word and the content of a sector of a word in the buffer memory. The address of the word is given by Ad M and that of the sector by Ad Sec. The phase jumps SPH1, SPH2 and SPH3 differ according to the result of the operation and lie between 0 and ±7, SPH lies between 0 and ±2047.

(39) OMSI — This function is identical to the previous function, OMS, but the addressing of the sector Ad Sec I is indirect.

(40) OPAO — This function enables logic or arithmetic operations to be carried out between an octet addressed Ad O and a parameter P. The type of operation is given by COP. The phase jumps SPH1, SPH2 and SPH3 differ according to the results of the operation, and lie between 0 and ±7; SPH3 lies between 0 and ±2047.

(41) OPOCO — This function enables logic or arithmetic operations to be carried out between the contents of two octets addressed Ad 01 and Ad 02. The type of operation is given by COP. The phase jumps SPH1, SPH2 and SPH3 differ according to the results of the operation and lie between 0 and ±7; SPH lies between 0 and ±2047.

(42) OSO — This function enables logic or arithmetic operations to be carried out between the content of an octet of a word and a content of a sector of a word of the buffer memory, addresses Ad 0 and Ad Sec. The type of operation is given by the operation code COP. The phase jumps SPH1, SPH2 and SPH3 differ according to the results of the operation and lie between 0 and ±7; SPH lies between 0 and ±2047.

(43) OSPA — This function enables logic or arithmetic operations to be carried out between the content of a sector of a word of the buffer memory address Ad Sec and a parameter P. The type of operation is given by COP. The phase jumps SPH1, SPH2 and SPH3 and SPH4 differ according to the results of the operation and lie between 0 and ±7. SPH5 lies between 0 and ±127; SPH lies between 0 and ±2047.

(44) OSS — This function enables logic or arithmetic operations to be carried out between the contents of two sectors of two words of the buffer memory; their addresses are Ad Sec 1 and Ad Sec 2. The type of operation is given by COP. The phase jumps SPH1, SPH2, SPH3 and SPH4 differ according to the result of the operation and lie between 0 and ±7; SPH5 lies between lies between 0 and ±2047.

(45) OSSI — This function enables logic or arithmetic operations to be carried out between the contents of a sector of a word of a buffer memory at address Ad Sec and of another sector of a word of the buffer memory whose indirect address is Ad Sec I. The type of operation is given by COP. The phase jumps SPH1, SPH2, SPH3 and SPH4 differ according to the result of this operation and lie between 0 and ±7; SPH5 lies between 0 and ±127; SPH lies between 0 and +2047.

(46) OSIP — This function enables logic and arithmetic operations to be carried out between the content of a sector of a word of the buffer memory with indirect addressing Ad Sec I and a parameter P. The type of operation is given by COP. The phase jumps SPH1, SPH2, SPH3 and SPH4 differ according to the results of the operation and lie between 0 and ±7; SPH5 lies between 0 and ±127; SPH5 lies between 0 and ±2047.

(47) OSIS — This function enables logic or arithmetic operations to be carried out between the contents of a sector of a word of the buffer memory with indirect addressing Ad Sec I and of another sector of a word whose address is Ad Sec. This type of operation is given by COP. The phase jumps SPH1, SPH2, SPH3 and SPH4 differ according the results of the operation and lie between 0 and ±7; SPH5 lies between 0 and ±127; SPH lies between 0 and ±2047.

All the functions from function 35 OMP to function 47 OSIS can perform the following logic or arithmetic operations: Test, analysis, comparison, addition, subtraction, union (logic OR function), intersection (logic AND function). The type of operation COP is coded on 8 bits which are the bits 17 to 24 of the macroinstruction; the bits 17 to 20 give the code of the shift network 153; bit 23 defines the kind of operation (logic or arithmetic), bit 21 indicates whether a "1" should be applied to the carry input of the arithmetic circuit 154 and the control logic 17. Bit 22 is used to validate the "carry" and "equal" outputs of the arithmetic circuit 154 which define the result of a comparison greater than, equal to or less than; bit 24 gives the imposed phase jump when different from the phase jumps SPH1, SPH2 and SPH3.

(48) ASPRO — This function enables a sub-program to be initialised. It enables a return phase to be calculated from a code C contained in the macroinstruction and causes it to be written in the second word of the buffer memory before taking into account the start phase of the sub-program PH-DEP-SP given by the macroinstruction and causing it to be written in the first word of the buffer memory.

At the end of the macroinstruction a monitor timing whose address is given in the buffer memory by Ad Te is reset to zero.

(49) RETAN — This function enables a return to sub-program to initialise the processing of a fault. It enables a parameter whose value is given by the macroinstruction at P Ins to be written into the buffer memory at the address given by Ad Ins, and then to subtract 1 from the return phase and to write it into the second or third word of the buffer memory according to the value of the code C.

(50) ASPEC — This function enables a dialogue sub-program to be initialised on the basis of data contained in the macroinstruction. Data concerning the processing, the type and the function are given by F in the macroinstruction which also gives the address Ad TE of a buffer zone of an input/output module 24 of the multi-register, as well as the starting phase of the dialogue sub-programme PH-DEB-SPE. The function also resets to zero a timing word in the buffer memory used for the dialogue. The return phase of the dialogue sub-program (return phase equals present phase +2) to which the sub program will return at the end of the dialogue is also stored

(51) MEC — This function enables a short message to be sent from the multi-register towards the input/output module. The function begins by a test on the word zero of a buffer zone of the input/output module; if the word is occupied the system waits and there is thus no phase jump unless the time exceeds the value of the timing P Te given by the instruction; if the word is free the message is sent in the following manner.

The function contained in the word 3 or 43 of the buffer memory is stored in the word 1 of the buffer zone. The data contained in the word of the buffer memory at the address Ad 1 is stored in the word 2 of the buffer zone. The data contained in the word of the buffer memory at address Ad 2 is stored in the word 3 of the buffer zone. The content of the word of the buffer memory at address Ad gives the number of the register in course of processing and is stored in the word zero of the buffer zone. The phase jump is +1 after the short message has been sent. In the case of the timing being exceeded a fault is recorded and a return phase is stored. The address of the buffer zone on which the operations are carried out is stored in the word 4 of the buffer memory.

(52) MLD — Long message, beginning.

(53) MLF — Long message, end.

The function MLD enables the first part (four words) of a long message (8 words) to be sent from the buffer memory towards a buffer zone; this function is necessarily followed by an MLF function enabling the second part of the (4 words) of the long message to sent. These functions are identical to the preceding function MEC but the engaged test on the word zero of the buffer zone is only performed by the function MLD which contains the time parameter P Te.

The function MLD enables the words 1, 2, 3, and 4 of the buffer zone to be respectively loaded from the word 3 of the buffer memory and the words of the buffer memory at addresses Ad 1, AD 2 and AD 3.

The function MLF enables the words 5, 6, and 7 and 0 of the buffer zone to be loaded from the words of the buffer memory at addresses Ad 4, Ad 5, Ad 6 and Ad, the word at address Ad containing the number of the register being processed. The phase jump is +1 at the end of sending a message.

(54) TRENO — This function enables a verification of whether the number of the register being processed corresponds to the number of the register stored in the word 0 of a buffer zone at address Ad TE1. If the test is positive the address of the buffer zone is stored in the word 4 or 44 of the buffer memory and it is from this word that the address of the buffer will be sought when the corresponding register is being processed (see functions MEC, MLD and MLF) If the test is negative a second test is performed on the buffer zone at address Ad TE2 and if this second test is positive the address of the buffer zone is stored in the word 5 or 37 of the buffer memory. If this second test is negative a third test is performed on the buffer zone at address Ad TE3. If this third test is positive the address of the buffer zone is stored in the word 5 or 37 of the buffer memory. If one of the tests is positive the phase jump is +2. If all the tests are negative a timing overflow test takes place at 256 milliseconds and the phase jump is +1 in the case of overflow; in the case of no overflow the phase jump SPH lies between 0 and ±7.

(55) TRETI — This function is substantially identical to the previous function but the comparison is performed between a value stored in a word of the buffer memory whose address is Ad and the content of the first word of a buffer zone whose address is Ad TE1. If this test is negative a second comparison takes place with the content of the first word of the buffer zone at address AD TE2. If the second test is negative a third test is performed with the content of the first word of the buffer zone at address AD TE3. The phase jumps are the same as those for the function TRENO, but the duration of the timing is 51 milliseconds in the present case.

(56) TRADIM — This function enables a parameter whose value P is given by the instruction to be added to the content of the word at address Ad 1 of the buffer memory. The result of the addition is stored in the word at address Ad 2 of the buffer memory. The phase jump SPH lies between 0 and ±7.

(57) RARE — This function enables the storing in five words of the buffer memory of the data contained in a buffer zone of an input/output module.

The address of the buffer zone is given by the content of the word 4 of the buffer memory; the content of the word 1 of the buffer zone is then stored in the word 3 or 43 of the buffer memory; the contents of the words 2, 3, 4 and 5 of the buffer zone are stored respectively in the buffer memory words addressed Ad 1, Ad 2, Ad 3 and Ad 4. After storing the word 0 of the buffer zone is reset to 0 in order to free the buffer zone whose content has just been transferred to the buffer memory. The end of the operation is carried out on the sub-program return phase stored in the buffer memory at word 2 or 42. It will be noted that this function carries out the inverse transfer to function 51 MEC.

(58) RADER —

(59) RAFIR — Both these orders enable the transfer of a long reply from the input/output module to the buffer memory. The function RADER enables transfer of the first part (4 words) of a long reply; it must be followed by an order RAFIR enabling the sending of the second part (3 words) of the reply. The function RADER ends with a resetting to zero of the word 0 of the buffer zone addressed in the input/output module, and it is read in the same way as in the function 57 RARE. The address of the buffer zone is given by the content of the word 4 of the buffer memory and the words of the buffer memory are loaded in the following manner: the word 3 is loaded with the content of the word 1 of the buffer zone, the words at addresses Ad 1, Ad 2, Ad 3, Ad 4, Ad 5 and Ad 6 are loaded with the contents of the words 2, 3, 4, 5, 6 and 7 of the buffer zone. It will be noted that the functions RADER and RAFIR perform the inverse transfer to that performed by the functions MLD and MLF.

(60) TINTER — This function enables an intersection test (logical AND function) between an item of data contained in the first sector of word 6 of the buffer memory and masks M1, M2 and M3 stored in the macroinstruction. A first intersection is performed with the mask M1; if this intersection succeeds a second intersection is performed with the mask M3 and the result is stored in the first sector of the word 6 of the buffer memory; the phase jump SPH2 lies between 0 and ±2047. If the intersection with M1 does not succeed, a second intersection is performed with M2; the result is stored in the first sector of the word 6 of the buffer memory and the phase jump SPH1 lies between 0 and ±2047.

(61) AFICH — This function enables a digit of a number called from an operator position and stored in the buffer memory to be transferred to a free buffer zone of the input/output module whose address is given by Ad TS. A test is performed on the word 0 of the addressed buffer zone to find out if this buffer zone is free; if it is, there is stored therein:

in word 1 the address of the operator position which is contained in the word of the buffer memory whose address is given by Ad PO in word 3, the position of the digit which is stored in the buffer memory word at address Ad Info in word 2, the value of the digit which is stored in word 4 or 44 of the buffer memory in word 0, the content of the word 3 or 43 of the buffer memory which stores data concerning the mode of processing MT, the function F and the type T all given by the macroinstruction. The phase jump is +1.

Once this data has been stored in the input/output module it becomes accessible by the dialogue portion for display of the digit at the operator position whose address is stored in the input/output module; this display enables the operator to verify that each called digit has indeed been taken into account by the exchange.

(62) AFORS — This function is identical to the preceeding function AFICH, but it enables either an instruction that the operator is to perform or a supervisiory signal i.e. the lighting of a supervisiory lamp to pass information to the operator to be sent to the operator position designated by the macroinstruction via the input/output module.

(63) AFINU — This function is identical to the preceeding functions AFICH and AFORS but it enables a complete number stored in the buffer memory to be sent to the operator position designated by the macroinstruction via the input/output module; a subscriber may ask the operator for this number.

(64) INDER — This function enables the storing in the word 0 or 40 of the buffer memory of the beginning phase of the lookup table which enables the dialling to be analysed. Before this storing, the preceeding phase which is stored in the word 0 or 40 of the buffer memory is transferred into the word 1 or 41 of the buffer memory. The dialling analysis phase is obtained by the intersection (logic AND function) of the start phase of the table PH-DEB-TA and the sum of the contents of the words of the buffer memory at addresses Ad G (group address) and Ad Ind (indirect address).

(65) INDEX — This function is identical to the previous function INDER but there is no preliminary transfer of the content of the word 0 or 40 of the buffer memory to the word 1 or 41 of the buffer memory.

(66) ETROS — This function enables three parameters P1, P2 and P3 to be written into sectors of the words of the buffer memory whose addresses are respectively Ad 1, Ad 2 and Ad 3; these addresses each give the address of the word and of the sector within the word. The imposed phase jump is +1.

(67) PIRSI — This function enables a comparison to be performed between the content of a signalling address stored in the buffer memory and a parameter stored in the word at address Ad in the buffer memory. The signalling address is given by the word of the buffer memory whose address Ad is given by the macroinstruction and the content of the signalling receiver module is stored in the word 4 or 44 of the buffer memory. The signalling address thus contains the number of the connection unit, the number of the time slot and the number of the input multiplex.

The value of the parameter is given by the word at address Ad P of the buffer memory. A comparison is performed between the value of the parameter and the contents of the signalling receiver module; in the case of equality the phase jump is SPH1 whose value lies between 0 and ±2047; in the case of non-equality the phase jump is SPH2 whose value lies between 0 and ±127.

(68) SIRAZ — This function enables a comparision to be performed between a parameter and the content of the signalling receiver module at a signalling address. The signalling address, the number of the connection unit, the number of the time slot and the number of the input multiplex are given by the word of the buffer memory whose address Ad Cor is given by the macroinstruction; the value CS of the parameter is given by the macroinstruction. If the test is positive a timing is reset to zero in the word of the buffer memory whose address Ad Te is given by the macroinstruction followed by a phase jump SPH1 whose value lies between 0 and ±127. If the test is negative the timing is not reset to zero and the phase jump is SPH2 whose value lies between 0 and ±127.

(69) CHIMF — This function enables a digit to be sent by multifrequency signalling by sending a command to the signalling transmitter module. The following data is stored in the signalling transmitter module:

in the word 1, the function code F in the word 2, the content of the buffer memory word whose address Ad Cor is given by the macroinstruction; the buffer memory word thus contains the number of a connection unit, the number of a time slot and the number of an output multiplex.

in the word 3, the digit in multi-frequency code which is stored in the word of the buffer memory at address Ad CH.

The phase jump is SPH whose value lies between 0 and ±16000.

(70) TRESI — This function enables a comparison to be performed between the content of a signalling receiver module at the signalling address given by the word of the buffer memory at address Ad Cor with a parameter PS whose value is given by the macroinstruction. If the comparison is positive the imposed phase jump is +1; if the comparison is negative a second comparison is performed between the contents of the word at address Ad E in the buffer memory and the word 0 of a buffer zone of the input/output module whose address Ad TE is given by the macroinstruction. If this second comparison is positive the phase jump is SPH2 whose value lies between 0 and ±7; if it is negative the phase jump is SPH3 whose value lies between 0 and ±7.

(71) RETNOR — This function enables a return to the program to be imposed after the execution of a sub-program. The code C given by the macroinstruction indicates whether this return should be performed towards the program at level 1 or at level 2.

The numbers of the buffer memory words indicated in the preceeding functions are given in octal code.

There now follows a description of the five types of instruction shown in FIG. 10, characterised by the functions ANT, POP, ADM, AIM and ATE; each instruction constitutes a 48-bit instruction word; the bits 1, 2, and 3 define the function of the instruction.

1 — ANT. This function enables either an analysis or a test to be performed according to the value of the mask M of bit 4 of the instruction; if this value is 0 there follows an analysis and if this value is 1 there follows a test.

The analysis enables a 16-bit comparison to be performed by groups of 4 bits with a priority order; the first accumulator 151 is loaded by the preceeding instruction, the second accumulator 152 is loaded by the parameters P1, P2, P3 and P4 of the instruction word of the function ANT; each 4-bit group coming from the shift network 153 is compared respectively in the arithmetic circuit 154 with the parameters P1, P2, P3 and P4; an equality leads to the corresponding phase jump at the output of the comparator 157, i.e. SPH1, SPH2, SPH3 or SPH4 given by the instruction with priority going from SPH1 To SPH4; in the case of a quadruple inequality the phase jump is SPH0 given by the instruction. The phase jumps SPH1 to SPH4 lie between 0 and ±7; The phase jump SPH0 lies between 0 and ±127.

The test is performed on 1, 2, 3 or 4 bits. The first accumulator 151 has been loaded via the multi-register data bus LIMR by the preceeding instruction, but in this case there are 4 times the same group of 4 bits; the second accumulator 152 receives the parameters P1 to P4 which have different forms according to whether 1, 2, 3 or 4 bits are to be tested; each group of 4 bits coming from the shift network 153 is tested in the arithmetic circuit 154 with respect to the respective parameters P1 to P4. The output of the arithmetic circuit 154 is connected to the comparator circuit 157 and the test in the comparator circuit 157 between the contents of the two accumulators 151 and 152 leads to a phase jump corresponding to SPH1, SPH2, SPH3 or SPH4 given by the instruction; the first correct test determines the phase jump in the order SPH1 to SPH4; in the case of an incorrect test the phase jump is SPH0.

The values of the phase jumps SPH1, SPH2, SPH3 and SPH4 lie between 0 and ±7 the value of the phase jump SPH0 lies between 0 and ±127.

Bit 45 — reference MI. This instruction bit, if it has the value 1, prevents the loading of the second acumulator by the bits 5 to 20 of the instruction; the second said accumulator having been already loaded by the preceeding instruction.

2 — POP. This function enables logic and arithmetic operations to be performed; the mode of operation MO depends on the value of bit 4; if this value is zero there follows a logic operation, if this value is 1 then there follows an arithmetic operation.

Bit 5 — reference C. This controls the addressing of the register words of the buffer memory. If its value is 1 it opens the AND gate 120 of the space addressing circuit 39, FIG. 6a, enabling the register words 32 to 63 to be addressed from the buffer memory 20 or 21 working in space addressing. If its value is 0 the AND gate 120 is not opened and the words 0 to 31 of the buffer memory 20 or 21 are addressed in space addressing.

Bits 6 to 8 — reference AD1. These define one address; this address is delivered by the address decoder 167 on the control line LCR.

Bit 9 — this is referenced A and if its value is 1, it authorises the transfer into the first accumulator 151 of data carried by the multi-register data bus LIMR.

Bit 10 — reference T. If its value is 1 it enables 4 transfers on the multi-register data bus LIMR of a 4-bit sector of this multi-register data bus.

Bits 11 to 14 — not used.

Bit 15 — reference AB. If its value is 1 it authorises the transfer of the contents of the first accumulator 151 into the second accumulator 152 via the multi-register data bus LIMR and the logic circuit 161.

Bit 16 — reference C. If the value is 1 it authorises the transfer of the result of the calculation performed by the arithmetic circuit 154 to the third accumulator 155.

Bits 17 to 19 — reference DEC. These bits indicate the type of shift, left or right, to be performed in the shift network 153 on the contents of the first accumulator 151; they also indicate the value of this shift; 1, 4, 8 or 12 for a shift to the right; 1, 4 or 8 for a shift to the left.

Bit 20 — reference BUS. If its value is 1 it authorises the transfer of the contents of the third accumulator 155 onto the multi-register data bus LIMR.

Bits 21 to 24 — reference CAL. The coding of these bits indicates to the arithmetic circuit 154 the type of operation to be carried out on the contents of the first and second accumulators 151 and 152. These operations are the usual logic or arithmetic operations: comparison, addition, subtraction, incremantation (+1) or decrementation (−1) on the content of the first accumulator, union, intersection, exclusion or transfer of the content of one of the accumulators 151 or 152 to the third accumulator 155. The control of the arithmetic circuit is performed by the logic circuit 160.

Bit 25 — reference CE. If its value is 1 it imposes a "1" at the carry input of the arithmetic circuit 154.

Bit 26 — reference CS. If its value is 1 it validates the carry output of the arithmetic circuit 154; this carry output is used to allow a choice of phase jump.

Bit 27 — Not used.

Bit 28 — reference SPHI. If its value is 1 it imposes the phase jump stored in SPHO (bits 37 to 44): this phase jump lies between 0 and ± 127.

Bits 29 to 32 — reference SPH2. These bits define a phase jump whose value lies between 0 and ± 7. This phase jump takes place when the result of the comparison performed by the arithmetic circuit 54 between the contents of the accumulators 151 and 152 indicates that the content of the first accumulator 151 is greater than the content of the second accumulator 152.

Bits 33 to 36 — reference SPH1. These bits define a phase jump whose value lies between 0 and ± 7. This phase jump takes place when the result of the comparison performed by the arithmetic circuit 154 between the contents of the accumulators 151 and 152 indicates the equality of these contents.

Bits 37 to 44 — reference SPHO. These bits define a phase jump lying between 0 and ± 127. This phase jump may be imposed by the bit 28; it may also take place when the result of the comparison by the arithmetic circuit 154 between the contents of the accumulators 151 and 152 indicates that the content of the first accumulator 151 is less than the content of the second accumulator 152.

Bit 45 — reference MI. This bit, if it has the value 1, indicates that the coding of the bits 21 to 24 which define the type of operation to be performed by the arithmetic circuit 154 does not come from the instruction word for the function POP but from the macroinstruction in the course of execution which is loaded in the control register 159 by the multi-register data bus LIMR; the content of the control register is applied to the control input of the arithmetic circuit 154 via the logic circuit 160.

3 - ADM. This function enables the writing or reading of a complete register word of 1 to 4 sectors of this word in a buffer memory; writing or reading is performed by direct addressing of the buffer memory, the address being given by bits 11 to 18 reference ADME of the instruction.

Bit 4 — reference E/L. This bit indicates writing if its value is 1 and reading if its value is zero.

Bit 5 — reference C. This bit controls, as in the instruction of function POP, the addressing of the words stored in the buffer memory 21 or 22 operating in space addressing. If its value is 1 it enables the addressing of register words 32 to 63, if its value is 0 register words 0 to 31 are addressed.

Bits 6 to 8 — AD1. These bits define an address; this address is delivered by the address decoder 167 on the control line LCR.

Bit 9 — reference A. This bit, if it has the value 1, authorises the transfer into the first accumulator 151 of data coming from a buffer memory via the multi-register data bus LIMR.

Bit 10 — reference T. As for the instruction of the function POP, if its value is 1 this bit enables the four-fold transfer on the multi-register data bus LIMR of a sector of a register word.

Bits 11 to 16 — reference ADME. These bits define an address of a word of the buffer memory.

Bits 17 and 18 — SEC. These bits provide the number of sector (S) of the buffer memory word whose address is given by ADME. The sector 1 is encoded 00 the sector 4 is encoded 11.

Bit 19 — reference V. If it has the value 1 this bit validates the addressing of a sector; if it has the value 0 it validates the addressing of a word (4 sectors) or of an octet (2 sectors).

Bit 20 — reference AC. This bit authorises complimentary addressing of the space addressing circuit 39 of FIG. 6b for the address register 57.

Bits 21 to 36 — reference P. These 16 bits define a parameter which has two different uses.

If the address signal AD 103 encoded on bits 6 to 8 delivered by the address decoder 167 on the control line LCR is validated, the contents of the 16 bits of the parameter are sent via the multi-register data bus LIMR for writing in the buffer memory; if the address signal AD 103 is not validated some of the bits of the parameter are combined with the bits 6 to 8 of the address AD 1.

Bits 37 to 44 — reference SPHI. These bits define a phase jump imposed by the instruction; the value of this phase jump lies between 0 and ± 127.

Bit 45 — reference PH. This bit enables the next phase of the macroprogram to be written into the buffer memory at the end of processing of an instruction; in this case the bit 4 has the value 1 (writing).

4 - AIM — This function enables, as the function ADM, the writing or reading of a complete register word or of 1 to 4 sectors of this word in a buffer memory but with the function AIM writing or reading is performed by indirect addressing, i.e. the address of the register word is contained in the address register 57 of FIG. 6b, loaded either by the multi-register data bus LIMR, or by the content of a register word, or during the phase which preceeded the present instruction of function AIM. The bits 4 to 10 and 19 to 44 have the same meaning as the corresponding bits of the instruction whose function is ADM.

Bit 11 — reference BUS. If its value is 1 it enables the content of the first accumulator 151 to be sent onto the multi-register data bus LIMR.

Bits 12 and 13 — not used.

Bit 14 — BUS. If its value is 1 it enables the content of the second accumulator 152 to be sent onto the multi-register data bus LIMR.

Bit 15 — reference ACB. If its value is 1 it authorises the loading of a second accumulator 152 from the multi-register data bus LIMR.

Bit 16 — reference TO. If its value is 1 it enables the regrouping in 8's of the 16 wires which constitute the multiregister data bus LIMR, each group of 8 constituting 1 data item.

Bits 17, 18 and 45 — not used.

5 - ATE. This function enables transfers between the register words present in a buffer memory and the input/output module 24 of the multi-register; as indicated in the description of the input/output module this device has one or two input/output blocks (TES0 and TES1). The input/output module enables the storing of dialogue data passing between a multi-register 10 or 11 and the dialogue portion 12 which is associated with them as indicated in FIGS. 2 and 3. One instruction of function ATE comprises two symetrical parts: the buffer memory addressing part and the input/output module addressing part. Buffer memory addressing part.

Bit 4 — reference E/L. If its value is 1 it indicates writing in the buffer memory; if its value is 0 it indicates reading from the buffer memory.

Bit 5 — reference C. As far the instruction of function POP this bit controls the addressing of words stored in the buffer memory 20 or 21 operating in space addressing.

Bit 6 — reference TES0. If its value is 1 this bit enables the addressing of the first input/output block of the input/output module 24 to be validated.

Bit 7 — reference TES1. If its value is 1 this bit enables the second input/output block of the input/output module 24 to be validated.

Bit 8 — reference VMI. If its value is 1 this bit enables the part of the macroinstruction to be sent onto the multi-register data bus LIMR to be validated.

Bits 9 to 20. These bits have the same use as the bits 9 to 20 of the instruction of function ADM, i.e. direct addressing of the buffer memory. Input/output module addressing part.

Bits 21 to 28 — reference ADTES. These bits give the address of a word in the buffer block.

Bits 29 and 30 — reference Sec. These bits give the number of one or several sectors of the word designated by ADTES.

Bit 31 — refernce V. If it has the value 1 this bit validates the addressing of a sector; if it has the value 0 it validates the addressing of a word (4 sectors) or of an octet (2 sectors).

Bit 32 — reference E. If it has the value 1 this bit authorises writing in one memory block TES0 or TES1.

Bit 33 — reference CH1. If it has the value 1 this bit authorises the loading of the addressing register of the buffer block TES0 or TES1 by the multi-register data bus LIMR.

Bit 34 — reference Ad. If it has the value 1 this bit authorises the addressing of a word of the buffer block from the addressing register previously loaded by the bit 33.

Bit 35 — reference CH2. If it has the value 1 this bit authorises the loading of the second accumulator 152 from the multi-register data bus LIMR.

Bit 36 — reference T. If it has the value 1 this bit authorises the transfer of the register number onto the multi-register data bus LIMR.

Bits 37 to 44 — reference SPH1. These bits define an imposed phase jump; its value lies between 0 and ± 127.

Bit 45 — reference L. If it has the value 1 this bit indicates reading of the buffer block designated by one of the bits 6 or 7 referenced TES0 or TES1.

For all the instructions described above the bits 46 and 48 have the same meaning; the bit 47 is not used.

Bit 46 — reference RSI. This bit is used to validate the direction in which dialogue passes with the signalling receiver module 22, FIG. 3. If its value is 1 the signalling receiver module sends data on the multi-register data bus LIMR; if its value is 0 the signalling receiver module receives data via the multi-register data bus LIMR.

Bit 48 — reference IMP. This is the parity check bit of the instruction word.

If the number of 1's of the instruction word is odd its value is 0; if the number of 1's of the instruction word is even its value is 1 in order to re-establish odd parity of the instruction word.

For the functions POP, ADM and AIM the bits 6 to 8 define address referenced AD 1 in the instruction word of FIG. 10; the address referenced AD 1 is delivered by the address decoder 167, FIG. 9, to the control line LCR which delivers the address signals AD 101 to AD 107 as has already been explained in the description of FIG. 9.

The dialogue portion 9 of FIG. 2 shown schematically in FIG. 4 will now be described.

FIG. 14 is a block diagram of the control logic device 26 of FIG. 4; in FIG. 14 the control logic block 27 of FIG. 4 is constituted by a direct and indirect addressing module 270, a central memory module 271, an operation block module 272, a phase processing module 273, a data regrouping module 274, a timing memory and priority calls logic module 275, two AND gates 281 and 282 and an invertor 283. There is also in FIG. 14 the instruction memory block 28 of FIG. 4, while the module 276 represents the remaining modules 29 to 34 of FIG. 4; these modules will be described further on. The modules 270, 271, 272, 273, 274 and 275 and the instruction memory block 28 are connected to a dialogue portion data bus LIME; these modules and the module 276 are connected to a control line LCE and to an address bus LAE. The modules 272, 274, 275 and 276 are connected to a data test bus LTI. The direct and indirect addressing module 270 is connected to the central memory module 271 by a connection 277; the operation block module 272 is connected to the phase processing module 273 by a connection 278; the phase processing module 273 is connected to the instruction memory block 28 by a connection 279; the direct and indirect addressing module 270 is connected to the module 276 by the addressing line LAD. The dialogue portion data bus LIME is connected to one input of the AND gate 281 whose output is connected to the dialogue bus LIE which is connected to the module 276, the said dialogue bus LIE being connected to one input of the AND gate 282 which can thus receive data coming from the module 276. The connection 280 connects the control line LCE to another input of the AND gate 282 and to the input of the invertor 283 whose output is connected to another input of the AND gate 281, the said connection 280 connected to the control line LCE being used to bring the bit 46 of the instructions of the functions OPE, AMT and AES as will be described below and which are provided by the instruction memory block 28; the output of the invertor 283 is connected to the input of the AND gate 281; the output of the AND gate 282 is connected to the dialogue portion data bus LIME. In the absence of a bit 46 the AND gate 281 is validated and the data present on the dialogue portion data bus LIME is transmitted to the dialogue bus LIE; when the bit 46 has the value 1 the AND gate 282 is validated and the data present on the dialogue bus LIE is transmitted to the dialogue portion data bus LIME.

FIG. 15 shows the direct and indirect addressing module 270 and the central memory module 271.

In the direct and indirect addressing module 270 an AND gate 290 has one input connected to the dialogue portion data bus LIE and another input receives, via a line 291 connected to the address bus LAE an address AD1; the output of the AND gate 290 is connected to the input of a memory addressing register 292 whose output is connected to an input of an AND gate 293; another input of the AND gate 293 is connected to the control line LCE and receives therefrom the bit 10 of the instruction of the function AMT. An AND gate 294 receives on one input the function AMT from the function decoder 343 of the instruction memory block 28 as shown in FIG. 17; another input connected to the control line LCE receives therefrom the bits 11 to 16 and 17 to 20. The outputs of the AND gates 293 and 294 are connected to respective inputs of an OR gate 295 whose output is connected by a via the connection 277 to the addressing circuit 297 of the memory 298; the output of the OR gate 295 is also connected to addressing line LAD to which it delivers addresses defined by 6 bits. The direct and indirect addressing module 270 enables writing or reading in the central memory 298 either by direct addressing or by indirect addressing. In direct addressing the address is given by the instruction of function AMT; this mode of addressing only allows the first 64 words of the memory 298 to be scanned. In indirect addressing the memory 298 is addressed by the memory addressing register 292 previously loaded from the dialogue portion data bus LIME; the use of this addressing mode enables the whole of the memory 298 to be addressed since the AND gate 293 receives the pagination bit 10 of the instruction of the function AMT (see the description of the instructions below).

The central memory module 271 is shown in FIG. 15; it comprises a memory 298 with its addressing circuit 297, a parallel output register 299 and two AND gates 300 and 301. The memory 298 has a capacity of 256 sixteen-bit words and its input and output are connected to the dialogue portion of the data bus LIME; each word is divided into 4 sectors of 4 bits each, each sector being of independant access. Writing or reading in the memory is performed in parallel. The AND gate 300 has one input connected to the dialogue portion data bus LIME, another input connected to the address bus LAE to receive the address AD1, and another input connected to the control line LCE to receive the bit 29; the AND gate 301 has one input connected to the output of the parallel output register 299, another input connected to the address bus LAE to receive the address AD1, and another input connected to the control line LCE to receive the bit 22; the output of the AND gate 301 is connected to the dialogue portion data bus LIME.

The central memory module performs the role of a buffer between the operation block module 272, the memories of the peripheral modules and the modules for dialogue between the control units 29, for dialogue with the switching network 30, and for dialogue with the connection units 31; in the memory 298 different sorts of data are stored: intermediate results, operational messages in the course of processing, return phases, program labels, program loop counts and various parameters. The data read in the memory 298 is sent to the parallel output register 299 via the dialogue portion data bus LIME.

FIG. 16 shows the operation block module 272 of FIG. 14. The operation block enables data to be tested, data to be shifted, and logic and arithmetic operations to be carried out in order to obtain different phase jumps as functions of the results of these operations. An AND gate 306 has an input connected to the dialogue portion data bus LIME, and another input connected to an invertor 305 which receives function TAN; another input connected to the control line LCE receives the bit 9 so that the said gate is not active during an instruction of function TAN. The output of the AND gate 306 is connected to an input of an OR gate 307 which has another input connected to the data test bus LTI. The output of the OR gate 307 is connected to the input of a first accumulator A whose output is connected to the input of a shift network 308 having its shift control circuit 309 connected both to the control line LCE from which it receives the bits 17 to 20 of the instruction and to the function decoder 343 of the instruction memory block 28 (FIG. 17) from which it receives the function OPE. The shift network 308 enables shifts to be performed to right or to left on the content of the first accumulator A; the value of the shift is given by the bits 17 to 20 of the instruction of function OPE; the contents of the first accumulator A, whether shifted or not, may be sent directly from the output of the shift network to the dialogue portion data bus LIME via an AND gate 311 since the output of the shift register is connected to one input of the said AND gate 311 as well as to an input of an arithmetic circuit 310. Another input of the AND gate 311 is connected to the address bus LAE to receive the address AD1; an AND gate 313 has one input connected to the dialogue portion data bus LIME and another input connected to the control line LCE from which it receives the instruction bit 15; an AND gate 314 has an input connected to the control line LCE from which it receives the bits 5 to 20 and another input which receives the function TAN from the function decoder 343 of the instruction memory block 28. The AND gates 313 and 314 have their outputs connected to respective inputs of an OR gate 315 whose output is connected to the input of a second accumulator B having its output connected to an input of the arithmetic circuit 310 to an AND gate 312 and to a comparator 318. The AND gate 312 has an input connected to the output of the second accumulator B, and another input connected to the address bus LAE from which it receives an address AD1. The arithmetic circuit 310 is controlled by a control circuit 316 having an input connected to the control line LCE from which it receives the bits 4 and 21 to 24 at another input which receives the function OPE.

The arithmetic circuit 310 may perform sixteen logic or arithmetic operations on two words contained in the first and the second accumulators A and B; these operations may be performed on one of the sixteen bit words by groups of 4 bits or alternatively bit by bit. The output of the arithmetic circuit 310 is connected to the input of a third accumulator C whose output is connected to an input of an AND gate 317 having another input connected to the address bus LAE and receiving at address AD1 therefrom. The output of the arithmetic circuit 310 is also connected to an input of a comparator 318 having 4 outputs connected to a priority circuit 319 which enables one and only one phase jump to be selected; the priority circuit 319 has 5 outputs connected respectively to one input each of AND gates 320, 321, 322, 323 and 324 each of which has another input connected to the control line LCE from which they receive respectively the bits 33 to 36, 29 to 32, 25 to 28, 21 to 24 and 37 to 44 which determine the phase jumps SPH1, SPH2, SPH3, SPH4 and SPH0. During an instruction of function OPE only three phase-jumps at the most are used; during an instruction of function TAN all five phase jumps are possible, the fifth SPH0 being the negation of the four others. The output of the AND gate 320, 321, 322, 323 and 324 are connected to respective inputs of an OR gate 325 whose output is connected by the connection 278 to the phase processing module 273.

FIG. 17 shows the phase processing module 273, the instruction memory block 28 and the data regrouping module 274. The phase processing module 273 comprises an arithmetic circuit 330, two AND gates 331 and 333, an invertor 332 an OR gate 334 a phase preparation register 335, a phase register 336 and a phase decoder 337. An input of the arithmetic circuit 330 is connected by the connection 278 to the output of the OR gate 325 of FIG. 16; another input is connected to the output of the phase register 336 and another input is connected by the connection 338 to the exchange desk which enables a program of instructions to be imposed. The output of the arithmetic circuit 330 is connected to an input of the AND gate 331. The AND gate 333 has an input connected to the address bus LAE from which it receives an address AD3 during an instruction of function AES; the said input is connected via an invertor 332 to another input of the AND gate 331. Another input of the AND gate 333 is connected to the dialogue portion data bus LIME. The outputs of the AND gates 331 and 333 are connected to respective inputs of an OR gate 334 whose output is connected to the input of the phase preparation register 335 which has its output connected to the input of the phase register 336. The output of the phase register 336 is connected to the input decoder 337 whose output is connected by the connection 279 to the addressing circuit 341 of the instruction memory 342 of the instruction memory block 28.

The instruction memory block 28 comprises an instruction memory 342 with its addressing circuit 341, a function decoder 343, an addresser decoder 344, an AND gate 345, and a parity check circuit 346. The output of the instruction memory is constituted by the 48 bits of the instruction and is connected both to the control line LCE and to the inputs of the function decoder 343 and the address decoder 344. The function decoder 343 has 4 outputs which each correspond to one function TAN, OPE, AMT and AES characterising one instruction. The address decoder 344 delivers at its output the addresses AD1, AD2 and AD3 contained in the instructions of function OPE, AMT and AES; the output of the address decoder 344 constitutes and address bus LAE. The parity check circuit 346 has its input connected to the control line LCE and its output is connected to the exchange desk by the connection 347. The AND gate 345 has an input connected to the output of the instruction memory 342 and receives therefrom bits 21 to 36 and has another input connected to the output of the instruction memory 342 from which it receives the bit 45 which can only have the value "1" for instructions of functions AMT and AES; the output of the AND gate 345 is connected to the dialogue portion data bus LIME.

The data regrouping module 274 is constituted by four AND gates 351, 352, 353 and 354 and an OR gate 355; one input of each of the said AND gates is connected to the address bus LAE and receives therefrom an address AD1; another input of each of the AND gates is connected to the dialogue portion data bus LIME and a third input of these same AND gates is connected to the control line LCE which delivers one of the bits 23 to 26 to the respective AND gates. The output of each of the AND gates is connected to a respective input of the OR gate 355 whose output is connected to the data test bus LCI. The data regrouping module 274 ensures the selection of one four-bit sector from 4 sectors of the dialogue portion data bus LIME to select the sector on the data test bus LTI for test purposes, for analysis or comparison in the operation block module 272. This is particularly interesting in so far as the content of a word of the memory 298 of the central memory module 271 can also be applied to the dialogue portion data bus LIME in sectors of 4 bits.

FIG. 18 shows the timing memory and priority call logic module 275. In this specification "priority calls" and "calls" are akin to "interrupts" of computer technology (although some are more urgent than others) and are not to be confused with the traffic switched by the exchange which is made up of telephone calls. The priority call logic module 275 comprises an AND gate 360 having an input connected to the dialogue portion data bus LIME and another input connected to the address bus LAE which delivers an address AD3 thereto; another input is connected to the output of the function decoder 343 (FIG. 17) which supplies the function AES. The output of the AND gate 360 is connected to the input of an addressing register 361 whose output is connected to an input of an OR gate 362. An AND gate 363 has an input connected to the dialogue portion data bus LIME and another input connected to the address bus LAE from which it receives an address AD3; the output of the AND gate 363 is connected to one input of an OR gate 364 whose output is connected to the input of a timing memory 365. The OR gate 362 receives on another input the clock signals $ti$ (FIG. 8) which are tied to the time slots of the telephone exchange multiplex; the output of the OR gate 362 is connected to an addressing circuit of the timing memory 365. The timing memory 365 has a capacity of 32 twelve-bit words, each word further comprising an "overflow" bit. The output $m$ of the timing memory is connected to the input of a reducer 366 whose output is connected to another input of the OR gate 364; the output $m$ is also connected to an input of an AND gate 367 whose other input is connected to the address bus LAE from which it receives an address AD1. The overflow output $d$ of the timing memory is connected to an input of an AND gate 368 which receives on another input the clock signals $ti$ of the time slots; the output of the AND gate 368 is connected to the input of a first priority call register 369 whose output is connected to an input of an OR gate 370; a second priority calls register 371 has its input connected to the output of an OR gate 373 whose inputs are connected respectively by the connections 374, 375 and 376 to the connection units dialogue module 31 of FIG. 19, to the module for dialogue between both control units 29 of FIG. 20 and to the module for dialogue with the switching network 30 of FIG. 21; the second priority calls register 271 thus receives via the OR gate 373 the priority calls coming from modules 29, 30 and 31; if other dialogue modules or peripheral modules are required to originate priority calls they are also connected to said AND gate 373. The output of the second priority calls register 271 is connected to another input of the OR gate 370 whose output is connected to an input of an AND gate 372 having another input connected to the address bus LAE from which it receives an address AD1. The writing of a timing value in the memory is performed from the dialogue portion data bus LIME via the AND gate 363, the timing memory 365 being space addressed from the addressing memory 361 and via the OR gate 362. Cyclic scanning of the memory is then carried out in time addressing on the bases of the clock signals $ti$. The address word is stored in the reducer 366 where it is decremented and then rewritten in the timing memory 365 via the OR gate 364 to the same address. The value of the addressed word may be read on the dialogue portion of the data bus LIME from the AND gate 367. When the reduction of a word is terminated an overflow signal is generated enabling the storage in the first priority call register 369 of the time address of the word which has overflowed. This address may be read on the dialogue portion data bus LIME via the OR gate 370 and the AND gate 372.

The second priority call register 371 can store eight priority calls for example and the origin of the call may be discovered by reading the register. A priority call management program establishes a hierarchy in the urgency of the tasks that the dialogue portion program will undertake; this is indispensable since several priority calls could be simultaneously delivered by several peripheral or dialogue modules.

The instructions used in the dialogue portion will now be described, these instructions being 4, as was indicated during the description of FIG. 14 and each of them is characterised by a function: TAN, OPE, AMT and AES; these instructions are defined by 48 bits, the functions being defined by bits 1, 2 and 3 of each instruction. FIG. 26 gives the format of the dialogue portion instructions.

(1) TAN — This function enables an analysis or a test according to the value of the mask M of bit 4 of the instruction to be performed; if the value is 0 an analysis is performed and if the value is 1 a test is performed.

The analysis which corresponds to the case where the value of the bit 4 is 0 enables a comparison to be performed on 16 bits by groups of 4 bits in order of priority. The accumulator A is loaded during the previous instruction by the dialogue portion data bus LIME or by the data test bus LTI, the accumulator B is loaded by the parameters P1, P2, P3 and P4 of the instruction of function TAN. Each group of 4 bits is compared with a respective one of P1, P2, P3 and P4; in the case of equality there is a corresponding phase jump SPH1, SPH2, SPH3 and SPH4 with priority running from SPH1 and SPH4. In the case of quadruple inequality the phase jump is SPH0. The phase jumps SPH1, SPH2, SPH3 and SPH4 have a value lying between 0 and ± 7. The phase jump SPH0 has a value lying between 0 and ± 127.

The test which corresponds to the case where the value of the bit 4 is 1 is performed on 1, 2, 3 or 4 bits. The accumulator A is loaded during the preceeding instruction by the dialogue portion data bus LIME or by the information test bus LTI but in this case the same group of 4 bits is found 4 times over. The accumulator B receives the parameters P1 to P4 directly. These parameters are of different forms according to whether 1, 2, 3 or 4 bits are to be tested. As for the analysis, the comparison between the contents of the two accumulators A and B leads to the corresponding phase jump SPH1, SPH2, SPH3 or SPH4 given by the instruction; the first correct comparison determines the phase jump in the order SPH1 to SPH4; in the case of an incorrect comparison the phase jump is SPH0.

Bit 45, 46 and 47 — These bits are not used.

Bit 48 — Parity check bit.

(2) OPE: This function enables arithmetic or logic operations to be performed on operands already present in the accumulators, or to call and test or analyse in a single phase an item of data present on the information test bus LTI. The mode of operation MO is a function of the bit 4; if its value is 0 there follows a logic operation, if its value is 1 there follows an arithmetic operation.

Bits 5 to 8 — reference AD1. This is a 4-bit microinstruction which enables the data to be tested to be transferred from the data test bus LTI into accumulator A.

Bit 9 — reference A. If its value is 1 it authorises the transfer of the data present on the dialogue portion data bus LIME into the accumulator A.

Bits 10 to 14 — reference AD2. This is a 4-bit microinstruction which supplies the source address of the data to be tested which data is then delivered on the data test bus LTI.

Bit 15 — reference B. If its value is 1 it authorises the transfer of the content of the accumulator A to the accumulator B via the dialogue portion data bus LIME.

Bit 16 — reference C. If its value is 1 it authorises the transfer of the results from the arithmetic circuit 310 (FIG. 16) into the accumulator C.

Bits 17 to 20 — reference DEC. The coding of these 4 bits indicates the type of shift, left or right, to be performed on the content of the accumulator A; they also indicate the value of this shift; 1, 4, 8, or 12 for a shift to the right, 1, 4 or 8 for a shift to the left.

Bits 21 to 24 — reference CAL. The coding of these bits indicates to the arithmetic circuit 310 the type of operation it is to perform on the contents of the accumulators A and B. These operations are the usual logic or arithmetic operations; comparison, addition, substraction, incrementation (+1) or decrementation of the content of the accumulator A, union, intersection, exclusion, transfer of the content of one of the accumulators the other: A to B, and A or B into C.

Bit 25 — reference CE. If its value is 1 it imposes a 1 at the input of the arithmetic circuit 310.

Bit 26 — reference CS. If its value is 1 it validates the carry output of the arithmetic circuit 310; this carry output is used to enable a choice in the phase jump.

Bit 27 — reference CH. If its value is 1 this bit authorises either a test if the bit 22 has the value 1 between the content of the accumulator A loaded by the data test bus LTI and the value of the parameter P defined by the bits 29 to 32 or an analysis, if the bit 22 has the value 0, between the content of the accumulator A and the value of the parameter P. If the bit 27 has the value 0 there is a comparison performed between the content of the accumulators A and B and in this case the bits 29 to 32 do not represent a parameter but represents a phase jump.

Bit 28 — reference SPI. If its value is 1 this bit imposes an unconditional phase jump given by the bits 37 to 44. This bit 28 will thus have the value 1 for all types of operations of function OPE except for test, analysis and comparison operations for which the phase jump is a function of the result of the operation. Bits 29 to 32 — reference P/SPH2. These bits either give the value of a parameter P if the bit 27 has the value 1 or the value of a phase jump SPH2 if the bit 27 has the value 0, in which case it applies to during a comparison between the contents of the accumulators A and B; in this case SPH2 gives the value of the corresponding phase jump if the comparison indicates that the content of the accumulator A is greater than the content of accumulator B. The value of the phase jump SPH2 lies between 0 and ± 7.

Bits 33 to 36 — reference SPH1. These bits define a phase jump corresponding either to an equality between the contents of the accumulators A and B during a comparison or to a positive test or to a positive analysis in which case the bit 27 has the value 1. The value of the phase jump SPH1 lies between 0 and ± 7.

Bits 37–44 — reference SPH0. These bits define a phase jump whose value lies between 0 and ± 127. This phase jump takes place in the case where there has not been a phase jump SPH1 or SPH2, i.e. in the case of a negative test or in the case of a comparison indicating that the content of the accumulator A is less than the content of the accumulator B. It is also the value of the imposed phase jump (bit 28 equal to 1) for all usual arithmetic or logic operations.

Bit 45 — not used.

Bit 46 — reference CB. This bit enables data to be exchanged (dialogue) by means of the dialogue bus LIE, between peripheral modules or dialogue modules and the control logic device 26 (FIG. 14) of the dialogue portion. Data carried by the dialogue bus LIE is validated in the direction peripheral/control logic device if the value of this bit is 1 and the data is validated in the direction of control logic device/peripherals if the value of this bit is 0.

Bit 47 — not used (3) AMT. This function enables the writing or reading of data (parameter or variable) in the central memory module 271 and the simultaneous addressing of a stored address for writing to the memory or a destination address for reading from the memory of a dialogue module or of a peripheral module by means of the addressing line LAD or by an address AD1 delivered by the address bus LAE.

Bit 4 — reference EL. If its value is 1 it enables the writing of a word into the addressed memory; if its value is 0 it enables the reading of a word in the addressed memory.

Bits 5 to 8 — reference AD1. These bits define an address in a peripheral module or in a dialogue module or further in the control logic device; combined with bits 21 to 36 of the parameter P they enable a source address for writing into the memory or a destination address for reading from the memory to be validated.

Bit 9 — reference A. If its value is 1 this bit authorises the transfer into the accumulator of data carried by the dialogue portion data bus LIME.

Bit 10 — reference PAG. This bit enables the pagination of the memory 298 of the central memory module 271; if its value is 1 it enables the memory to be addressed beyond the 64 words addressable by the instruction of order of function AMT. If this bit is validated, that is to say if it has the value 1, the address of the memory is a combination of the content of the memory addressing register 292 loaded by a preceeding instruction and the bits 11 to 16 reference ADMT which define an address of a word in a page of the memory.

Bits 11 to 16 — reference ADMT. These bits give the address of a word in the memory 298; the address is coded on 6 bits which enables the addressing of one word out of 64; if the bit 10 has the value 0 the addressing relates to a word whose address i.e. its number lies between 0 and 63; if the bit 10 has the value 1 the addressing concerns a word whose address is given by the bits 11 to 16 in combination with the content of the memory addressing register 292 loaded by a preceeding instruction.

Bits 17 to 20 — reference SCT. These bits enable the validating of 1 to 4 sectors of the word at address ADMT.

Bits 21 to 36 — reference P. This is a parameter. If the bit 45 has the value 1 the parameter P is transferred via the dialogue portion data bus LIME to be written into the memory if the bit 4 has the value 1. If the bit 45 has the value 0 the bits of the parameter are combined with those of the address AD1 to validate a source address if the bit 4 has the value 1 or a destination address if the bit 4 has the value 0.

Bits 37 to 44 — reference SPH. These bits define a phase jump to be performed at the end of the instruction of function AMT; the value of the phase jump lies between 0 and ± 127.

Bit 45 — reference BUS. If the value of this bit is 1 it authorises the transfer of the parameter P via the dialogue portion data bus LIME.

Bit 48 — reference CB. If its value is 1 this bit enables the validation of the dialogue bus LIE in the direction peripheral or dialogue module towards the control logic device 26; this is justified particularly in the case where the bit 4 has the value 1 which corresponds to writing in the memory 298 of data coming from a peripheral or dialogue module. If its value is 0 this bit 45 enables the validation of the dialogue bus LIE in the direction control logic device towards a peripheral or dialogue module; this is justified in particular if the bit 4 has the value 0 which corresponds to the reading of data in the memory 298 of the central memory module 271 destined for a peripheral or dialogue module.

Bit 47 — not used (4) AES. This function enables the transfer of data from a source address reference AD1 to a destination address reference AD3.

Bit 4 — not used

Bits 5 to 8 — reference AD1. These bits define an address; combined with the bits of the parameter P they enable the validation of a source address for data transfer.

Bit 9 — reference A. If its value is 1 this bit authorises the transfer into the accumulator A of data present on the dialogue portion data bus LIME.

Bits 10 to 14 — reference AD2. These bits define an address which delivers a source address validation of data to be tested.

Bit 15 — reference B. If its value is 1 this bit authorises the transfer into accumulator B of data present on the dialogue portion data bus LIME.

Bits 16 to 20 — reference AD3. These bits define an address combined with the bits of the parameter P they enable the validation of a destination address for data transfer.

Bits 21 to 36 — reference P. This is a parameter which has two uses. If the bit 45 has the value 1 the parameter is transferred onto the dialogue portion data bus LIME to be written into a destination address validated by AD3; the bits present on the dialogue portion data bus LIME can be combined with those of AD3 to reset bistables to 0 or to set them to to 1 or else for a complete initialisation of the control logic device. If the bit 45 has the value 0 the bits of the parameter are combined with those of AD1 to validate the source addresses which are the origins of the data to be transferred.

Bits 37 to 44 — reference SPH. These bits define a phase jump to be performed at the end of the instruction of function AES; the value of the phase jump lies between 0 and ± 127.

Bits 45 — reference BUS. If its value is 1 this bit authorises the transfer of the parameter P on the dialogue portion data bus LIME.

Bit 46 — reference CB. If its value is 1 this bit enables the validation of the dialogue bus LIE in the direction peripheral or dialogue module towards the control logic device; if its value is 0 the dialogue bus LIE is validated in the opposite direction. This is particularly interesting for returning data stemming from the dialogue modules to the control logic device to be tested for example. Similarly it is possible to write data stemming from logical or arithmetic operations performed by the control logic device into the dialogue modules.

Bit 47 — not used.

Bit 48 — For all the instructions of functions TAN, OPE, AMT and AES described above, the bit 48 reference IMP has the same meaning; it is the parity check bit. If the number of 1's in the instruction work is odd its value is 0; if the number of 1's of the instruction word is even then its value is 1 in order to re-establish the odd parity of the instruction words.

FIG. 19 shows the connection unit dialogue module 31 of FIG. 4. This module enables the transmission and reception of messages between the connection unit and the dialogue portion of the control unit. A register 381 has its input connected to the output of an AND gate 384 having an input connected to the dialogue bus LIE, another input connected to the address bus LAE from which it receives an address AD1 and another input connected to the control line LCE; the output of the register 381 is connected to the input of an AND gate 385 which has another input connected to the address bus LAE from which it receives an address AD1 and another input connected to the control line LCE; the output of the AND gate 385 is connected to the dialogue bus LIE. The output of the register 381 is also connected to the addressing input of the multiplexer 382 and the demultiplexer 383. The multiplexer 382 has its inputs connected to connection units by marking lines LU1, LU3, LU5 and LU7 which lines are double lines. As has been said before the exchange includes 64 connection units divided into 4 groups; the marking lines LU1, LU3, LU5 and LU7 are connected respectively to the selection units 0 to 15, 16 to 31, 32 to 47 and 48 to 63; the output of the multiplexer 382 is connected by an input connection to a call detection device 386 and to a fault detection device 387. The demultiplexer 383 has its outputs connected to marking lines LU2, LU4, LU6 and LU8 which lines are double lines; these marking lines are connected respectively to the connection units 0 to 15, 16 to 31, 32 to 47 and 48 to 63; the input of the demultiplexer 383 is connected to an output connection LS. The sending of data to the connection units of a group is performed by a marking line LU2 for example which is a double line, the data being sent simultaneously on both lines of the marking line, and it is the connection unit receiver concerned which chooses one line. The data coming from a connection unit arrives by a marking line, LU1 for example, which is a double line, and it is the connection unit dialogue module which chooses one line of the marking line.

The register 381 has a capacity of two bits and is loaded from the dialogue bus LIE and address the multiplexer 382 and the demultiplexer 383; the multiplexer selects a marking line to connect it to the input connection LE; the demultiplexer selects a marking line which it connects to the output connection LS. After initial loading the register 381 becomes a counter enabling time scanning of the multiplexer to detect calls. The fault detection device 387 processes the faults appearing on the input connection LE and alerts the dialogue portion instruction program in accordance with the time of fault, its output being connected to the data test but LTI.

The input connection LE is also connected to a received parity fault register 402 to a call non-confirmation register 403 and to an input of an AND gate 405; the output of the AND gate 405 is connected to a not properly received register 404; the output of the received parity fault register 402 is connected to an input of an OR gate 407 and to an input of an AND gate 408; the output of the call non-confirmation register is connected to another input of the OR gate 407 and to an input of an AND gate 409; the output of the not properly received register 404 is connected to another input of the OR gate 407 and to an input of an AND gate 410. The output of the OR gate 407 is connected via the connection 374 to an input of the OR gate 373, FIG. 18. Another input of the AND gates 408, 409 and 410 is connected to the address bus LAE from which the said AND gates receive an address AD2; the output of each of the AND gates 408, 409 and 410 is connected to the data test bus LTI.

The input connection LE is also connected to an input of an AND gate 412 whose output is connected to an input of an OR gate 414; two other AND gates 411 and 413 also have there outputs connected to an input of the said OR gate 414 whose output is connected by a wire 415 to an input of a counter register 389.

A microprogram memory 388, which is an RAM, has a capacity of sixteen-bit words each word containing a function and its execution time $ti$ $\theta j$; the output of the microprogram memory is connected to a function connection ORD to which it supplies the function corresponding to the word being read. The counter register 389 has its output connected to the addressing circuit of the microprogram memory; this counter register progresses by one step after execution of each function; the input of the counter register is connected to the output of an AND gate 393 having one input connected to the dialogue bus LIE and another input connected to the address bus LAE which delivers an address AD3 thereto.

The counter register 389 has a reset to zero input Z connected to the function connection ORD from which it receives a reset to zero function which corresponds to the function at word 13 of the microprogram; the functions of the microprogram are given further on.

A first comparator 391 and a second comparator 392 each receives the time signals T1 to T5 and $\theta 1$ to $\theta 5$ on one input. The first comparator 391 has another input connected to the output of the microprogram memory and supplies at its output on a line 394 and on the basis of the time signals T1 to T5 and $\theta 1$ to $\theta 5$ microprogram time signals TMI as a function of the times programmed in the microprogram memory 388.

The second comparator 392 has another input connected to the output of a call time register 390 and delivers at its output on a line 395 and on the bases of the time signals T1 to T5 and $\theta 1$ to $\theta 5$, program time signals TPR as a function of the times loaded in the call time register. The input of the call time register 390 is connected to the output of an OR gate 396 having an input connected to the output of an AND gate 397 and another input connected to the output of an AND gate 398. The AND gate 397 receives on one input the time signals T1 to T5 and $\theta 1$ to $\theta 5$ and has an input connected by line 399 to the output of the call detection device 386. The AND gate 398 has an input connected to the dialogue bus LIE and another input connected to the address bus LAE from which it receives an address AD1. The output of the call time register 390 is connected to an input of an AND gate 400 having another input connected to the address bus LAE from which it receives an address AD1 and another input connected to the control line LCE; the output of the AND gate 400 is connected to the dialogue bus LIE. The AND gate 405 has another input connected to the function connection ORD from which it receives the function corresponding to the word 12 of the micrprogram memory. The AND gate 411 has an input connected to the line 399 coming from the call detection device 386 and another input connected to the function connection ORD from which it receives the functions corresponding to the words 9, 10 and 11 of the microprogram memory 388. The AND gate 412 has an input connected to an input connection LE as has just been said another input connected to the function connection ORD from which it receives the function corresponding to the word 4 of the microprogram memory and another input connected to the line 394 at the output of the first comparator 391; the AND gate 413 has an input connected to the function connection ORD from which it receives the function corresponding to the word 5 of the microprogram memory and another input connected via the line 394 to the output of the first comparator 391. A dialogue buffer register 420 is a 37 bit register; it has a parallel input connected to the output of an AND gate 421 having an input connected to the dialogue bus LIE, another input connected to the address bus LAE from which it receives an address AD1 and another input connected to the control line LCE; a parallel output of the dialogue buffer register 420 is connected to an input of an AND gate 422 having another input connected to the address bus LAE from which it receives an address AD1 and another input connected to the control line LCE; a series input of the dialogue buffer register is connected to the output of an AND gate 423 having an input connected to the input connection LE and another input connected to the function connection ORD from which it receives the functions corresponding to words 5 and 6 of the microprogram memory 388; a series output of the dialogue buffer register is connected to an input of an AND gate 424 having another input connected to the function connection ORD from which it receives the functions corresponding to the words 7 and 8 of the microprogram memory; an AND gate 425 has an input connected via the line 395 to the output of a second comparator 392 and another input connected to the function connection ORD from which it receives the functions corresponding to words 3 and 10 of microprogram memory; an AND gate 426 has one input connected via the line 394 to the output of the first comparator 391 and another input connected to the functions connection ORD from which it receives the functions corresponding to words 1 and 2 of the microprogram memory. The output of each of the AND gates 424, 425 and 426 is connected to a corresponding input of an OR gate 427 whose output is connected via the output connection LS to the demultiplexer 383. The dialogue buffer register 420 has a writing addressing circuit 428 both for writing in parallel and writing in series and a reading addressing memory 429 both for reading in parallel and reading in series; the two addressing circuits are connected to the addressing line LAD which delivers the addresses coming from the direct and indirect addressing module 270 of FIG. 15. These two addressing circuits 428 and 429 enable the addressing of the dialogue buffer register by sectors.

Each word of the microprogram memory 388 comprises 16 bits; each word is constituted as indicated below:

Bits 1 to 4: define the function

Bit 5 — reference FPE; this bit validates the end of the dialogue proceedure

Bit 6 — reference ATR; this bit validates standby for reception

Bits 7 to 16 — reference TMI; these bits define the time concerning the function contained in the corresponding word.

Bits 7 to 11 indicate the time signals $\theta5$ to $\theta1$ and bits 12 to 16 indicate the time signals T5 to T1.

The different functions encoded on bits 1 to 4 are as follows:

(1) EPER 1 — this function imposes the application on the connection LS of a parity signal at a time defined by bits 7 to 16 (reference TMI.) The first comparator 391 performs a comparison between this time and the time corresponding to the time signals T$i$ and $\theta j$ and supplies at its output on the line 394 a signal which is applied to the AND gate 426 which also receives the function EPER 1; the AND gate 426 delivers a signal which is applied to the output connection LS via the OR gate 427.

(2) EPER 2 — this function indicates "received OK" and imposes the application of a good parity signal on the connection LS. After receiving a message via the input connection LE whose parity is checked at reception, the first comparator 391 performs a comparison between the time given by the word of function EPER 2 and the time corresponding to the time signals T$i$ and $\theta j$ and delivers its output on the line 394 a signal which is applied to the AND gate 426 which is opened by the function EPER 2 and delivers a signal which is applied to the output connection LS via the OR gate 427.

(3) EPER 3 — this function corresponds to the sending of a call. The call time register 390 is loaded from the dialogue bus LIE via the AND gate 398 and the OR gate 396. The second comparator 392 performs a comparison between the time given by the bits 7 to 16 of the word of function EPER 3 and the call time loaded into the call time register 390, the call time corresponding, of course, to the number of the connection unit which it is desired to call. The second comparator delivers on the line 395 a signal which is applied to the AND gate 425 which is opened by the function EPER 3; the AND gate 425 delivers a signal which is applied to the output connection LS via the OR gate 427.

(4) SYN — this function enables a wait for coincidence between the time given by bits 7 to 16 and the time given by the signals T$i$ and $\theta j$; when the first comparator 391 detects coincidence it delivers a signal which is applied to the AND gate 412 which is opened by the function SYN and the signal transmitted by the input connection LE. The AND gate 412 delivers via the OR gate 414 a signal on the wire 415 which is connected to the advance input of the counter register 389; this signal leads to an advance of the said counter register to address the following sequence in the microprogram memory 388.

(5) MAC 1 — this function enables data applied to the multiplexer 382 to be stored in the dialogue buffer register 420; for this purpose the function MAC 1 opens the AND gate 423 during a time defined by the bits 7 to 16 of the word. The first comparator 391 delivers a signal which opens the AND gate 413 which also receives the function MAC 1, and the signal delivered by the said first comparator from the bits 7 to 16 of the word of function MAC 1; the AND gate 413 delivers a signal which is applied by the OR gate 414 to the advance input of the counter register 389 and causes the said counter register to advance.

(6) MAC 2 — this function enables data applied to the multiplexer 382 to be stored in the dialogue buffer register 420. The function MAC 2 opens the AND gate 423 but in contrast to the function MAC 1 it does not cause the counter register 389 to advance.

(7) MAC 3 — this function enables the contents of the dialogue buffer register 420 to be sent to the output connection LS via the AND gate 424 and the OR gate 427, the AND gate 424 being opened by the function MAC 3.

(8) MAC 4 — this function enables the content of the dialogue buffer register 420 to be sent to the output connection LS via the AND gate 424 and the OR gate 427, the AND gate 424 being opened by the function MAC 4.

(9) FIP 1 — this function enables the counter register 389 to be advanced if a call has been confirmed by the call detection device 386. To this end the AND gate 411 is opened by the function FIP 1 and the signal delivered by the call detection device; the signal coming from the AND gate 411 is applied via the OR gate 414 to the advance input of the counter register 389.

(10) FIP 2 — this function enables the counter register 389 to be advanced if a call is confirmed by the call detection device 386 as explained for the function FIP 1, the AND gate 411 being opened in this case by the function FIP 2. Further this function leads to the sending of a signal to the output connection LS for immediate transmission to line; to this end the AND gate 425 is opened by the function FIP 2 and by the signal leaving the second comparator 392 which compares the time signals T$i$ and $\theta j$ of the content of the call time register 390 loaded by the call detection device 386 via the AND gate 397 and the OR gate 396.

(11) FIP 3 — this function corresponds to the end of a call in the case of a reply. This function causes the counter register 389 to advance if the call is answered. To this end the function FIP 3 opens the AND gate 411 which is also opened in the case of a reply by a signal sent by the call detection device 386.

(12) FIP 4 — this function serves to check whether a "received OK" signal has arrived at the dialogue module in response to its sending out a message. If this signal is not received the AND gate 405 receives the function 12 and applies a 1 to the register 404.

(13) PEB — this function enables the counter register 389 to be reset to zero; it is applied to the reset to zero input Z of the said counter register.

The dialogue buffer register 420 is divided into four sectors: SC0 having eight bits, SC1 having eight bits, SC2 having sixteen bits and SC3 having five bits, each sector having a particular purpose; the sector SC0 indicates the type and the function to be performed, the sector SC1 indicates the time slot and an input or output multiplex LRS or LRE respectively of the connection units, the sector SC2 designates a connection unit and an equipment in the said connection unit, and the sector SC3 contains a message which concerns operator positions.

The time of a call and of a reply are different according to whether the control unit 4 or the control unit 5 is being used. The dialogue portion of the control unit 4 will be designated ECH 1 and the dialogue portion of the control unit 5 by ECH 2. A call time $tn$ corresponds to the connection unit $n$ and a group of connection units will be designated by US$n$. Each call time $tn$ is divided into 5 times $\theta 1 \ldots \theta 5$ which correspond to:

$\theta 1$ — Call from a connection unit to dialogue portion ECH 1 (marking lines LU 2, 4, 6 and 8).

$\theta 2$ — Call from the dialogue portion ECH 1 towards a connection unit (marking lines LU 1, 3, 5 or 7) or a call from a connection unit towards both dialogue portions ECH 1 and ECH 2 (marking lines LU 2, 4, 6 or 8 in each) of the dialogue modules).

$\theta 3$ — Reply of the dialogue portion ECH 1 to the connection unit (marking lines LU 1, 3, 5 or 7) or reply of the connection unit to the dialogue portion ECH 1 (marking lines LU 2, 4, 6 or 8).

$\theta 4$ — Call by the dialogue portion ECH 2 towards the connection unit (marking lines LU 1, 3, 5 or 7) or a call from a connection unit towards the dialogue portion ECH 2 (marking lines LU 2, 4, 6 or 8).

$\theta 5$ — Reply of the dialogue portion ECH 2 to the connection unit (marking lines LU 1, 3, 5 or 7) or reply by the connection unit to the dialogue portion ECH 2 (marking lines LU 2, 4, 6 or 8).

Dialogue between a dialogue portion and the connection unit takes place from $t16$ $\theta 1$ to $t23$ $\theta 5$ for ECH 1 and from $t24$ of $\theta 1$ to $t31$ of $\theta 5$ for ECH 2;

the parity check bit is delivered at $t23$ $\theta 3$ for ECH 1 and at $t31$ $\theta 3$ for ECH 2.

The course of a dialogue will now be described. When sending, the control logic device 26 of the dialogue portion ECH 1, for example, checks the availability of the connection unit dialogue module and then performs the following operations: loading of the microgram memory 38 which then contains the desired sending proceedure in the form of its functions, loading of the dialogue buffer register 420 with the message to be sent, initialisation of the number of the group of connection units concerned by the message by loading the register 381 with this group number, initialisation of a connection unit number to be called by loading of the call time register, and initialisation of the counter register 389 for setting of the dialogue proceedure.

On reception the dialogue module is then in the message reception standby position; to this end the microprogram memory 388 is loaded with a first microinstruction of function FIP 2 (reception standby). From the reception of a call from the connection unit the dialogue module arranges itself for message reception.

FIG. 20 shows the module for dialogue between the two control units 29 of FIG. 4. This module ensures dialogue between one control unit called "master" and another control unit called "slave"; there is thus a dialogue module in each control unit 4 and 5 since the control units are identical and either one of them can be "master" with the other being "slave". These dialogues are essentially concerned with the multi-register portion and the translator module 32 of FIG. 4. Furthermore the said module for dialogue between the two control units 29 also ensures dialogue between the control unit to which it belongs and the monitoring unit 7 of the exchange (FIG. 1). As in the module for dialogue with the connection unit shown in FIG. 19, the present module has a similar collection of units for controlling its operation; these units are therefore designated by the same references as those used in FIG. 19, since they have the same functions. There can thus be found: a micro-program memory 388, the counter register 389, the AND gate 393 having an input connected to the dialogue portion data bus LIME and an input connected to the address bus LAE; a first comparator 391, a second comparator 392, a call time register 390, an OR gate 396, two AND gates 397 and 398, and AND gate 400, a call detection device 386, a fault detection device 387, three AND gates 411, 412 and 413, an OR gate 414, a reception parity fault register 402, a call non-confirmation register 403, a not properly received register 404, three AND gates 408, 409 and 410, an OR gate 407 whose output is connected to the OR gate 373 of FIG. 18 by the connection 375, and two AND gates 405 and 410. The functions of the microprogram memory 388 are the same as those described before. A first switch 440 receives data either from the other control unit via dialogue lines ELM 1 and ELM 3 or from the monitoring unit 7 via the monitoring lines LC 1 and LC 3, the output of the first switch being to the input connection LE; a second switch 441 delivers data either to another control unit via the dialogue lines ELM 2 and ELM 4 or to the monitoring unit via the monitoring lines LC 2 and LC 4; the data is applied to the input of the second switch by the output connection LS. Each switch is connected to the address bus LAE from which it receives an address AD3; each switch is also controlled by the functions 6, 1 or 8 coming from the microprogram memory 388, the function connection ORD delivering respectively the functions 6, 1 or 8 to an input of an OR gate 442 whose output is connected to a control input of each switch. An eight-bit register 443 has an output line AME on which there appear the signals AME 9 to AME 16; the input of the register 443 is connected to the output of an AND gate 444 having an input connected to the dialogue bus LIE and an input connected to the address bus LAE from which it receives an address AD3. The output signals AME 9 to AME 16 serve to control writing or reading of the input register 445, of the dialogue memory 446 and of the output register 447.

The input register 445 has its input connected to the output of an OR gate 448 which has an input connected to the output of an AND gate 449 and another input connected to the output of an AND gate 450. An input of the AND gate 449 is connected to the input connection LE and another input is connected to the function connection ORD from which it receives functions 5 and 6; an input of the AND gate 450 is connected via an invertor 451 to the function line ORD. The output of the input register 445 is connected to an input of an AND gate 452 having another input connected to the output line AME from which it receives a signal AME 9. The output of the AND gate 452 and the output of the AND gate 453 are connected to respective inputs of an OR gate 454; an input of the AND gate 453 is connected to the dialogue bus LIE, another input is connected to the address bus LAE from which it receives an address AD1 and another input is connected to the control line LCE; finally a last input is connected to the output line AME from which it receives a signal AME 15. The output of the OR gate 454 is connected to the input of the dialogue memory 446 which has a capacity of sixteen-bit words. The addressing of the dialogue memory 446 is performed by a circuit comprising an AND gate 456, the counter register 457, an AND gate 458, and another AND gate 459 and an OR gate 460. One input of the AND gate 456 is connected to the dialogue bus LIE and another input is connected to the address bus LAE from which it receives an address AD3; an advance input of the counter register 457 is connected by the wire 415 to the output of the OR gate 414. An input of the AND gate 458 is connected via a logic invertor 461 to an input of the AND gate 459 and to the output line AME which delivers a signal AME 14; another input of the AND gate 459 is connected to the addressing line LAD coming from the direct and indirect addressing module 270 of FIG. 15. The output of the dialogue memory 446 is connected both to an AND gate 462 and to an AND gate 463. An input of the AND gate 462 is connected to the output line AME from which it receives a signal AME 16 and another input is connected to the address bus LAE from which it receives an address AD1; a third input is connected to the control line LCE; the output of the AND gate 462 is connected to the dialogue bus LIE. An input of the AND gate 463 is connected to the output line AME from which it receives a signal AME 10; the output of the AND gate 463 is connected to the input of the register 447 whose output is connected to an input of an AND gate 464 having another input connected to the output line AME from which it receives a signal AME 11; the output of the AND gate 464 is connected by the wire 465 to an input of the AND gate 450 which enables writing in the input register 445 of data coming from the output register 447.

As in the connection unit dialogue module of FIG. 19 there is a circuit comprising three AND gates 424, 425 and 426 with an OR gate 427 whose output is connected by the output connection LS to the second switch 441; an input of the AND gate 424 is connected to an output of the AND gate 464; the other inputs of the AND gates are connected in the same manner as shown in FIG. 19.

As has been explained the control units 4 and 5 dialogue between each other by the intermediary of the dialogue lines ELM; this dialogue is formed in time at instants defined by a frame. Thus the control unit 4 calls the control unit 5 at the instant defined by $to$ $\theta2$ and the control unit 5 replies at the instant $to$ $\theta3$. The control unit 5 calls the control unit 4 at the instant $t16$ $\theta2$ and the control unit 4 replies at $t16$ $\theta3$. The data is exchanged in the frame which follows the call from $to$ $\theta1$ to $t31$ $\theta2$. The control unit which has sent a call and received a reply puts itself in the sending position which indicates that the module for dialogue between the control units sends as soon as the microprogram contained in the microprogram memory 388 of the said module runs. Likewise the control unit module having received and taken into account the call puts itself in the reception position and its microprogram memory 388 runs the reception microprogram. During sending the content of the memory 446 is sent over the output connection LS and then on the dialogue connection ELM 2, during reception the data arrives by the dialogue connection ELM 1 and is sent to the dialogue memory 446 by the input connection LE via the input register 445.

Dialogue with the monitoring unit 7 via the monitoring lines LC happens in the same manner but the calling instants and the reply instants are different.

FIG. 21 shows the switching network dialogue module 30 of FIG. 4. This module ensures transmission of dialogue between the switching network 1 (FIG. 1) and the dialogue portion 9 of a control unit. The switching network dialogue unit comprises a register 470 having a capacity of 32 bits; the register is divided into 4 sectors; writing in each sector is performed by the intermediary of an AND gate 471, 472, 473, or 474 and reading from each sector is performed by the intermediary of an AND gate 475, 476, 477 or 478.

The AND gate 471, 472, 473 and 474 all have one input connected to the dialogue bus LIE and another input connected to the address bus LAE from which they receive an address AD1, and another input connected to the control line LCE from which they receive the bit 27, and another input connected to the addressing line LAD which delivers to each AND gate a signal corresponding to the sector of the register connected to the output of the corresponding AND gate. Likewise the AND gates 475, 476, 477 and 478 each have an input connected to one particular sector of the register 470; they all have an input connected to the control line LCE from which they receive the bit 21, an input connected to the address bus LAE from which they receive an address AD1, and an input connected to the addressing line LAD which delivers a signal to each AND gate corresponding to the sector to which it is connected. The output of each AND gate 475, 476, 477 and 478 is connected to the dialogue bus LIE. The register 470 has a serial input connected to the output of an AND gate 479 having an input connected to the function line OLX 2; the serial output of the register 470 is connected to an input of an AND gate 480 whose output is connected to the function line OLX 1. The two function lines OLX 1 and OLX 2 constitute the function line OLX of FIG. 1; the function line OLX 1 delivers data to the switching network 1 and the function OLX 2 brings data to the switching network dialogue module from the switching network. A positioning device 482 which controls the sending or receiving of the register 470 has a sending output connected by the wire 483 to an input of the AND gate 480 and a receiving output connected by the wire 484 to an input of the AND gate 479; the positioning device 482 has an input connected to the address bus LAE and another input connected to the time base 6 from which it receives the signals $ti$ and $\theta j$.

An end of dialogue register 487 has its output connected to the input of an AND gate 490 and its input is connected to the function line OLX 2; a parity register 488 has its output connected to the input of an AND gate 491 and its input is connected to the function line OLX 2; a not properly received register 489 has its output connected to the input of an AND gate 492 and its input is connected to the function line OLX 2. Another input of each of the AND gates 490, 491 and 492 is connected to the address bus LAE from which they receive an address AD2; the output of each of the AND gates 490, 491 and 492 is connected to the data test bus LTI. The output of each of the registers 487, 488 and 489 is connected to a respective one of the inputs of an OR gate 493 whose output is connected via the connection 376 to an input of the OR gate 373 of FIG. 18.

The register 470 is thus accessible in parallel both for input and for output by the data bus LIE; each sector corresponds to a particular function in so far as dialogue with the switching network is concerned.

A four-bit sector SC0 is accessible by the AND gates 471 and 475 and is reserved for defining the type of the function.

A twelve-bit sector SC1 accessible via the AND gates 472 and 476 is reserved for the calling party by means of the connection unit number, the time slot number and the numbers of the input and output multiplexes which connect the connection unit to the switching network. A twelve-bit sector SC2 accessible by the AND gates 473 and 477 is reserved for the called party, by means of the number of the connection unit, the number of the time slot and the numbers of the input and output multiplexes which connect the connection unit to the switching network. A four-bit sector SC3 accessible via the AND gates 474 and 478 is reserved for switching faults on reply from the switching network.

The sending of a message towards the switching network comprises first of all the parallel loading of the register 470 with the data composing the message being routed via the dialogue bus LIE, and the AND gate 480 is set to sending by the positioning device 482, the sending being enabled at the time defined by $t15\ \theta5$; the contents of the register 470 is transmitted in series to the function line OLX 1; the transmission takes place from $t15\ \theta5$ to $t22\ \theta2$ one bit of the register 470 being sent at each instant $\theta1, \theta2 \ldots \theta5$. A parity flip flop enables the parity of the message sent on the function line OLX 1 to be checked; if there is a parity fault an extra bit is sent at the end of the message to re-establish proper parity. The switching network also checks for parity in the message as received; if the parity is correct the switching network sends a "received OK" bit via the function line OLX which sets the not properly received register 489 to 0; if the parity is not correct the not properly received register is set to 1 and this indication is sent to the data test bus LTI via the AND gate 492; the operation block shown in FIG. 16 takes this indication into consideration, (i.e. the indication that the message has not been properly received by the switching network and must therefore be sent again). The operation in reception of a message coming from a switching network is as follows: in a first phase the switching network dialogue module is automatically set to reception from the beginning of the frame which follows the last frame in which a message was sent to the switching network; for this purpose the positioning device 482 controls the AND gate 479 from the beginning of the frame. When the message arrives from the switching network via the function line OLX 2 it is stored in the register 470 during the reception period, i.e. from time $t15\ \theta5$ to time $t22\ \theta2$. Once the message has been received a parity check is performed; if the parity is correct the end of dialogue register 487 delivers at the end of reception an end of dialogue signal of value 1 and the parity register 488 delivers a signal of value 0; if the parity is wrong the end of dialogue register 487 delivers a signal of value 0 and the parity register 488 delivers a signal of value 1, these signals are transmitted to the operation block via the data test bus LTI which will control the restarting of the dialogue operation, i.e. the sending of a message to the switching network. Once a message has been properly received from the switching network the content of the register 470 is, during a second phase, transferred to the dialogue bus LIE and the data stored in the central memory module 271 of FIG. 15.

FIG. 22 shows a translator module 32 of FIG. 4. This module stores the data necessary for the multi-register portion to be able to set up and clear down different types of telephone calls switched by the telephone exchange. To this end the module is composed essentially of translation memories in which data is recorded, i.e. data concerning the telephone network and the exchange subscribers. For any one subscriber the data is as follows: his connection address i.e. the number of the connection unit to which he is connected and the equipment number in this connection unit, and the different classes of service which may concern him, such as: transferred, not equiped, etc. Likewise for a multiplex this data concerns: the number of the connection unit and the number of the equipment in the connection unit to which the multiplex is connected. With these translation memories there are access logic circuits which enable the data stored in the said translation memories to be accessed, the said access logic circuit being itself accessible by the control logic device showed in FIG. 14. The translation memories must be accessible for reading so that the data stored therein can be used by the multiregister portion; the translation memories must also be accessible for writing so that the data stored therein may be modified. This data depends on the geographical location of the telephone exchange and of its manner of exploitation; this data must be modifiable from the data processing centre CTI to which the telephone exchange is connected by means of the monitoring unit 7 of FIG. 1 in such a way as to enable routings to be changed and classes of service to be temporarily altered. The data processing centre possess an exact copy of the translation memories and is responsible both for the loading and the supervision of the translation memories.

The translator module shown in block form in FIG. 22 is constituted by translation memories MT1 and MT$n$ each connected to the dialogue bus LIE, to the control line LCE and to the address bus LAE as well as to a synchronising circuit 498 and to an address selection circuit SAD, which circuits are also connected to the dialogue bus LIE to the control line LCE and to the address bus LAE. A memory zone selection connection 499 connects the synchronising circuit 498 to each of the translation memories; a synchronising connection 500 connects the synchronising circuit to each of the translation memories. An $n$ wire connection for memory selection 501 connects the address selection circuit SAD to the translation memories, each of the 1 to $n$ wires connecting the said address selection circuit to a respective one of the translation memories MT1 to MT$n$. A connection 520 connects the synchronising circuit 498 to the address selection circuit SAD. The address selection circuit SAD is also connected to the translation memories MT1 to MT$n$ by a geographical address connection SAG and by a functional address connection SAF.

FIG. 23 shows a translation memory and a synchronising circuit 498 of FIG. 22 and FIG. 24 shows the addressing circuit SAD of the said FIG. 22. In FIG. 23 a translation memory comprises a data buffer memory MTI and a data circulation memory MCI; the output of the data buffer memory MTI is connected to the input of an AND gate 502 whose output is connected to the input of the data circulation memory MCI; the output of the data circulation memory MCI is connected to an input of an AND gate 503 whose output is connected to an input of an AND gate 504; the output of the AND gate 502 is connected to an input of an OR gate 506 whose output is connected to the input of the data buffer memory MTI. An AND gate 505 has an input connected to the dialogue bus LIE, another input connected to the address bus LAE and another input connected to the control line LCE; the output of the AND gate 505 is connected to another input of the OR gate 506. An AND gate 507 has an input connected to the dialogue bus LIE, another input connected to the address bus LAE and another input connected to the control line LCE; the output of the AND gate 507 is connected to a counter 508 also connected to the address bus LAE and to the control line LCE; said counter 508 also receives the clock signal ω; the output of the counter 508 is connected to an addressing circuit of the data buffer memory MTI. The output of the data buffer memory MTI is connected to an input of an AND gate 509 having another input connected to the control line LCE and another input connected to the address bus LAE; the output of the AND gate 509 is connected to the dialogue bus LIE. The output of the data buffer memory MTI is also connected to an input of a comparator block 510 constituted by 4 comparators; the comparator block is connected to the output of an AND gate 511 having an input connected to the dialogue bus LIE and another input connected to the address bus LAE; the comparator block 510 receives a masking signal from the AND gate 511 so that a comparison is performed on 1, 2, 3 or 4 comparators according to the masking signal received. Another input of the comparator block is connected to the output of the data circulation memory MCI. The output of the comparator block is connected to an input of an AND gate 512 whose other input is connected by the functional addressing connection SAF to the addressing selection circuit SAD; the output of the AND gate 512 is connected to an input of an OR gate 513 whose other input is connected by the geographic addressing connection SAG to the addressing selection circuit SAD. The output of the OR gate 513 is connected to an input of an AND gate 514 whose other input is connected by a wire of the memory selection connection 501 to the address selection circuit SAD. The output of the AND gate 514 is connected to an input of the AND gate 504, to an input of the AND gate 502 and to an input of the AND gate 503; the signal delivered by the said AND gate 514 is called the coincidence signal. An AND gate 518 has an input connected to the synchronising circuit 498 by the synchronising connection 500 and another input connected by wiring to 2047 this number being the address of the last word of the data circulation memory MCI; the output of the said AND gate 518 is connected to the input of an address counter 519 whose output is connected to the addressing circuit of the data circulation memory MCI, the said address counter 519 receiving a clock signal ω/4. The synchronising circuit 498 which is common to all the translation memories includes a three-input AND gate 515 having its inputs connected respectively to the dialogue bus LIE to the address bus LAE and to the control line LCE; the output of the said AND gate 515 is connected to the input of a counter 516 having an output connected to an input of a comparator 517 and an output connected via the connection 499 for memory zone selection to the data circulation memory MCI, the said connection 499 for memory zone selection being also used to connect the counter 516 to all the data circulation memories MCI of the translation memories MT1 to MTn. The connection 520 also connects the counter 516 to the addressing selection circuit SAD. Another input of the comparator 517 is connected by wiring to 2047. The synchronising connection 500 connects the output of the comparator 517 to all the AND gates 518 of the translation memories MT1 to MTn. The data buffer memory MTI has a capacity of 16 sixteen-bit words and the data circulation memory has a capacity of 2048 sixteen-bit words, the words being numbered from 0 to 2047, and it is divided into four memory zones of 512 words each; each data circulation memory MTI is specialised for one or several types of given translation. The signal delivered by the counter 516 and transmitted by the connection 499 for memory zone selection, enables a memory zone to be selected in a data circulation memory MCI, the said signal being a memory zone number. The synchronising connection 500 enables a synchronising signal to be sent to all the data circulation memories MCI in order to synchronise their address counters 519.

FIG. 24 shows the addressing selection circuit SAD commun to all the translation memories. An AND gate 530 has three inputs connected respectively to the dialogue bus LIE the address bus LAE and the control line LCE and has its output connected to the input of a word number register RNM whose output is connected to an input of a comparator 531; another input of the said comparator 531 is connected via the connection 520 to the output of the counter 516 (FIG. 23) and the output of the said comparator is connected to an input of an AND gate 533 whose other input is connected to the address bus LAE; the output of the AND gate 533 is connected to the input of an OR gate 535. An AND gate 534 has three inputs connected respectively on the dialogue bus LIE to the address bus LAE and to the control line LCE and has its output connected to the input of a geographic address register RAG whose output is connected to an input of a comparator 539. An AND gate 532 has three inputs connected respectively to the dialogue bus LIE to the address bus LAE and to the control line LCE and has its output connected to the input of a functional addressing register RAF whose output is connected to an input of an AND gate 537 and to an input of a comparator 338. The said AND gate 537 has two other inputs connected respectively to the address bus LAE and to the control line LCE; the output of the AND gate 537 is connected to the input of an address selection memory MES whose output is connected to another input of the comparator 538. An address counter 536 has its output connected to an addressing circuit of the said address selection memory MES and to an input of the comparator 539; the said addressing counter receives the clock signal h2. The output of the comparator 538 is connected via the funcional addressing connection SAF to an input of an OR gate 540; the output of the comparator 539 is connected by the geographic addressing connection SAG to another input of the OR gate 540 whose output is connected to an input of a translation memory counter 541 which receives the clock signal ω3 and whose output is connected via the memory selection connection 501 to the AND gate 514 (FIG. 23) of each translation memory. The capacity of the addressing selection memory is 256 sixteen-bit words.

The word number register RNM is loaded from the dialogue bus LIE and the number of the word which it delivers is compared by the comparator 531 to the number delivered by the counter 516 (FIG. 23); if the comparison is good the comparator 513 delivers a signal to validate to word selection to the geographic addressing register RAG via the AND gate 533 and the OR gate 535. A translation memory shown in FIG. 23 is accessible either by direct addressing or by indirect addressing. In direct addressing the first word to be recognised is loaded into the word number register RNM; the word selection signal delivered by the comparator 531 authorises the loading of the geographic addressing register RAG whose output is compared by the comparator 539 to the address delivered by the address counter 536. If the comparison is good the comparator 539 delivers a geographic selection signal which authorises via the OR gate 540 the output of the signal from the translation memory counter 541 which addresses a translation memory. The geographic selection signal delivered on the geographic addressing connection SAG to the OR gate 513 (FIG. 23) and associated with the signal delivered by the translation memory counter 541, provides a coincidence signal at the output of the AND gate 514 (FIG. 23) of the translation memory addressed by the signal output from the said translation memory counter; in the said translation memory the said coincidence signal authorises the transfer of the content of the data circulation memory MCI into the data buffer memory STI which is then accessible for output via the dialogue bus LIE. In indirect addressing, otherwise called addressing by content; each data circulation memory MCI of the translation module may be selected by a functional addressing since they are specialised. To this end the functional addressing register RAF is loaded from the dialogue bus LIE with a signal determining the type of function sought. The signal output by the functional addressing register RAF is compared in the comparator 538 with the content of each word of the addressing selection memory MES; when there is concordance between the output signal of the functional addressing register RAF and the content of a word of the addressing selection memory MES the comparator 538 delivers a signal on the functional addressing connection SAF, which signal is applied to all the translation memories MT1 to MTn. Then there is written into the data buffer memories MTI, on the bases of the dialogue bus LIE the word or words which it is desired to select and a comparison is performed in each translation memory between the content of each word of the data buffer memory and each word of the data circulation memory MCI which is addressed by its address counter 519 (FIG. 23); the comparison is performed by the comparator block 510 on 1, 2, 3 or 4 sectors of the word, a number of sectors being given by the signal delivered by the AND gate 511. When the comparison is positive, the comparator block 510 delivers a signal which is transmitted via the AND gate 512 and the OR gate 513 to the AND gate 514; only the AND gate 514 of the translation memory which is addressed by the translation memory counter 541 (FIG. 24) delivers a coincidence signal which enables the transfer of the words selected in the data circulation memory into the data buffer memory.

The two types of addressing, direct and indirect, enable the operations of reading or writing into the data circulation memory by groups of 1 to 16 words.

FIG. 25 shows the auxiliary memory module 34 of the dialogue portion. In the event of breakdown of the data processing centre CTI this module enables the call charges relating to the exchange subscribers to be stored. The auxiliary memory module comprises a memory block constituted by three memories 550, 551 and 552 and an emergency charging interface IST having a capacity of one sixteen-bit word. The memories 550, 551 and 552 are of the same type as the memory 35 (FIG. 6a) and each has a capacity of 4096 seventeen-bit words including the parity check bit. The emergency charging interface IST operates between the memory block and the dialogue bus LIE. An AND gate 553 has three inputs connected respectively to the dialogue bus LIE, the address bus LAE and to a control line LCE; the output of the said AND gate 553 is connected to an input of each of four AND gates 554, 555, 556 and 557 whose outputs are connected to respective sector inputs of the memories 550, 551 and 552; another input of each of the AND gates 554, 555, 556 and 557 is connected to the output of a sector addressing register RAS which delivers a signal to one or several of the said AND gates 554 to 557, thus authorising the writing in the memories of 1, 2, 3 or 4 word sectors routed by the dialogue bus LIE. The sector addressing register RAS has its input connected to the output of an AND gate 554 having an input connected to the dialogue bus LIE and another input connected to the address bus LAE. A memory addressing register RAC is used for addressing the memories both for writing and for reading, and has its output connected to the addressing circuit 559 of the memories 550, 551 and 552 and its input connected to the output of an AND gate 560 having an input connected to the dialogue bus LIE and another input connected to the address bus LAE. The memories 550, 551 and 552 also have a "parity" input corresponding to one bit of each word; this "parity" input is connected to the output of a parity generator 561 whose input is connected to the output of the AND gate 553. During the writing of a word into the memory the parity generator enables the writing of a parity check bit where required into the seventeenth bit of the word.

The memories 550, 551 and 552 have a word output for 16 bits and a "parity" output for the parity bit. The word output is connected to an input of an AND gate 562 having two other inputs connected respectively to the control line LCE and to the address bus LAE; the output of the AND gate 562 is connected to the input of the emergency charging interface IST and to a parity checker 563 which is also connected to the parity output of the memories 550, 551 and 552; the output of the said parity checker is connected to an input of an AND gate 564 whose other input is connected to the address bus LAE; the output of the AND gate 564 is connected to the data test bus LTI of the dialogue portion. In the event of a parity fault during reading of a word of the memories 550 to 552 a fault flip-flop of the parity checker is set to 1 and the said flip-flop may be read by sending an address to the input of the AND gate 564 connected to the address bus LAE. At the output of the emergency charging interface IST each four-bit sector of a word is connected to an input of an AND gate 565, 566, 567 or 568 whose other input is connected to the output of the sector addressing register RAS which enables one, two, three or four sectors to be read. The output of each of the AND gates 565, 566, 567 and 568 is connected to the dialogue bus LIE.

During the proceeding description it has been indicated that various units were connected to an exchange desk. This desk is a unit which is independent of the control unit 4 and 5 which form the subject matter of the invention and is in no way essential for the operation of the said control unit. The desk is used for maintenance and display. It enables the operation of a given module to be verified and it is used essentially for final adjustments during installation of the exchange, breakdowns and maintenance. These operations are facilitated by the display of a certain amount of data and by the possibility of manual intervention on the operation of a module. All the functions realised from the desk, connected directly to the modules, can be performed at a distance via a remote desk controlled by the data processing centre via the monitoring unit 7.

What we claim is:

1. A time division telecommunications exchange comprising a switching network, connection units, a time base, and a monitoring unit connected to a data processing centre, characterised by the fact that it further comprises at least one control unit constituted by a multi-register portion and a dialogue portion connected by a dialogue bus to the said multi-register portion which sets up and clears down traffic, the said dialogue portion providing connections between the multi-register portion and the switching network and the connection units, the said control unit being connected to the switching network by network lines and by function lines; to the connection units by test lines and by marking lines and to the monitoring unit by monitoring lines, the said control unit replacing the specialised units normally employed in a time division exchange.

2. A time division and telecommunications exchange according to claim 1 characterised by the fact that it comprises two control units one being a master unit and the other a slave unit, the said control units being connected to each other by dialogue lines.

3. A time division exchange according to claim 1 characterised by the fact that the multi-register portion comprises a macroprogram memory and two multi-register assemblies, the said macroprogram memory being connected to the two multi-register assemblies which are themselves connected by a dialogue bus to the dialogue portion, the said macroprogram memory containing 48-bit macroinstructions on which the eight initial bits constitute a function defining the macroinstruction.

4. A time division exchange according to claim 3 characterised by the fact that each multi-register assembly comprises a control logic assembly, a register memory block connected to a buffer memory block, a signalling receiver module, a signalling transmitter module, a clock module and an input/output module, the said control logic assembly, buffer memory block, signalling receiver module, and input/output module being connected to a multi-register data bus, the said input/output module being connected to the dialogue bus, the said control logic assembly being connected to the macroprogram memory, the signalling receiver module being connected to the connection units by test lines, the signalling transmitter module being connected to the switching network by network lines, the said clock module being connected to the time base and distributing clock signals within the multi-register assembly.

5. A time division exchange according to claim 2 characterised by the fact that the dialogue portion comprises a control logic device, a module for dialogue between two control units, a switching network dialogue module, a connection unit dialogue module, a translator module, a lookup table module, and an auxiliary memory module, the said control logic device and the said modules being connected to a dialogue bus which connects the dialogue portion to the multi-register portion, the said module for dialogue between the two control units being connected to the monitoring unit by monitoring lines, the said switching network dialogue module being connected to the switching network by function lines, the said connection unit dialogue module being connected to the selection units by marking lines.

6. A time division exchange according to claim 5 characterised by the fact that the modules for dialogue of the two control units are connected to each other by dialogue lines.

7. A time division exchange according to claim 4 characterised by the fact that the control logic assembly comprises an access block connected to the macroprogram memory, a control logic circuit, an instruction memory block, the said access block, control logic circuit, and instruction memory block being connected to the multi-register data bus.

8. A time division exchange according to claim 7 characterised by the fact that the access block is connected to the multi-register data bus, to the control logic by a memory points bus and by a control line to the addressing circuit of the macroprogram memory, and that the said access block receives a function from the control logic.

9. A time division exchange according to claim 7 characterised by the fact that the control logic comprises an addressing module and an operation block module, the said addressing module being connected to the macroprogram memory from which it receives via a transcoding memory the bits 1 to 8 which define the functions of the macroinstructions, to a circuit for addressing an instruction memory of the instruction memory block, to the said operation block module and to the multi-register data bus, the said operation block being connected to the multi-register data bus and to the said instruction memory which contains 48-bit instructions, the instructions being of 5 different types, corresponding to 5 functions defined by the first 3 bits of an instruction, the said operation block having an interface circuit which receives the bits from the instructions and which delivers the bits 4 to 48 of the said instructions to a memory points bus, the said operation block comprising a decoding circuit connected to the said interface circuit from which it receives the said first 3 bits, and delivering a different function on each of 5 different outputs, the said operation block having an address decoder connected to the said interface circuit and delivering on a control line the addresses given by the instructions.

10. A time division exchange according to claim 4 characterised by the fact that the register memory block stores the data necessary for setting up and clearing down calls and comprises an input interface, a memory with an addressing circuit, an output interface, that the buffer memory block comprises two buffer memories each ensuring the processing of the data of the words of the said memory, the said buffer memories being connected to the input of the said output interface, the said buffer memory block also comprising a reading circuit, a time addressing circuit, a space addressing circuit connected to a memory addressing circuit, the said buffer memories being connected to the said reading circuit and to the multi-register data bus, the said reading circuit having an output connected to an input of the said input interface, the said time addressing circuit being connected to the control logic assembly by a memory points bus and by a control line and receiving a function from the said control logic assembly, the said time addressing circuit being also connected to the multi-register data bus, to the said memory addressing circuit, to the said addressing circuit and to the output interface, the said space addressing circuit being connected to the said reading circuit, to the control logic by the said memory points bus and by the said control line, and receiving functions from the said control logic assembly, the said memory addressing circuit being connected to the said buffer memories.

11. A time division exchange according to claim 4 characterised by the fact that the signalling receiver module receives and stores signals relating to subscriber lines or to circuits, the said signals being sent by the connection units via test lines, and in that it confirms or not a change of state of the subscriber lines or of the circuits, the said signalling receiving module being connected to the control logic assembly by a memory points bus and by a control line and to the test lines by a multiplexer with its output connected via a register of the state of the test lines, a buffer register, an output logic circuit to memories of the preceeding state and to memories of the confirmed state, the said memories having their outputs connected to the multi-register data bus, and that the signalling transmitter module ensures the preparation and the sending of signalling and tone control messages to the switching network, that it is connected to the control logic assembly by the memory points bus and the control line and to the network line by two output logic circuits, and that it comprises two memories with their inputs connected to the multi-register data bus and to the control line, and with their outputs connected to the said output logic circuits via the two registers.

12. A time division exchange according to claim 4 characterised by the fact that the input/output module provides an interface between the multi-register portion and the dialogue portion of a control unit, the said input/output module comprising at least one input/output block connected to the control logic assembly by a memory points bus and receiving a transfer function from the said control logic, the said input/output block being connected to the dialogue portion by a dialogue bus, an address bus, and a control line and comprising a memory with its input and output connected to the multi-register data bus and to the dialogue bus.

13. A time division exchange according to claim 5 characterised by the fact that the control logic device comprises a direct and indirect addressing module, a central memory module, an operation block module, a phase processing module, a data regrouping module, a timing memory and priority call logic module and an instruction memory block connected to a dialogue portion data bus, a control line, and an address bus coming from the said instruction memory block, the said direct and indirect addressing module, central memory module, operation block module, phase processing module, data regrouping module, priority call logic and timing memory module, the module for dialogue between the two control units, the switching network dialogue module, the connection unit dialogue module, the translator module, the lookup table module and the auxiliary memory module all being connected to the said control line and to the said address bus, the said modules for dialogue between the two control units, switching network dialogue, translator, lookup table, and auxiliary memory being also connected to an addressing line coming from the said direct and indirect addressing module, and to a data test bus to which the said operation block module, the said data regrouping module, the said priority call logic and timing memory module, are also connected, the said control logic device also comprising an AND gate having an input connected to the said dialogue portion data bus and to an input connected to the output of an inverter, an AND gate connected to the output of the dialogue portion data bus and having an input connected to the dialogue portion bus and another input connected to the said control line, the said inverter being also connected to an input of the said control line.

14. A time division exchange according to claim 13 characterised by the fact that the direct and indirect addressing module which addresses the central memory module receives at its input for direct addressing signals from the control line and a write function or a read function from the instruction memory, and receives for indirect addressing signals from the dialogue portion data bus and from the address bus and from the control line, and that an output of the said direct and indirect addressing module is connected to the central memory module and that another output constitutes the addressing line which delivers addresses constituted by six bits, that the central memory module which performs the role of a buffer between the operation block module, the various dialogue modules and the peripheral modules, receives data from the dialogue portion data bus and delivers data on the dialogue portion data bus via a parallel output register, that the operation block module enables data to be tested, data to be shifted, arithmetic and logic operations to be performed and different phase jumps to be obtained, and comprises a first accumulator connected to the dialogue portion data bus, to the control line, and to the data test bus and has its output connected to a shift network connected to an arithmetic circuit, a second accumulator connected to the input of the dialogue portion data bus and to the control line, and having its output connected to the said arithmetic circuit having an output connected to a third accumulator and to a comparator also having an input connected to the said second accumulator, the said comparator being connected to a priority circuit which delivers via four AND gates and an OR gate, various phase jumps to the phase processing module, the said third accumulator being connected as its output to the dialogue portion data bus.

15. A time division exchange according to claim 13 characterised by the fact that the phase processing module comprises an arithmetic circuit connected at its input to the operation block module, a phase preparation register connected at its input to the dialogue portion data bus and to the address bus and to the output of the said arithmetic circuit, a phase register and a phase decoder, the said phase register being also connected at its output to an input of the said arithmetic circuit, the said phase decoder being connected at its output to the instruction memory block, that the instruction memory block comprises an instruction memory address by the said phase decoder, a function decoder connected to an output of the said instruction memory and delivering four types of function each defining an instruction and having its output connected to the address bus which thus comes from the said address decoder, an output of the said instruction memory constituting a control line, that the data regrouping module which routes onto the data test bus data received from the dialogue portion data bus on four AND gates also connected to a control line and to an address bus, the said AND gates being connected at their outputs to an OR gate whose output is connected to the said data test bus, and that the priority call logic and timing memory module comprises a timing memory which memorises the timing values on the bases of the dialogue portion data bus, a first priority call register connected to an output of the said timing memory and a second priority call register connected at its input to the connection unit dialogue module to the module for dialogue between the two control units and to the switching network dialogue module, the said first and second priority call registers being connected at their outputs to the dialogue portion data bus via an OR gate and an AND gate having an input connected to the address bus.

16. A time division exchange according to claim 5 characterised by the fact that the connection unit dialogue module which ensures the sending and reception of messages between the connection units and the dialogue portion of a control unit is connected to the marking lines at its input via a multiplexer and at its output by a demultiplexer; that it is connected to the control logic device by a data test bus, an address bus, a control line, an address line and a dialogue bus, that the module for dialogue between the two control units which ensures the exchange of data between the two control units is connected at its input by a first switch and at its output by a second switch to the dialogue lines which connect together the modules for dialogue between the two control units, that it is connected to the control logic device by the said data test bus, the said control line, the said address line and the said dialogue bus, and that the switching network dialogue module which ensures the passage of dialogue between the switching network and one control unit comprises a register which is connected by its input to the function line and at its output to the dialogue bus to receive a message and which is connected at its input to the said dialogue bus and at its output to the said function line to send a message, the said network dialogue module being also connected to the control line, to the address bus, to the data test bus and to the addressing line.

17. A time division exchange according to claim 5 characterised by the fact that the translator module ensures the storage of the data required by the multiregister portion for the setting up and the clearing down of the different types of call switches by the exchange and that it comprises translation memories, a synchronising circuit, and an addressing selection circuit, and that it is connected to the control logic device by a dialogue bus, a control line and an address bus, and that the auxiliary memory module ensures the storage of call charges relating to the exchange subscribers and is connected to the control logic device by a dialogue bus, a control line and an addressing bus.

* * * * *